US012661758B2

(12) United States Patent
Kizilkan et al.

(10) Patent No.: US 12,661,758 B2
(45) Date of Patent: Jun. 23, 2026

(54) COMPONENT HANDLING SYSTEMS AND METHODS

(71) Applicant: MAGSWITCH AUTOMATION COMPANY, Superior, CO (US)

(72) Inventors: Cengiz Kizilkan, Ingolstadt (DE); Joseph P. Cyrek, Northville, MI (US)

(73) Assignee: Magswitch Automation Company, Superior, CO (US)

( * ) Notice: Subject to any disclaimer, the term of this patent is extended or adjusted under 35 U.S.C. 154(b) by 159 days.

(21) Appl. No.: 18/570,490

(22) PCT Filed: Jun. 15, 2022

(86) PCT No.: PCT/US2022/033676
§ 371 (c)(1),
(2) Date: Dec. 14, 2023

(87) PCT Pub. No.: WO2022/266255
PCT Pub. Date: Dec. 22, 2022

(65) Prior Publication Data
US 2024/0269804 A1     Aug. 15, 2024

Related U.S. Application Data

(60) Provisional application No. 63/210,837, filed on Jun. 15, 2021.

(51) Int. Cl.
*B25B 11/00*          (2006.01)
*B25J 9/00*           (2006.01)
(Continued)

(52) U.S. Cl.
CPC ........... *B25B 11/002* (2013.01); *B25J 9/0096* (2013.01); *B25J 9/1682* (2013.01); *B25J 15/0608* (2013.01)

(58) Field of Classification Search
CPC ..... B25B 11/002; B25J 9/0096; B25J 9/1682; B25J 15/0608; B25J 9/0084; B25J 15/009; H01F 7/0257
(Continued)

(56) References Cited

U.S. PATENT DOCUMENTS 3,273,931 A     9/1966   Caldwell et al.
4,399,718 A     8/1983   Zimmer
(Continued)

FOREIGN PATENT DOCUMENTS

AT            510494 A1      4/2012
CN        101559597 B       4/2011
(Continued)

OTHER PUBLICATIONS

The International Bureau of WIPO; International Preliminary Report on Patentability; International Application No. PCT/US2022/033676; 9 pages; dated Dec. 28, 2023.
(Continued)

*Primary Examiner* — B M M Hannan
(74) *Attorney, Agent, or Firm* — Faegre Drinker Biddle & Reath LLP

(57)          ABSTRACT

An end-of-arm tool and an associated fixture for clamping objects are disclosed. The end-of-arm tool and fixture may each have corresponding interfacing features, such that the end-of-arm tool may be located with respect to the feature. Such interfacing features may be used to clamp one or more objects between the tool and the fixture.

18 Claims, 35 Drawing Sheets

(51) Int. Cl.
  *B25J 9/16*          (2006.01)
  *B25J 15/06*         (2006.01)
(58) Field of Classification Search
  USPC .......................................................... 700/248
  See application file for complete search history.

(56)                References Cited

U.S. PATENT DOCUMENTS

| | | | |
|---|---|---|---|
| 4,563,031 A | 1/1986 | Kishimoto et al. | |
| 4,636,138 A | 1/1987 | Gorman | |
| 4,685,861 A | 8/1987 | Huetsch | |
| 4,995,493 A * | 2/1991 | Cotsman .............. | B25J 15/0491 |
| | | | 403/DIG. 1 |
| 5,100,284 A | 3/1992 | Boisseau | |
| 5,338,150 A | 8/1994 | Focke et al. | |
| 6,644,637 B1 | 11/2003 | Shen et al. | |
| 7,001,130 B2 | 2/2006 | Ransom | |
| 7,012,495 B2 | 3/2006 | Underwood et al. | |
| 7,860,610 B2 | 12/2010 | Waldmann et al. | |
| 8,083,277 B1 | 12/2011 | Benjamin et al. | |
| 8,371,631 B2 | 2/2013 | Lin | |
| 8,878,639 B2 | 11/2014 | Kocijan | |
| 9,174,317 B1 | 11/2015 | Lessway | |
| 9,579,770 B2 | 2/2017 | Pierednik et al. | |
| 10,011,023 B1 | 7/2018 | Lin et al. | |
| 10,464,218 B2 | 11/2019 | Golan et al. | |
| 10,625,953 B2 | 4/2020 | Hasegawa et al. | |
| 10,668,628 B2 | 6/2020 | Guo et al. | |
| 10,688,611 B2 | 6/2020 | Youngwerth et al. | |
| 10,836,046 B2 | 11/2020 | Brudniok et al. | |
| 10,903,030 B2 | 1/2021 | Morton et al. | |
| 10,953,552 B1 | 3/2021 | Dulla et al. | |
| 11,202,409 B1 | 12/2021 | Schroll et al. | |
| 12,202,132 B2 | 1/2025 | Junker | |
| 2003/0180135 A1 | 9/2003 | Sawdon et al. | |
| 2003/0220058 A1 | 11/2003 | Pollak et al. | |
| 2004/0130085 A1 | 7/2004 | Lim | |
| 2008/0145195 A1 | 6/2008 | Sacerdoti et al. | |
| 2008/0168639 A1 | 7/2008 | Otake et al. | |
| 2008/0174296 A1 | 7/2008 | Georgeson et al. | |
| 2009/0194922 A1 | 8/2009 | Lin et al. | |
| 2010/0156126 A1 | 6/2010 | Trachet et al. | |
| 2012/0263519 A1 | 10/2012 | Kotula et al. | |
| 2012/0290134 A1 | 11/2012 | Zhao et al. | |
| 2015/0035632 A1 | 2/2015 | Sarh et al. | |
| 2015/0239092 A1 | 8/2015 | Pierednik et al. | |
| 2016/0237993 A1 | 8/2016 | Bosch et al. | |
| 2017/0334075 A1 | 11/2017 | Eidelberg et al. | |
| 2018/0311795 A1 | 11/2018 | Morton et al. | |
| 2019/0001485 A1 | 1/2019 | Maruno | |
| 2019/0039838 A1 | 2/2019 | Curhan et al. | |
| 2019/0255700 A1 | 8/2019 | Nose et al. | |
| 2019/0255713 A1 | 8/2019 | Churchill | |
| 2019/0261565 A1 | 8/2019 | Robertson et al. | |
| 2020/0047333 A1 | 2/2020 | Wiktor | |
| 2020/0156246 A1 | 5/2020 | Srivastav | |
| 2020/0171650 A1 | 6/2020 | Hallock et al. | |
| 2020/0262057 A1 * | 8/2020 | Saez ...................... | B25J 9/0084 |
| 2020/0315738 A1 | 10/2020 | Dewaele et al. | |
| 2021/0031317 A1 | 2/2021 | Morton et al. | |
| 2021/0068909 A1 | 3/2021 | Eyre et al. | |
| 2021/0107137 A1 | 4/2021 | Ohige et al. | |
| 2021/0162610 A1 | 6/2021 | Kieffer et al. | |
| 2021/0213629 A1 | 7/2021 | Frey et al. | |
| 2021/0268615 A1 * | 9/2021 | Morton ................. | B25B 11/002 |
| 2021/0363800 A1 * | 11/2021 | Dittel ................... | B62D 65/026 |
| 2024/0087784 A1 | 3/2024 | Morton | |
| 2024/0269861 A1 | 8/2024 | Morton et al. | |
| 2025/0065514 A1 | 2/2025 | Maltchev et al. | |

FOREIGN PATENT DOCUMENTS

| | | | |
|---|---|---|---|
| CN | 110171015 A | 8/2019 | |
| DE | 102004014850 A1 | 11/2005 | |
| EP | 1110680 A1 | 6/2001 | |
| EP | 3733108 A1 | 11/2020 | |
| FR | 2668084 A1 | 4/1992 | |
| GB | 2143498 A | 2/1985 | |
| GB | 2146406 A | 4/1985 | |
| GB | 2566994 A | 4/2019 | |
| JP | 07-206211 A | 8/1995 | |
| JP | 2000-218675 A | 8/2000 | |
| JP | 2001-205678 A | 7/2001 | |
| JP | 2004-195637 A | 7/2004 | |
| JP | 3111190 U | 7/2005 | |
| JP | 4101789 B2 | 6/2008 | |
| JP | 2008-535670 A | 9/2008 | |
| JP | 2010-158739 A | 7/2010 | |
| JP | 2014-511282 A | 5/2014 | |
| JP | 2018-176313 A | 11/2018 | |
| JP | 2019-005869 A | 1/2019 | |
| JP | 2020-089932 A | 6/2020 | |
| KR | 20150049224 A | 5/2015 | |
| WO | 2012/098347 A1 | 7/2012 | |
| WO | 2016148321 A1 | 9/2016 | |
| WO | 2016/185927 A1 | 11/2016 | |
| WO | 2016/198867 A1 | 12/2016 | |
| WO | 2019/128494 A1 | 7/2019 | |
| WO | 2020/086791 A1 | 4/2020 | |
| WO | 2020/198857 A1 | 10/2020 | |
| WO | 2021/046479 A1 | 3/2021 | |
| WO | 2021/115736 A1 | 6/2021 | |
| WO | 2021/116990 A1 | 6/2021 | |
| WO | 2022/023131 A1 | 2/2022 | |
| WO | 2022/261520 A1 | 12/2022 | |
| WO | 2022/266255 A1 | 12/2022 | |
| WO | 2025/106673 A1 | 5/2025 | |

OTHER PUBLICATIONS

United States Patent and Trademark Office; International Search Report and Written Opinion; International Application No. PCT/US2022/033676; 15 pages; dated Sep. 28, 2022.
Destaco; Bodybuilder End Effector; destaco.com; Sep. 19, 2020.
European Search Report for EP Patent Application No. 22821172.8, Issued on Feb. 10, 2025, 11 pages.
European Search Report for EP Patent Application No. 22825772.1, Issued on Jan. 22, 2025, 9 pages.
Gimatic USA; Gimatic Cobot KIT-UR-V for Universal Robots; gimaticusa.com; Apr. 1, 2019.
International Search Report and Written Opinion received for PCT Patent Application No. PCT/US2022/033676, mailed on Sep. 28, 2022, 14 pages.
Pisco; Vacuum EOAT Kit; pisco.com; Aug. 7, 2020.
U.S. Appl. No. 63/194,692, filed May 28, 2021 (47 pages).

* cited by examiner

SWITCHABLE
MAGNETIC
FLUX SOURCE

COMPONENT HANDLING SYSTEMS AND METHODS

RELATED APPLICATION

This application is a national stage application of PCT International Application No. PCT/US2022/033676, filed Jun. 15, 2022, titled COMPONENT HANDLING SYSTEMS AND METHODS, which claims the benefit of U.S. Provisional Application No. 63/210,837, filed Jun. 15, 2021, titled MAGNETIC TOOLING AND ASSOCIATED FIXTURES, the entire disclosures of which are expressly incorporated by reference herein.

BACKGROUND

A jig or fixture may be used to hold a set of objects, for example for welding during manufacturing. However, clamping mechanisms provided by the fixture may introduce complexity and expense to part handling and fixturing tasks, among other detriments.

It is with respect to these and other general considerations that embodiments have been described. Also, although relatively specific problems have been discussed, it should be understood that the embodiments should not be limited to solving the specific problems identified in the background.

SUMMARY

In an exemplary embodiment of the present disclosure, a system comprising a fixture and an end-of-arm tool (EOAT) is provided. The fixture comprises a first interfacing feature and a second interfacing feature. The EOAT comprises a third interfacing feature corresponding to the first interfacing feature of the fixture and a fourth interfacing feature corresponding to the second interfacing feature of the fixture. In an example, the first interfacing feature is a locator and the third interfacing feature is a plate configured to receive the locator of the first interfacing feature. In another example, the first interfacing feature further comprises a magnetic gripper and the plate configured to receive the locator is ferromagnetic. In a further example, the second interfacing feature is a magnetic gripper and the fourth interfacing feature is a ferromagnetic plate. In an example, the first interfacing feature is a first magnetic gripper and the third interfacing feature is a second magnetic gripper. In yet another example, the fixture and the EOAT are configured to retain an object when the first interfacing feature of the fixture interfaces with the third interfacing feature of the EOAT and the second interfacing feature of the fixture interfaces with the fourth interfacing feature of the EOAT. In a further still example, the system further comprises a tool operable to interact with the object retained by the fixture and the EOAT. In an example, the third interfacing feature and the fourth interfacing feature are configured to receive power from a robot to which the EOAT is coupled. In another example, the third interfacing feature and the fourth interfacing feature are configured to receive power from the fixture when the EOAT is in a configuration to retain an object.

In another exemplary embodiment of the present disclosure, a system for holding at least one assembly of parts is provided. The system comprising: a fixture including a frame and a first interfacing feature; and an end-of-arm-tool (EOAT) including a frame and a second interfacing feature. The fixture and the EOAT cooperating to hold the at least one assembly of parts by coupling the EOAT to the fixture through a magnetic interaction between the first interfacing feature of the fixture and the second interfacing feature of the EOAT.

In an example thereof, the first interfacing feature of the fixture and the second interfacing feature of the EOAT cooperate to both position and orient the EOAT relative to the fixture.

In another example thereof, the first interfacing feature is one of a first plurality of interfacing features of the fixture and the second interfacing feature is one of a second plurality of interfacing features of the EOAT and the first plurality of interfacing features of the fixture and the second plurality of cooperate to both position and orient the EOAT relative to the fixture.

In a further example thereof, the magnetic interaction between the first interfacing feature of the fixture and the first interfacing feature of the EOAT is established due to contact between the first interfacing feature of the fixture and the second interfacing feature of the EOAT independent of the at least one assembly of parts. In a variation thereof, the at least one assembly of parts defines an ultimate outer perimeter and the first interfacing feature of the fixture and the second interfacing feature of the EOAT are both positioned to be within the ultimate outer perimeter of the at least one assembly of parts. In another variation thereof, the at least one assembly of parts defines an ultimate outer perimeter and the first interfacing feature of the fixture and the second interfacing feature of the EOAT are both positioned to be outboard of the ultimate outer perimeter of the at least one assembly of parts.

In still another example thereof, the first interfacing feature of the fixture and the second interfacing feature of the EOAT are spaced apart and the magnetic interaction between the first interfacing feature of the fixture and the second interfacing feature of the EOAT is established through the at least one assembly of parts.

In still a further example thereof, one of the first interfacing feature of the fixture and the second interfacing feature of the EOAT includes a locator pin and the other of the first interfacing feature of the fixture and the second interfacing feature of the EOAT includes a recess which receives the locator pin of the one of the first interfacing feature of the fixture and the second interfacing feature of the EOAT.

In yet still a further example thereof, the fixture includes a third interfacing feature and the end-of-arm-tool (EOAT) includes a fourth interfacing feature, the fixture and the EOAT cooperating to hold the at least one assembly of parts by a magnetic interaction between the third interfacing feature of the fixture and the fourth interfacing feature of the EOAT. In a variation thereof, the fixture includes a fifth interfacing feature and the end-of-arm-tool (EOAT) includes a sixth interfacing feature, the fixture and the EOAT cooperating to hold the at least one assembly of parts by a magnetic interaction between the fifth interfacing feature of the fixture and the sixth interfacing feature of the EOAT.

In a further still example thereof, the EOAT includes a plurality of grippers coupled to the frame and positioned hold at least a portion of the at least one assembly of parts to the EOAT when the EOAT is spaced apart from the fixture, a first gripper of the plurality of grippers is adapted to hold the portion of the at least one assembly of parts to the EOAT through a first interaction with the at least one assembly of parts. In a variation thereof, when the EOAT is coupled to the fixture through the magnetic interaction between the first interfacing feature of the fixture and the second interfacing feature of the EOAT, the first gripper of the plurality of grippers is adapted to hold the portion of the at least one assembly of parts to the EOAT through a second interaction with the portion of the at least one assembly of parts. In another variation thereof, the first gripper is a magnetic gripper and the first interaction is a magnetic interaction between the first gripper and the portion of the at least one assembly of parts and the second interaction is a clamping of the portion of the at least one assembly of parts between the first gripper and the fixture. In a further variation thereof, each of the plurality of grippers are single side grippers which are adapted to directly contact a single side of the portion of the at least one assembly of parts. In still another variation thereof, at least one of the plurality of grippers is a double side gripper which is adapted to directly contact both sides the portion of the at one assembly of parts. In yet still another variation thereof, each of the plurality of grippers are positioned to be within an ultimate outer envelope of the portion of the at one assembly of parts.

In a further yet example thereof, the fixture is supported on a base. In a variation thereof, the fixture is stationary.

In yet still another example thereof, the fixture is a second EOAT, the EOAT is adapted to be coupled to a first robot for movement by the first robot and the fixture is adapted to be coupled to a second robot for movement by the second robot.

In a further exemplary embodiment of the present disclosure, a system is provided. The system comprising a fixture and an end-of-arm tool (EOAT). The fixture comprising: a first interfacing feature; and a second interfacing feature. The an end-of-arm tool (EOAT) comprising: a third interfacing feature corresponding to the first interfacing feature of the fixture; and a fourth interfacing feature corresponding to the second interfacing feature of the fixture.

In an example thereof, the first interfacing feature is a locator and the third interfacing feature is a plate configured to receive the locator of the first interfacing feature. In a variation thereof, the first interfacing feature further comprises a magnetic gripper and the plate configured to receive the locator is ferromagnetic.

In another example thereof, the second interfacing feature is a magnetic gripper and the fourth interfacing feature is a ferromagnetic plate.

In a further example thereof, the first interfacing feature is a first magnetic gripper and the third interfacing feature is a second magnetic gripper.

In yet another example thereof, the fixture and the EOAT are configured to retain an object when: the first interfacing feature of the fixture interfaces with the third interfacing feature of the EOAT; and the second interfacing feature of the fixture interfaces with the fourth interfacing feature of the EOAT. In a variation thereof, the system further comprising a tool operable to interact with the object retained by the fixture and the EOAT.

In still another example thereof, the third interfacing feature and the fourth interfacing feature are configured to receive power from a robot to which the EOAT is coupled. In a variation thereof, the third interfacing feature and the fourth interfacing feature are configured to receive power from the fixture when the EOAT is in a configuration to retain an object.

In yet another exemplary embodiment of the present disclosure, a method of performing a manufacturing operation on at least one assembly of parts is provided. The method comprising the steps of: coupling at least a portion of the at least one assembly of parts to an end-of-arm-tool (EOAT) of a robot with at least one gripper; transporting the portion of the at least one assembly of the parts to a fixture;

coupling the EOAT to the fixture to hold the at least one assembly of parts with the fixture and the EOAT; and performing the manufacturing operation on the at least one assembly of parts while the at least one assembly of parts is being held by the fixture and the EOAT. In a variation thereof, the at least one gripper includes a first magnetic gripper and the step of transporting the portion of the at least one assembly of the parts to the fixture includes the steps of: configuring the first gripper to have a first magnetic strength relative to the at least one assembly of parts while the portion of the at least one assembly of parts is a first distance from the fixture; and configuring the first gripper to have a second magnetic strength relative to the at least one assembly of parts while the portion of the at least one assembly of parts is a second distance from the fixture, the second magnetic strength being less than the first magnetic strength and the second distance being less than the first distance. In another variation thereof, subsequent to the step of coupling the EOAT to the fixture to hold the at least one assembly of parts with the fixture and the EOAT, the method further comprising the step of configuring the first gripper to have a third magnetic strength relative to the at least one assembly of parts, the third magnetic strength being less than the second magnetic strength. In a further variation thereof, subsequent to the step of performing the manufacturing operation on the at least one assembly of parts while the at least one assembly of parts is being held by the fixture and the EOAT, the method further comprising the step of configuring the first gripper to have a fourth magnetic strength relative to the at least one assembly of parts, the fourth magnetic strength being at least equal to the second magnetic strength. In still a further variation thereof, the fourth magnetic strength is greater than the second magnetic strength.

In yet another example thereof, the portion of the at least one assembly of parts is the whole of the at least one assembly of parts.

In still another example thereof, a second portion of the at least one assembly of parts is positioned on the fixture prior to the step of coupling the EOAT to the fixture.

In yet still another example, the method further comprises the step of: decoupling the robot from the EOAT prior to the step of performing the manufacturing operation.

In a further still example thereof, the step of coupling at least the portion of the at least one assembly of parts to an end-of-arm-tool (EOAT) of a robot with the at least one gripper includes the steps of: contacting the portion of the at least one assembly of parts with the at least one gripper; providing power to the at least one gripper from the robot; generating at least one magnetic circuit between the at least one gripper and the portion of the at least one assembly of parts. In a variation thereof, the power is at least one of electric power, pneumatic power, and hydraulic power.

In still a further example thereof, the step of coupling the EOAT to the fixture to hold the at least one assembly of parts with the fixture and the EOAT includes the steps of: providing at least one magnetic coupling device on the fixture; providing power to the at least one magnetic coupling device on the fixture independent of the EOAT; generating at least one magnetic circuit between the at least one magnetic coupling device and the EOAT. In a variation thereof, the power is at least one of electric power, pneumatic power, and hydraulic power. In another variation thereof, the at least one magnetic circuit between the at least one magnetic coupling device and the EOAT passes through the at least one assembly of parts. In a further variation thereof, the at least one magnetic circuit between the at least one magnetic coupling device and the EOAT is independent of the at least one assembly of parts.

In still yet another exemplary embodiment of the present disclosure, a method of performing a manufacturing operation on at least one assembly of parts is provided. The method comprising the steps of: coupling at least a portion of the at least one assembly of parts to an end-of-arm-tool (EOAT) of a robot with a plurality of grippers, a first gripper of the plurality of grippers holds the portion of the at least one assembly of parts to the EOAT through a first interaction with the portion of the at least one assembly of parts; transporting the portion of the at least one assembly of the parts to a fixture; coupling the EOAT to the fixture to hold the at least one assembly of parts with the fixture and the EOAT through the steps of: magnetically coupling a first interfacing feature of the fixture with a second interfacing feature of the EOAT; and holding the portion of the at least one assembly of the parts to the EOAT with a second interaction of the first gripper with the portion of the at least one assembly of parts. The method further comprising performing the manufacturing operation on the at least one assembly of parts while the at least one assembly of parts is being held by the fixture and the EOAT.

In an example thereof, the first gripper is a magnetic gripper and the first interaction is a magnetic interaction between the first gripper and the portion of the at least one assembly of parts and the second interaction is a clamping of the portion of the at least one assembly of parts between the first gripper and the fixture.

In another example thereof, the fixture is supported on a base.

In a further example thereof, the fixture is stationary.

In still another example thereof, the fixture is a second EOAT, the EOAT is adapted to be coupled to a first robot for movement by the first robot and the fixture is adapted to be coupled to a second robot for movement by the second robot.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 12 illustrates a top view of the plurality of representative parts of FIG. 12 with the exemplary EOAT coupled from the exemplary fixture;

DETAILED DESCRIPTION

Figure 1:
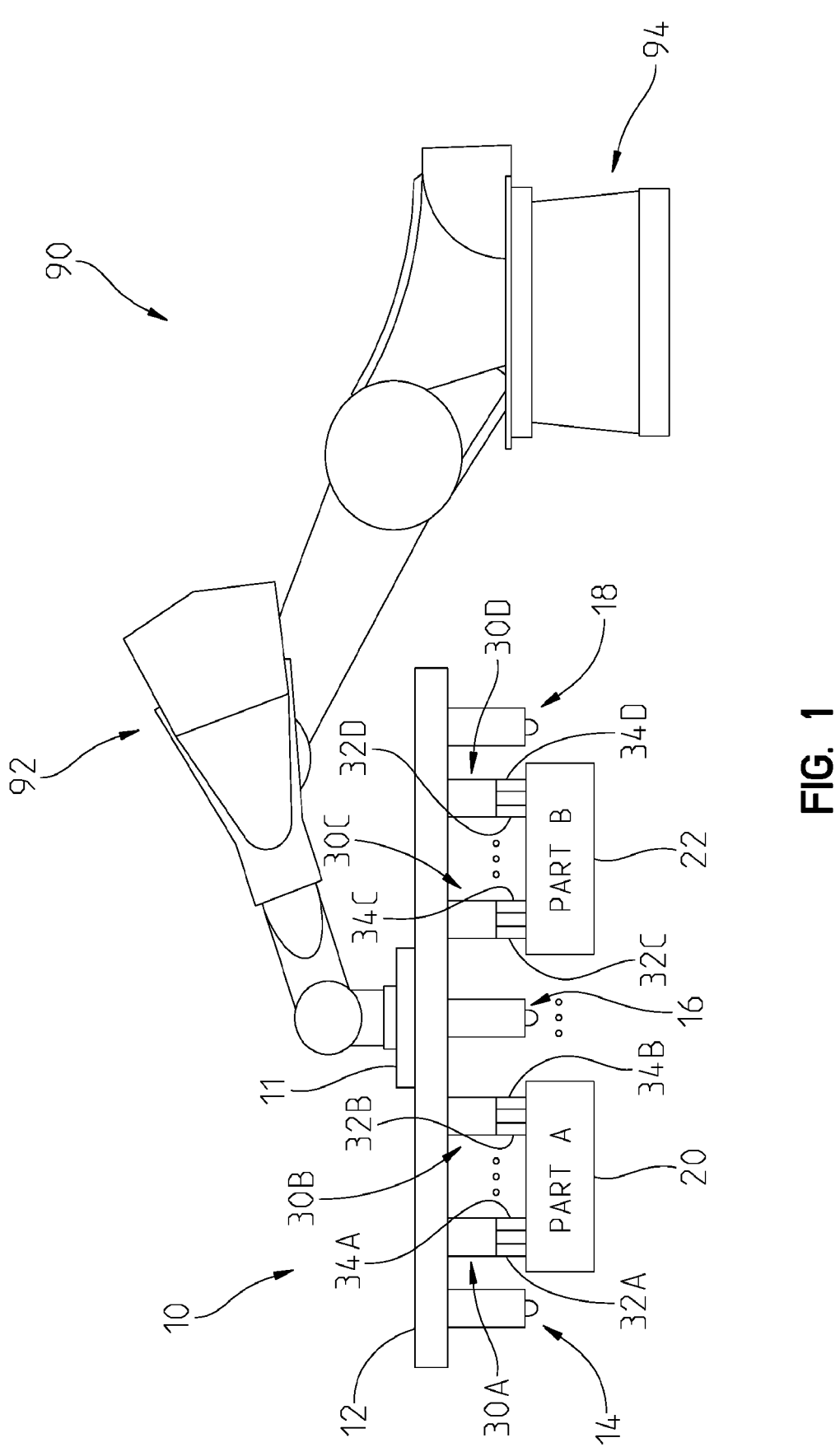
FIG. 1 illustrates a representative view of a robot having an end-of-arm-tool (EOAT) attached to an end of the arm and including a plurality of grippers to secure at least one part to the EOAT and a plurality of interfacing features.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. The following detailed description is therefore not to be taken in a limiting sense, and the scope of the present disclosure is defined by the appended claims and their equivalents.

End-of-arm tools (EOATs) and fixtures may be used to manipulate and support objects, for example as part of a manufacturing process. As an example, an EOAT may be coupled to a robot and used to hold an object or to move an object to a fixture, at which point the object may be supported by the fixture. Example robots include industrial robots having a plurality of links moveably coupled together to alter a position of an end of the robot in space and hence the position of the EOAT. In examples, an EOAT may be used to place a set of objects in a fixture according to a certain arrangement. For example, the objects may be adjacent to one another or "married," at which point the fixture may clamp the objects and the objects may be welded together.

However, clamping by a fixture may introduce additional complexity, as each clamp may contact the part from two opposing sides. As a result, fixtures may exhibit additional mechanical complexity and increased size, resulting in added cost, space utilization, and energy consumption, among other detriments. Further, welding the objects together or using any of a variety of other tools while the objects are retained by the fixture may be difficult, as such tools need to follow a path that ensures they do not collide with the clamps or other parts of the fixture. The resulting toolpath may be longer and more complex, and may therefore introduce additional time into the manufacturing process.

Accordingly, aspects of the present disclosure relate to a magnetic EOAT and associated fixtures. As an example, an EOAT may comprise one or more grippers, pin clamps, clamps, and locators to interact with an object. Exemplary locators include pins (e.g., a 2-way locating pin or a 4-way locating pin) and other locating features. Example grippers include suction cup grippers and magnetic grippers.

Magnetic grippers are used with ferromagnetic objects and generally include pole shoes as the respective interface with the object and a magnetic flux source which supplies a magnetic flux at the surface of the pole shoes to create a magnetic circuit through the pole shoes and the object. Exemplary magnetic flux sources include electromagnets, electro-permanent magnets, rare earth permanent magnets, other suitable magnets, and combinations thereof. Exemplary magnetic grippers are disclosed in U.S. Pat. Nos. 7,012,495, 8,878,639, 10,903,030; U.S. Published Patent Application Nos. US20180311795 and US20210031317; U.S. Provisional Patent Application No. 63/194,692; and Published PCT Application No. WO2020086791A1, the entire disclosures of which are expressly incorporated by reference herein. Examples of magnetic grippers, also referred to as magnetic coupling devices are described herein in relation to FIGS. 32-41.

Referring to FIG. 1, a robot 90 having an arm 92 supported by a base 94 is shown. Attached to the end of arm 92 is an end-of-arm-tool (EOAT) 10. EOAT 10 includes an interface 11 which attaches to the end of arm 92 of robot 90.

EOAT 10 includes a frame 12, a plurality of interfacing features, illustratively a first interfacing feature 14, a second interfacing feature 16, and a third interfacing feature 18, coupled to the frame 12. Each of first interfacing feature 14, second interfacing feature 16, and third interfacing feature 18 interface with corresponding interfacing features on a fixture 50 (see FIG. 3) which includes a frame 52 and a plurality of interfacing features, illustratively a first interfacing feature 54 which interfaces with first interfacing feature 14 of EOAT 10, a second interfacing feature 56 which interfaces with second interfacing feature 16 of EOAT 10, and a interfacing feature 58 which interfaces with third interfacing feature 18 of EOAT 10. As explained herein in more detail the plurality of interface features of EOAT 10 and the plurality of interface features of fixture 50 position and orient EOAT 10 relative to fixture 50 and hold EOAT 10 relative to fixture 50. EOAT 10 is held relative to fixture 50 due to one or more of the plurality of interface features of EOAT 10 and the plurality of interface features of fixture 50 being a magnetic gripper or other device that may be actuated to hold EOAT 10 relative to fixture 50. Each of first interfacing feature 14, second interfacing feature 16, and third interfacing feature 18 are shown to include a locator pin which is received in a corresponding recess of first interfacing feature 54, second interfacing feature 56, and interfacing feature 58 (see FIG. 4).

In embodiments, one or more of first interfacing feature 14, second interfacing feature 16, and third interfacing feature 18 includes a recess to receive a locator pin on the corresponding one of first interfacing feature 54, second interfacing feature 56, and interfacing feature 58. Further, one or more of first interfacing feature 14, second interfacing feature 16, and third interfacing feature 18, first interfacing feature 54, second interfacing feature 56, and interfacing feature 58 may include a magnetic gripper or other securement device to hold EOAT 10 relative to fixture 50. Although three interfacing features are shown for each of EOAT 10 and fixture 50, in embodiments, each of EOAT 10 and fixture 50 may contain more or less interfacing features. As described herein, it is contemplated to have a single interfacing feature which positions and orients EOAT 10 relative to fixture 50 and secures EOAT 10 to fixture 50 (see FIG. 42).

As shown in FIG. 1, EOAT 10 is holding a first part 20 and a second part 22 with a plurality of magnetic grippers 30A-D. Illustratively, two magnetic grippers 30 are holding each part 20, 22. In embodiments, more of less magnetic grippers may be used to hold a respective part. Although first part 20 and second part 22 are illustrated as individual parts, each may be an assembly of multiple parts.

Figure 2:
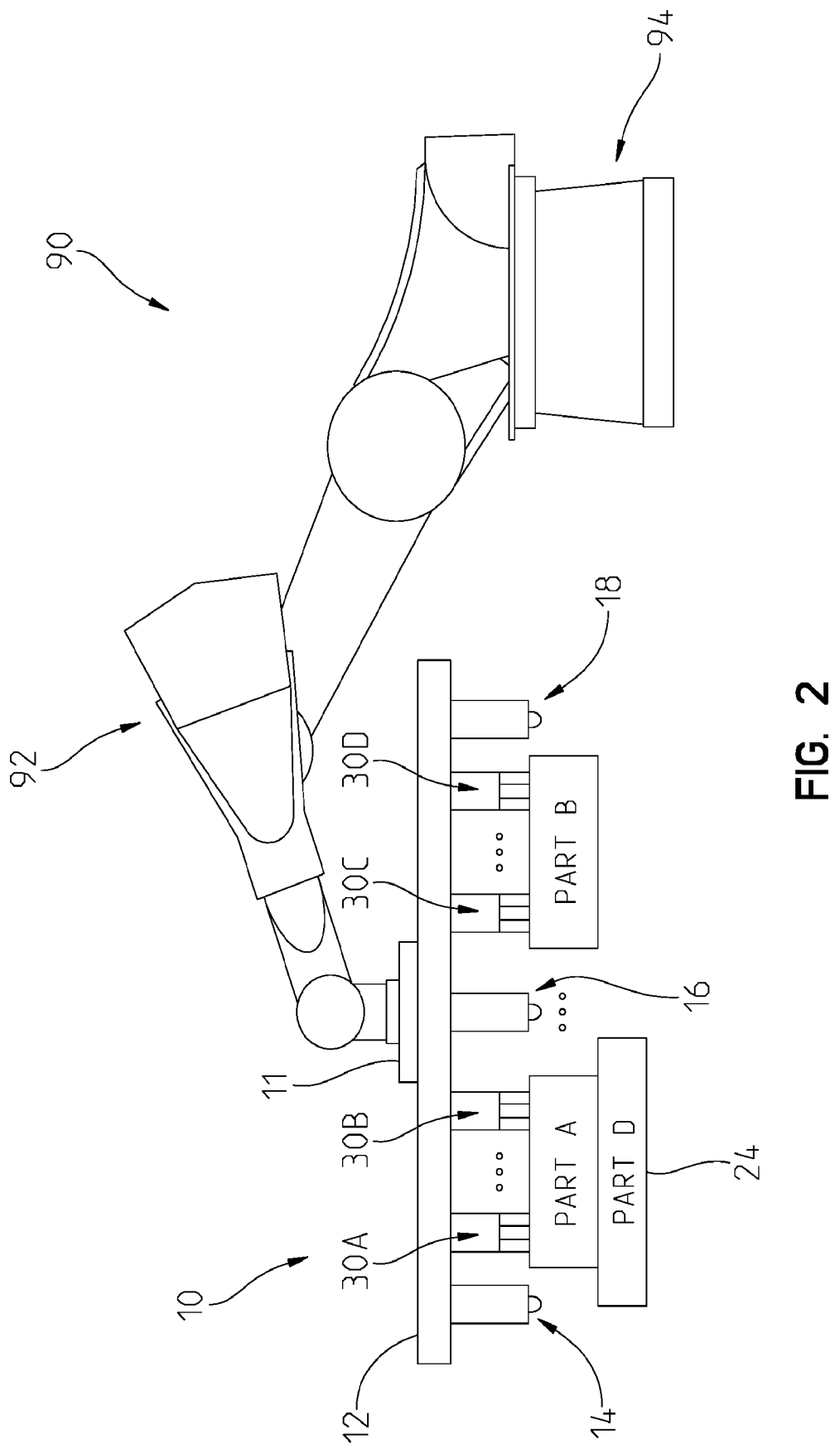
FIG. 2 illustrates a representative view of the robot and EOAT assembly of FIG. 1 with a plurality of parts coupled to a first number of the plurality of grippers.

Exemplary magnetic grippers which may be used as magnetic grippers 30 are disclosed herein. In general, magnetic grippers 30 each include a switchable magnetic flux source (not shown) and at least a pair of pole shoes, first pole shoe 32 and second pole shoe 34 illustrated. In embodiments, the pole shoes described throughout this application are separate components mounted to a housing, either directly or indirectly, including the switchable magnet flux source. In embodiments, the pole shoes described throughout this application are part of the housing including the switchable magnet flux source. The switchable magnetic flux source is switchable between an ON state wherein a magnetic circuit is formed by the switchable magnetic flux source, the associated pole shoes 32, 34, and the respective part 20, 22 and an OFF state wherein a magnetic circuit sufficient to hold the respective part 20, 22 to EOAT 10 is not formed between the magnetic gripper 30 and the respective part 20, 22. FIG. 2 illustrates a third part 24 which is also held by EOAT 10 with magnetic gripper 30A and magnetic gripper 30B through first part 20.

In the examples, first part 20, second part 22, and third part 24 are each ferromagnetic parts and can thus be held by magnetic grippers 30. In embodiments, one or more of magnetic grippers 30 may be replaced with other types of grippers, such as suction grippers, pin clamps, or other suitable devices to hold the respective parts to EOAT 10. Non-magnetic grippers may be used also with non-ferromagnetic parts. Further, magnetic grippers may be used with non-ferromagnetic parts if a ferromagnetic component, such as another part, is positioned behind the non-ferromagnetic part and then the magnetic circuit is formed between the magnetic gripper and the ferromagnetic component.

Figure 4:
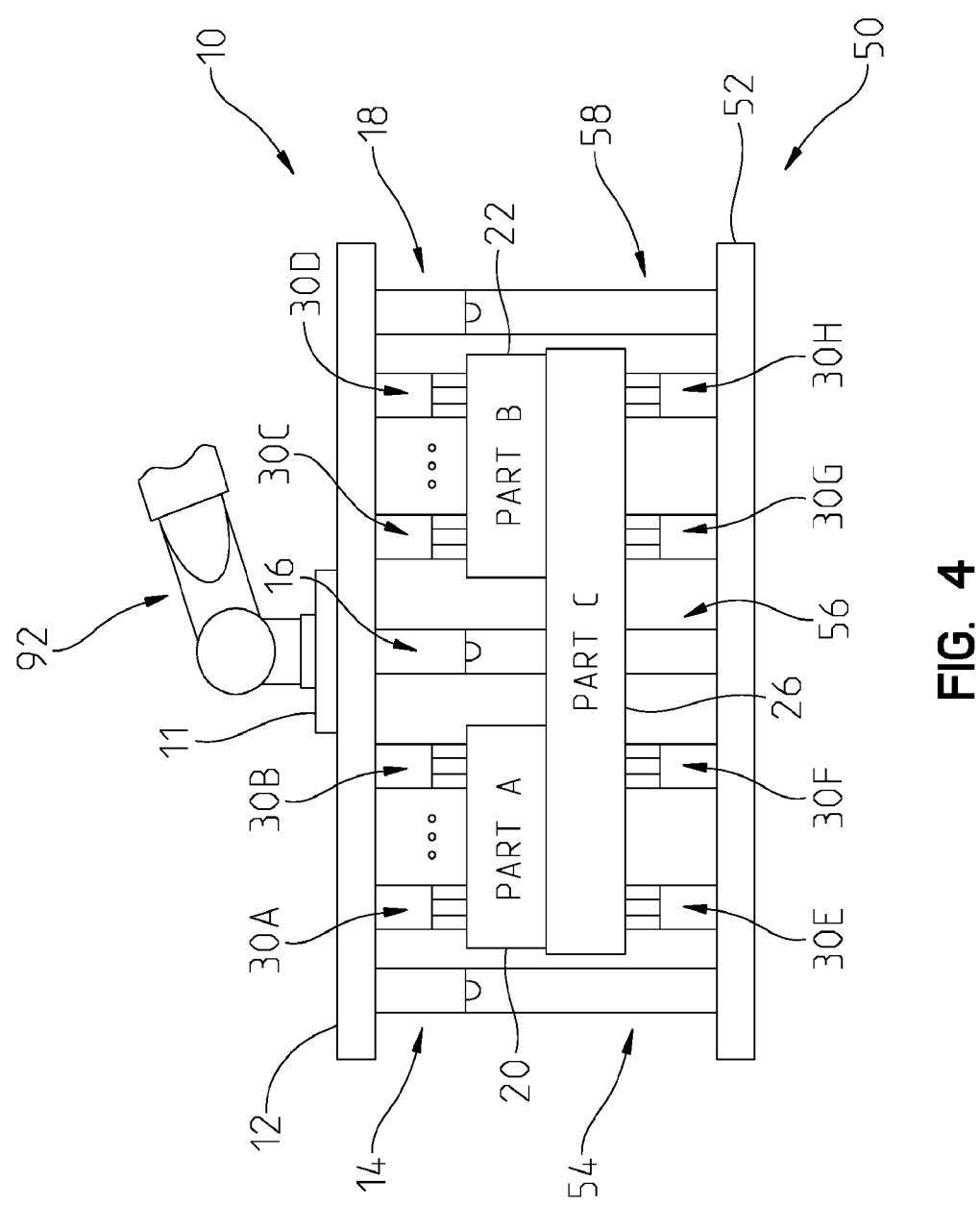
FIG. 4 illustrates the arrangement of FIG. 3 wherein the plurality of interfacing features of the fixture and the plurality of interfacing features of the EOAT cooperate to hold the assembly of parts.
Figure 5:
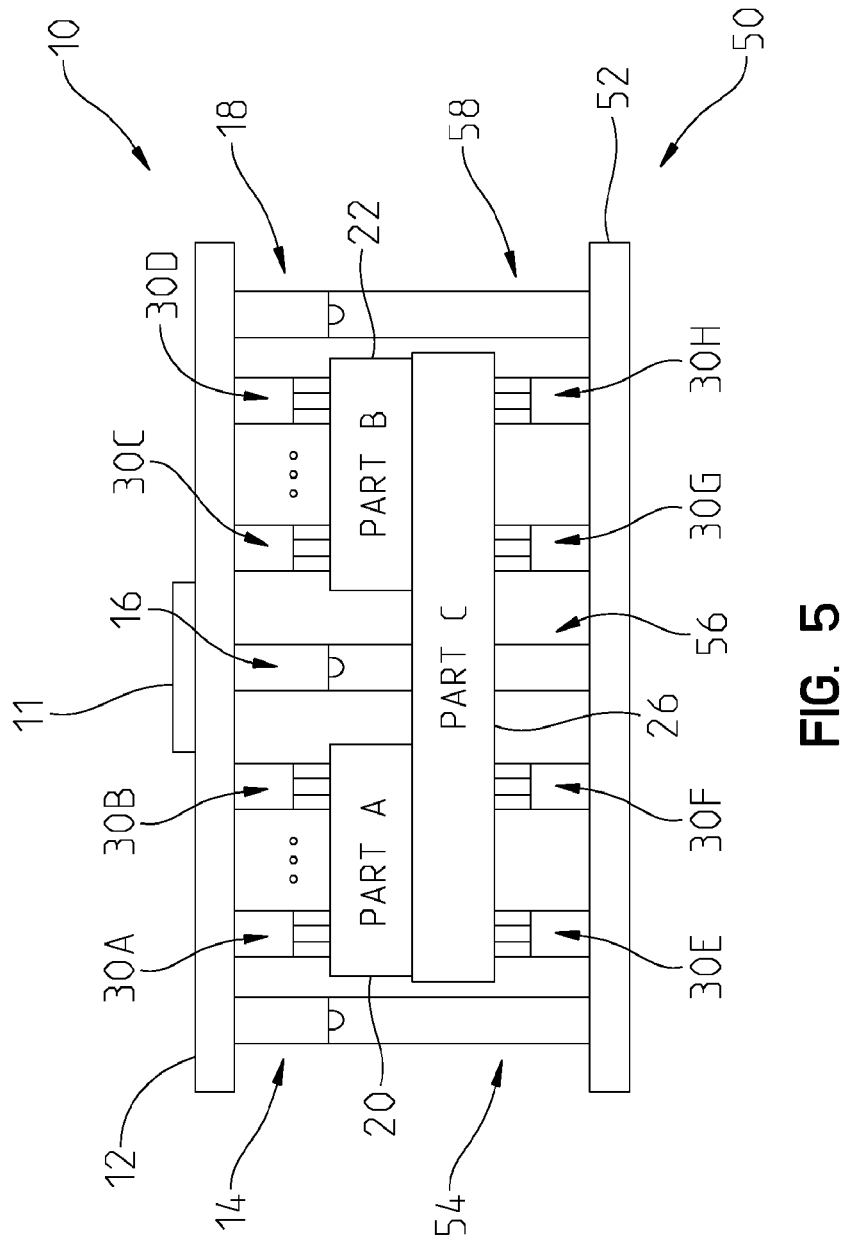
FIG. 5 illustrates the arrangement of FIG. 4 with the robot decoupled from the EOAT.

As shown in FIG. 1, each of first interfacing feature 14, second interfacing feature 16, and third interfacing feature 18 are outside of an ultimate outer perimeter of first part 20 and second part 22 and connect directly with the corresponding one of first interfacing feature 54, second interfacing feature 56, and interfacing feature 58 (see FIGS. 4 and 5). In embodiments, one or more of first interfacing feature 14, second interfacing feature 16, and third interfacing feature 18 are within the ultimate outer perimeter of one of first part 20 and second part 22 and connects directly with the corresponding one of first interfacing feature 54, second interfacing feature 56, and interfacing feature 58 through an opening in the respective one of first part 20 and second part 22. In embodiments, one or more of first interfacing feature 14, second interfacing feature 16, and third interfacing feature 18 are within the ultimate outer perimeter of one of first part 20 and second part 22 and connects with the corresponding one of first interfacing feature 54, second interfacing feature 56, and interfacing feature 58 through the respective one of first part 20 and second part 22, the connection may be a magnetic connection with a magnetic gripper provided as at least part of one or more of first interfacing feature 14, second interfacing feature 16, third interfacing feature 18, first interfacing feature 54, second interfacing feature 56, and interfacing feature 58. In embodiments, one or more of first interfacing feature 14, second interfacing feature 16, and third interfacing feature 18 are within the ultimate outer perimeter of one of first part 20 and second part 22 and connects through a first connection with the corresponding one of first interfacing feature 54, second interfacing feature 56, and interfacing feature 58 through the respective one of first part 20 and second part 22, the connection may be a magnetic connection with a magnetic gripper provided as at least part of one or more of first interfacing feature 14, second interfacing feature 16, third interfacing feature 18, first interfacing feature 54, second interfacing feature 56, and interfacing feature 58 and connects through a second connection with the corresponding one of first interfacing feature 54, second interfacing feature 56, and interfacing feature 58 through an opening in the respective one of first part 20 and second part 22.

Figure 3:
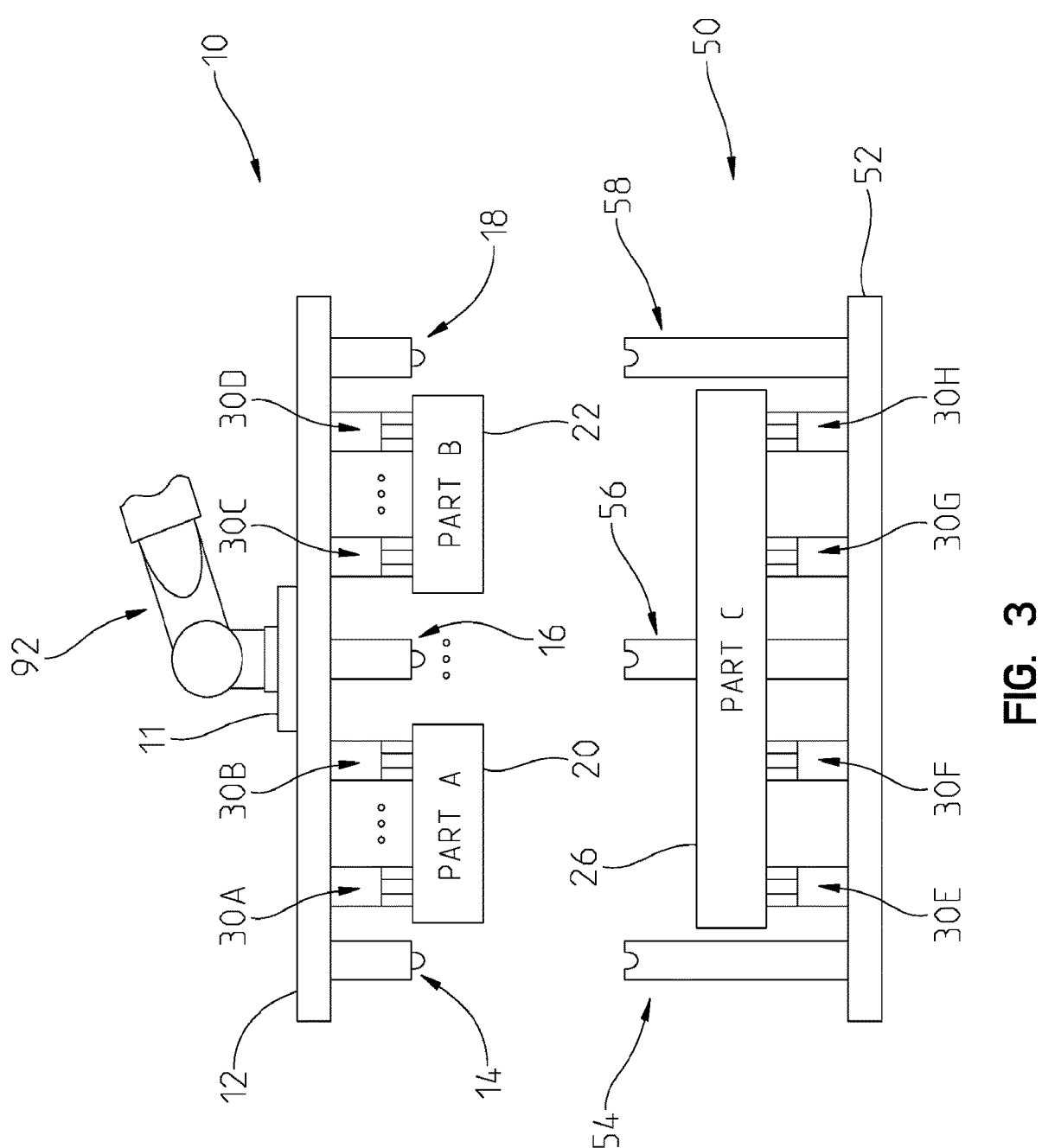
FIG. 3 illustrates a representative view of the robot and EOAT assembly of FIG. 1 approaching a fixture supporting at least one part and a plurality of interfacing features which interface with the plurality of interfacing features of the EOAT.

As shown in FIG. 3, fixture 50 is holding a fourth part 26 with a plurality of magnetic grippers 30E-H. Illustratively, four magnetic grippers 30 are holding fourth part 26. In embodiments, more or less magnetic grippers may be used to hold a respective part. Although fourth part 26 is illustrated as an individual part, it may be an assembly of multiple parts.

In the examples, fourth part 26 is a ferromagnetic part and can thus be held by magnetic grippers 30. In embodiments, one or more of magnetic grippers 30 may be replaced with other types of grippers, such as suction grippers, pin clamps, or other suitable devices to hold the respective parts to fixture 50. Non-magnetic grippers may be used also with non-ferromagnetic parts.

The position and orientation of fourth part 26 on fixture 50 is set so that when EOAT 10 is coupled to fixture 50 through first interfacing feature 14, second interfacing feature 16, third interfacing feature 18, first interfacing feature 54, second interfacing feature 56, and interfacing feature 58 first part 20 and second part 22 are positioned relative to fourth part 26 to perform further manufacturing operations, such as welding. In embodiments, fixture 50 does not have a part 26 held thereon as EOAT 10 approaches with first part 20 and second part 22. Although one part, fourth part 26 is shown on fixture 50, and two parts 20 and 22 are shown on EOAT 10, it should be appreciated that any number of parts or assemblies of parts may be used with EOAT 10 and/or fixture 50 including the absence of any parts.

As shown in FIG. 3, each of first interfacing feature 54, second interfacing feature 56, and interfacing feature 58 are outside of an ultimate outer perimeter of fourth part 26 (interfacing feature 56 is shown overlapping with fourth part 26, but is completely behind fourth part 26) and connect directly with the corresponding one of first interfacing feature 14, second interfacing feature 16, and third interfacing feature 18 (see FIGS. 4 and 5). In embodiments, one or more of first interfacing feature 54, second interfacing feature 56, and interfacing feature 58 are within the ultimate outer perimeter of fourth part 26 and connects directly with the corresponding one of first interfacing feature 14, second interfacing feature 16, and third interfacing feature 18 through an opening in fourth part 26. In embodiments, one or more of first interfacing feature 54, second interfacing feature 56, and interfacing feature 58 are within the ultimate outer perimeter of fourth part 26 and connects with the corresponding one of first interfacing feature 14, second interfacing feature 16, and third interfacing feature 18 through fourth part 26, the connection may be a magnetic connection with a magnetic gripper provided as at least part of one or more of first interfacing feature 14, second interfacing feature 16, third interfacing feature 18, first interfacing feature 54, second interfacing feature 56, and interfacing feature 58. In embodiments, one or more of first interfacing feature 54, second interfacing feature 56, and interfacing feature 58 are within the ultimate outer perimeter of fourth part 26 and connects through a first connection with the corresponding one of first interfacing feature 14, second interfacing feature 16, and third interfacing feature 18 through fourth part 26, the connection may be a magnetic connection with a magnetic gripper provided as at least part of one or more of first interfacing feature 14, second interfacing feature 16, third interfacing feature 18, first interfacing feature 54, second interfacing feature 56, and interfacing feature 58 and connects through a second connection with the corresponding one of first interfacing feature 14, second interfacing feature 16, and third interfacing feature 18 through an opening in fourth part 26.

Referring to FIG. 4, EOAT 10 is coupled to fixture 50. The connections between first interfacing feature 14, second interfacing feature 16, third interfacing feature 18, first interfacing feature 54, second interfacing feature 56, and interfacing feature 58 position and orient EOAT 10 relative to fixture 50 and hence position and orient first part 20 and second part 22 relative to fourth part 26. Further, one or more of first interfacing feature 14, second interfacing feature 16, third interfacing feature 18, first interfacing feature 54, second interfacing feature 56, and interfacing feature 58 includes securement devices, such as magnetic grippers, which hold EOAT 10 onto fixture 50. Once EOAT 10 is coupled to fixture 50, robot 90 can decouple from interface 11 of EOAT 10 and be implemented for another task.

In embodiments, magnetic gripper 30A, magnetic gripper 30B, magnetic gripper 30C, and magnetic gripper 30D receive power from robot 90 to control the switchable magnetic flux sources and if any of first interfacing feature 14, second interfacing feature 16, and third interfacing feature 18 includes a magnetic gripper it also receives power from robot 90 to control the respective magnetic flux source. The term power depends on the type of magnetic gripper and includes electrical power, hydraulic power, pneumatic power, and combinations thereof. Once robot 90 is decoupled from EOAT 10, the magnetic state of magnetic gripper 30A, magnetic gripper 30B, magnetic gripper 30C, and magnetic gripper 30D and any of first interfacing feature 14, second interfacing feature 16, and third interfacing feature 18 which includes a magnetic gripper may not be changed. In one example when EOAT 10 is coupled to fixture 50, the magnetic state of each of magnetic gripper 30A, magnetic gripper 30B, magnetic gripper 30C, and magnetic gripper 30D is set to the OFF state. Thus, each of magnetic gripper 30A, magnetic gripper 30B, magnetic gripper 30C, and magnetic gripper 30D holds the respective one of parts 20, 22 with a first interaction (magnetic) when EOAT 10 is spaced apart from fixture 50 and a second interaction (pinching or clamping due to the connection between EOAT 10 and fixture 50) when EOAT 10 is coupled to fixture 50 and robot 90 is decoupled from EOAT 10. An advantage, among others, of the magnetic state of each of magnetic gripper 30A, magnetic gripper 30B, magnetic gripper 30C, and magnetic gripper 30D being set to the OFF state is that repulsions with the magnetic grippers and/or interfacing features of fixture 50 may be avoided. In embodiments, magnetic grippers 30A-D maintain their current magnetic state in the event of a power cutoff. Thus, it is possible to maintain each of magnetic grippers 30A-D in an ON state or partial ON state when EOAT 10 is coupled to fixture 50 and robot 90 is decoupled from EOAT 10. In this situation, each of magnetic gripper 30A, magnetic gripper 30B, magnetic gripper 30C, and magnetic gripper 30D holds the respective one of parts 20, 22 with a first interaction (magnetic) when EOAT 10 is spaced apart from fixture 50 and with the first interaction (magnetic) and a second interaction (pinching or clamping due to the connection between EOAT 10 and fixture 50) when EOAT 10 is coupled to fixture 50 and robot 90 is decoupled from EOAT 10.

In embodiments, when EOAT 10 is spaced apart from fixture 50, such as in FIG. 1, each of magnetic gripper 30A-D may be in an ON state wherein the magnetic flux from the switchable magnetic flux source may fully saturate first part 20 and second part 22 depending on part characteristics, such as thickness. As EOAT 10 approaches fixture 50 (see FIG. 3), each of magnetic gripper 30A-D may be altered to be to be in a partial ON state to wherein the magnetic flux from the switchable magnetic flux source may be confined generally to first part 20 and second part 22, but be sufficient to hold the first part 20 or second part 22 to EOAT 10. Thus, magnetic gripper 30A-D will not inadvertently lift fourth part 26 relative to fixture 50 and/or interfere with the alignment of EOAT 10 relative to fixture 50. Once EOAT 10 is coupled to fixture 50, each of magnetic gripper 30A-D may be altered to be to be in an OFF state wherein the magnetic flux from the switchable magnetic flux source is neither absent or generally confined to the respective magnetic gripper 30A-D.

Once manufacturing operations have been performed on one or more of first part 20, second part 22, and fourth part 26, the state of magnetic gripper 30A-D may again be altered. For example, first part 20 and second part 22 may be welded to fourth part 26 as a manufacturing operation. The combined assembly of first part 20, second part 22, and fourth part 26 may then be lifted relative to fixture 50 by turning magnetic gripper 30E-H to an OFF state and magnetic gripper 30A-D in another partial ON state wherein the magnetic flux of the switchable magnetic flux sources of magnetic gripper 30A-D are generally confined to the assembly of first part 20, second part 22, and fourth part 26 and the assembly may be lifted along with the remainder of EOAT 10 relative to fixture 50. Once EOAT 10 is separated from fixture 50, each of magnetic gripper 30A-D may once again be in an ON state. Exemplary descriptions of movement of parts with magnetic grippers and partial ON states are disclosed in U.S. Pat. No. 10,903,030, the entire disclosure of which is expressly incorporated by reference herein.

Figure 6:
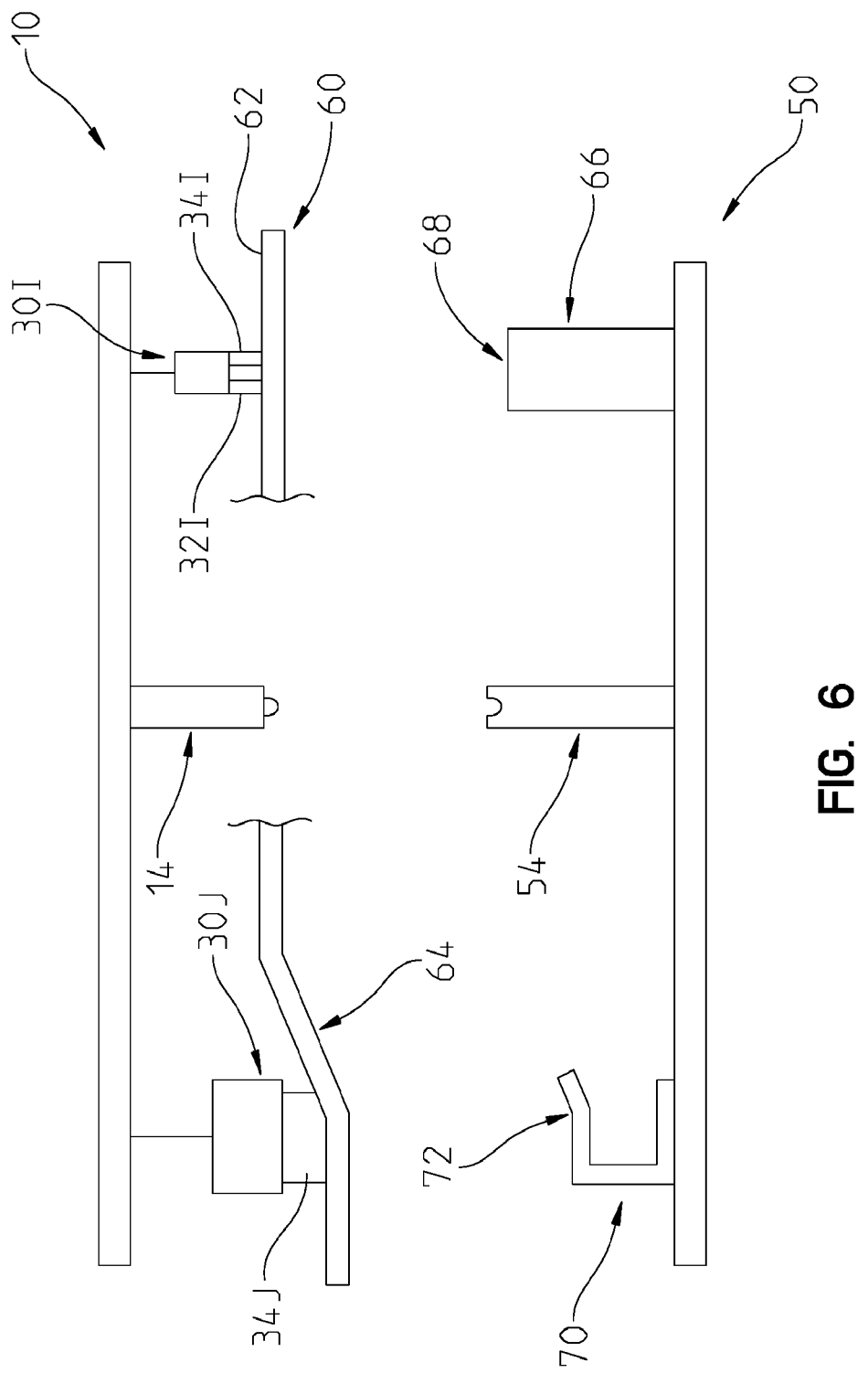
FIG. 6 illustrates an exemplary arrangement of an EOAT approaching a fixture and holding at least one part or part assembly.
Figure 7:
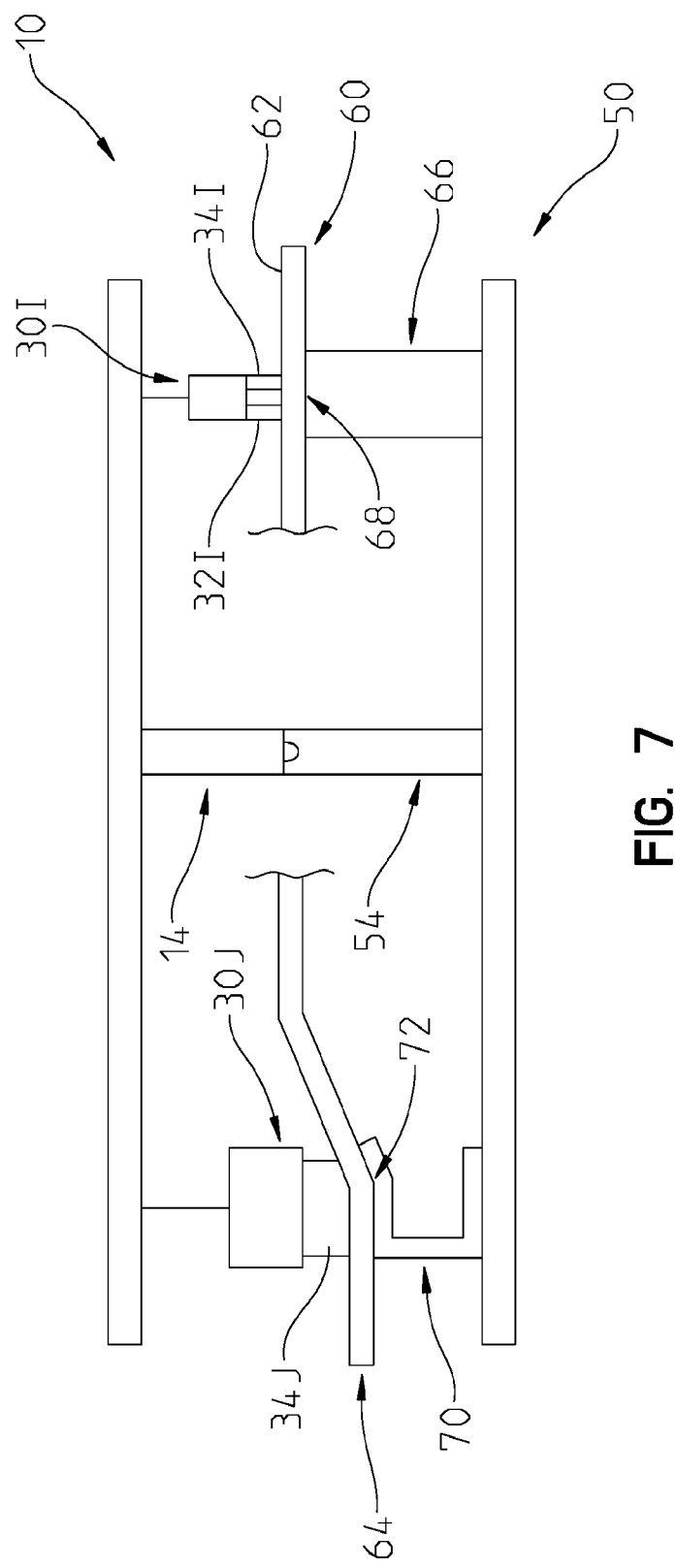
FIG. 7 illustrates the EOAT and fixture of FIG. 6 wherein the EOAT is coupled to the fixture and the EOAT and the fixture cooperate to hold the at least one part or part assembly.

Referring to FIGS. 6 and 7, an exemplary EOAT 10 and fixture 50 are shown wherein a part 60 is held by EOAT 10 as it approaches fixture 50. Part 60 includes a flat region 62 which is held by magnetic gripper 30I and a bent region 64 which is held by magnetic gripper 30J. Magnetic gripper 30J is rotated ninety degrees relative to magnetic gripper 30I and hence only pole shoe 34J is visible. A lower surface of pole shoe 34J is contoured to generally match bent region 64 of part 60. Exemplary pole shoes for the magnetic grippers disclosed herein are disclosed in Referring to FIG. 7, EOAT 10 is coupled to fixture 50 through first interfacing feature 14 of EOAT 10 and first interfacing feature 54 of fixture 50. In embodiments, additional interfacing features are included for both EOAT 10 and fixture 50. Fixture 50 includes a support 66 positioned to align with magnetic gripper 30I and flat region 62 of part 60 and a support 70 positioned to align with magnetic gripper 30J 70 includes an upper face 72 contoured to match bent region 64 of part 60. In embodiments, one of first interfacing feature 14 of EOAT 10 and first interfacing feature 54 of fixture 50 includes a magnetic gripper and when first interfacing feature 14 of EOAT 10 and first interfacing feature 54 of fixture 50 are coupled due to the magnetic gripper being in the ON state, part 60 is clamped between magnetic gripper 30J and support 70 and magnetic gripper 30I and support 66. As such, magnetic gripper 30J and magnetic gripper 30I have a first interaction (magnetic) with part 60 as EOAT 10 approaches fixture 50 and a second interaction (clamping with fixture 50) when EOAT 10 is coupled to fixture 50.

Figure 6A:
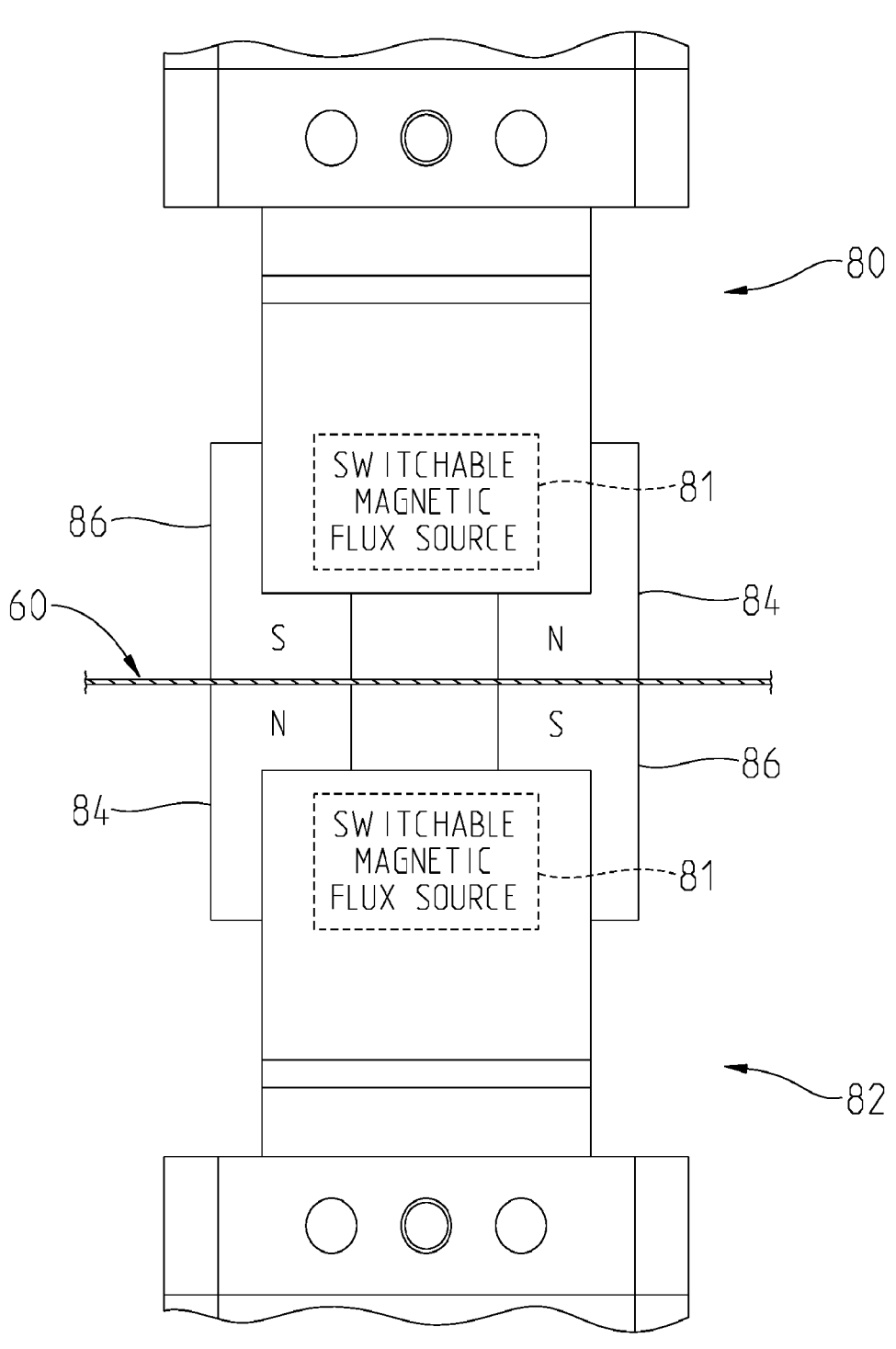
FIG. 6A illustrates an exemplary first interfacing feature of the EOAT and a first interfacing feature of the fixture.

Referring to FIG. 6A, in embodiments, first interfacing feature 14 includes a magnetic gripper 80 and first interfacing feature 54 includes a magnetic gripper 82. Each of magnetic gripper 80 and magnetic gripper 82 includes a switchable magnetic flux source 81, a north pole shoe 84 which corresponds to a north pole of switchable magnetic flux source 81 when switchable magnetic flux source 81 is in an ON state or partial ON state and a south pole 86 which corresponds to a south pole of switchable magnetic flux source 81 when switchable magnetic flux source 81 is in an ON state or partial ON state. As shown the north pole shoe 84 of magnetic gripper 80 is aligned with the south pole shoe 86 of magnetic gripper 82 and the north pole shoe 84 of magnetic gripper 82 is aligned with the south pole shoe 86 of magnetic gripper 80. Part 60 is shown captured therebetween magnetic gripper 80 and magnetic gripper 82, but in embodiments the pole shoes of magnetic gripper 80 and magnetic gripper 82 may contact each other directly, either due to first interfacing feature 14 and first interfacing feature 54 being outside of the ultimate outer perimeter of part 60 or by being located in an opening in part 60. An advantage of this arrangement of first interfacing feature 14 and first interfacing feature 54, among others, is improved holding force due to multiple switchable magnetic flux sources 81.

Figure 8:
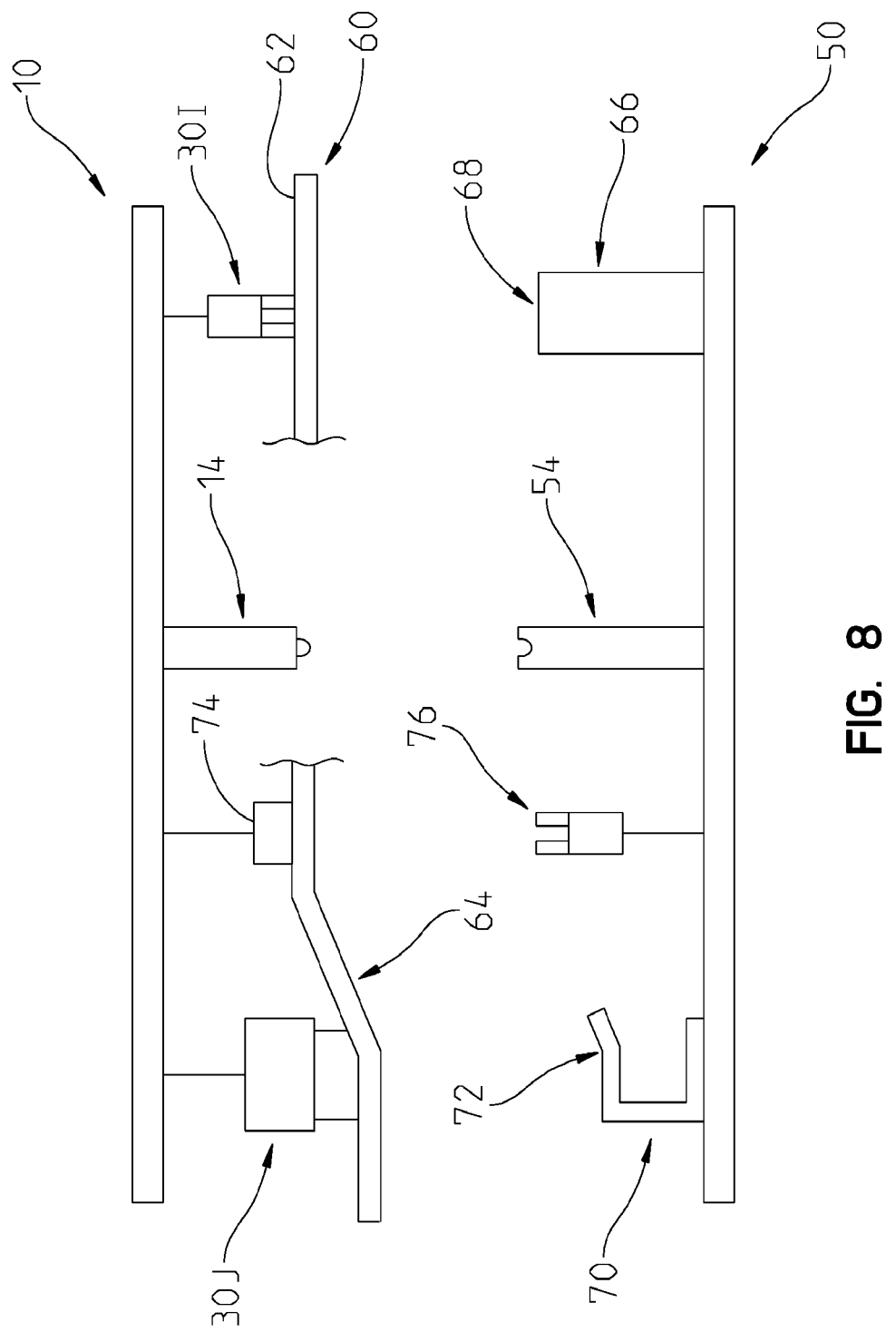
FIG. 8 illustrates another exemplary arrangement of an EOAT approaching a fixture and holding at least one part or part assembly.
Figure 9:
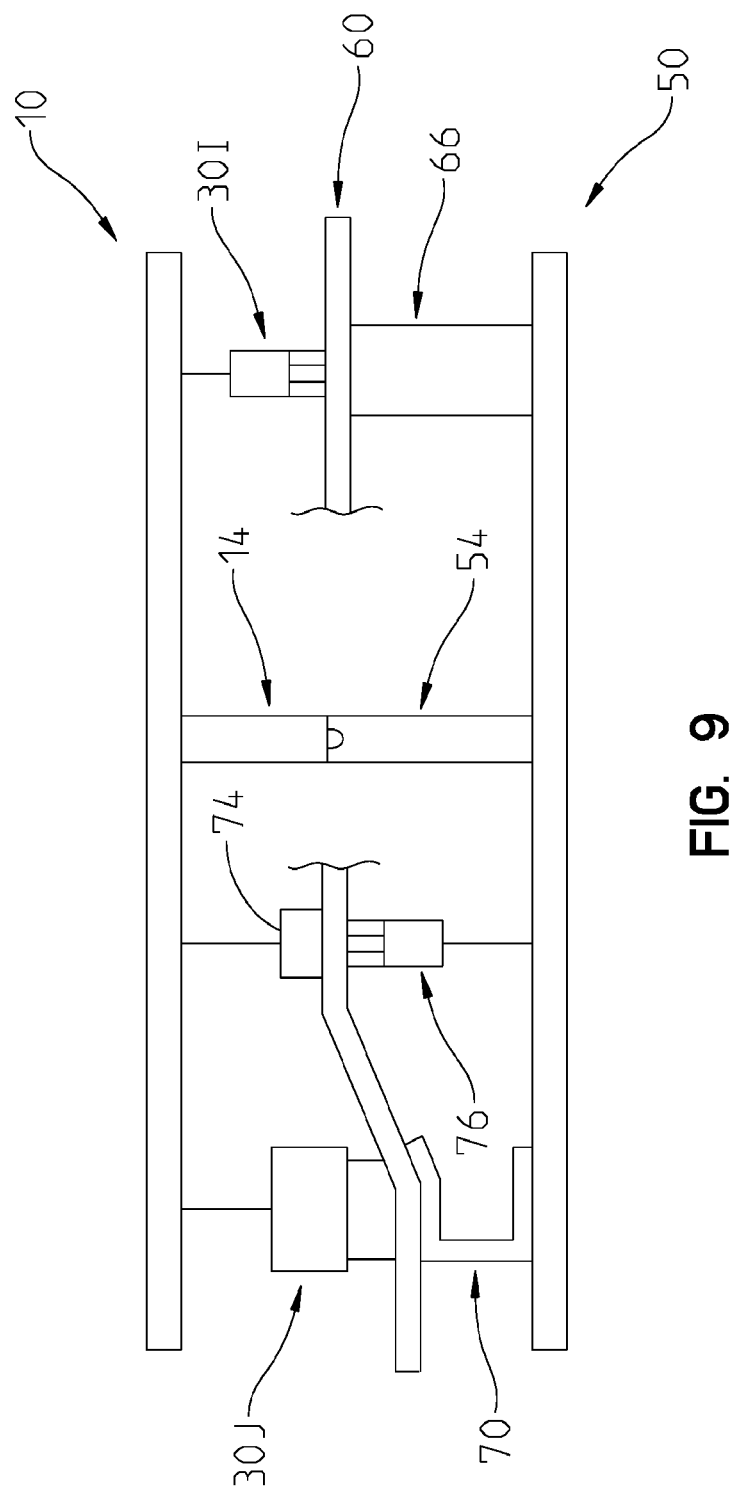
FIG. 9 illustrates the EOAT and fixture of FIG. 8 wherein the EOAT is coupled to the fixture and the EOAT and the fixture cooperate to hold the at least one part or part assembly.
Figure 11:
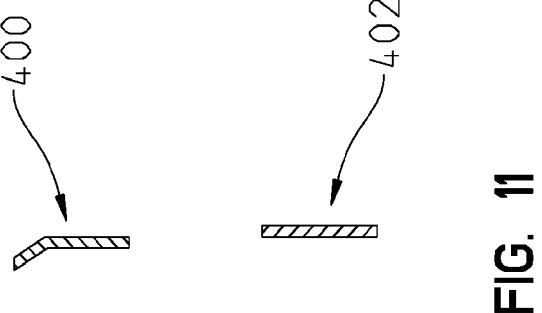
FIG. 11 illustrates a sectional view of the plurality of representative parts along lines 11-11 in FIG. 10.
Figure 10:
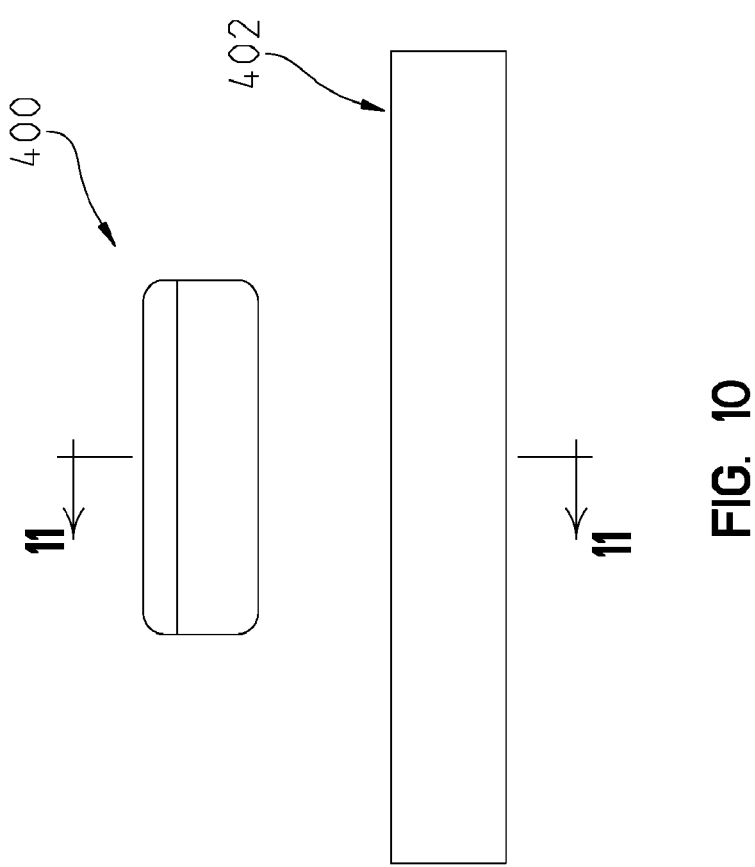
FIG. 10 illustrates a top view of a plurality of representative parts.

Referring to FIGS. 8 and 9, the arrangement of FIGS. 6 and 7 further includes a ferromagnetic component 74, such as a plate, as part of EOAT 10 and a magnetic gripper 76 as part of fixture 50. When EOAT 10 is coupled to fixture 50 (see FIG. 9), magnetic gripper 76 is placed in an ON state to hold ferromagnetic component 74 relative to magnetic gripper 76. As illustrated, part 60 is captured between ferromagnetic component 74 and magnetic gripper 76, but in embodiments the pole shoes of magnetic gripper 76 may contact ferromagnetic component 74 directly, either due to ferromagnetic component 74 and magnetic gripper 76 being outside of the ultimate outer perimeter of part 60 or by being located in an opening in part 60.

Figures 12, 13:
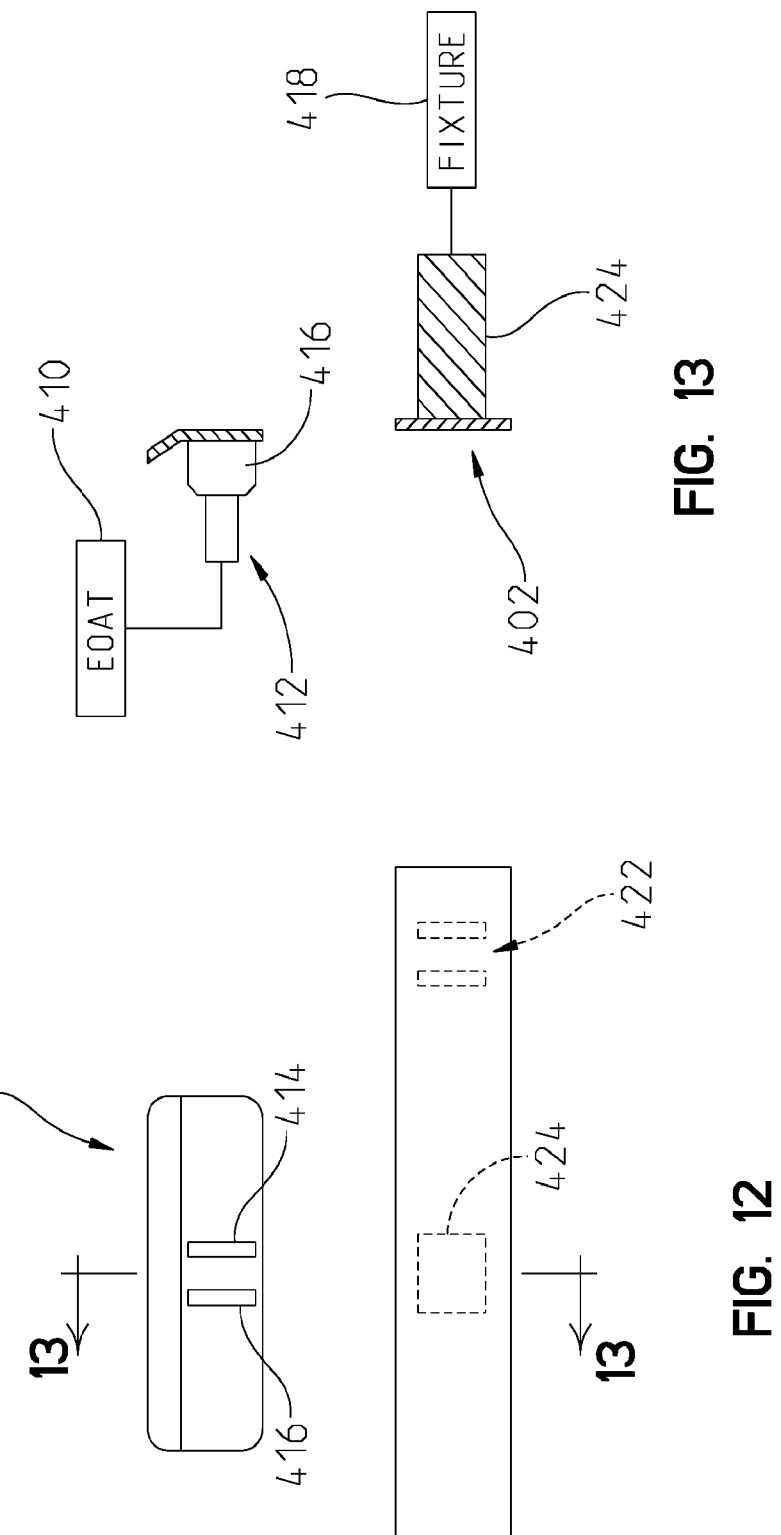
FIG. 12 illustrates a top view of the plurality of representative parts of FIG. 10 with a first part coupled to an exemplary EOAT and a second part coupled to an exemplary fixture while the exemplary EOAT is uncoupled from the exemplary fixture.
FIG. 13 illustrates a sectional view of the plurality of representative parts along lines 13-13 in FIG. 12 while the exemplary EOAT is uncoupled from the exemplary fixture.

Referring to FIGS. 10-19, a first part 400 and a second part 402 are shown. First part 400 is to be welded to second part 402. Referring to FIGS. 12 and 13, first part 400 is carried by an EOAT 410 and is coupled to EOAT 410 with a magnetic gripper 412 having pole shoes 414, 416. Second part 402 is held magnetic gripper 420 and magnetic gripper 422 of a fixture 418. Further, second part 402 rests on tope of a support 424. All of magnetic gripper 412, magnetic gripper 420, magnetic gripper 422, and support 424 are within the ultimate outer perimeters of first part 400 and 402.

Figures 14, 15, 16:
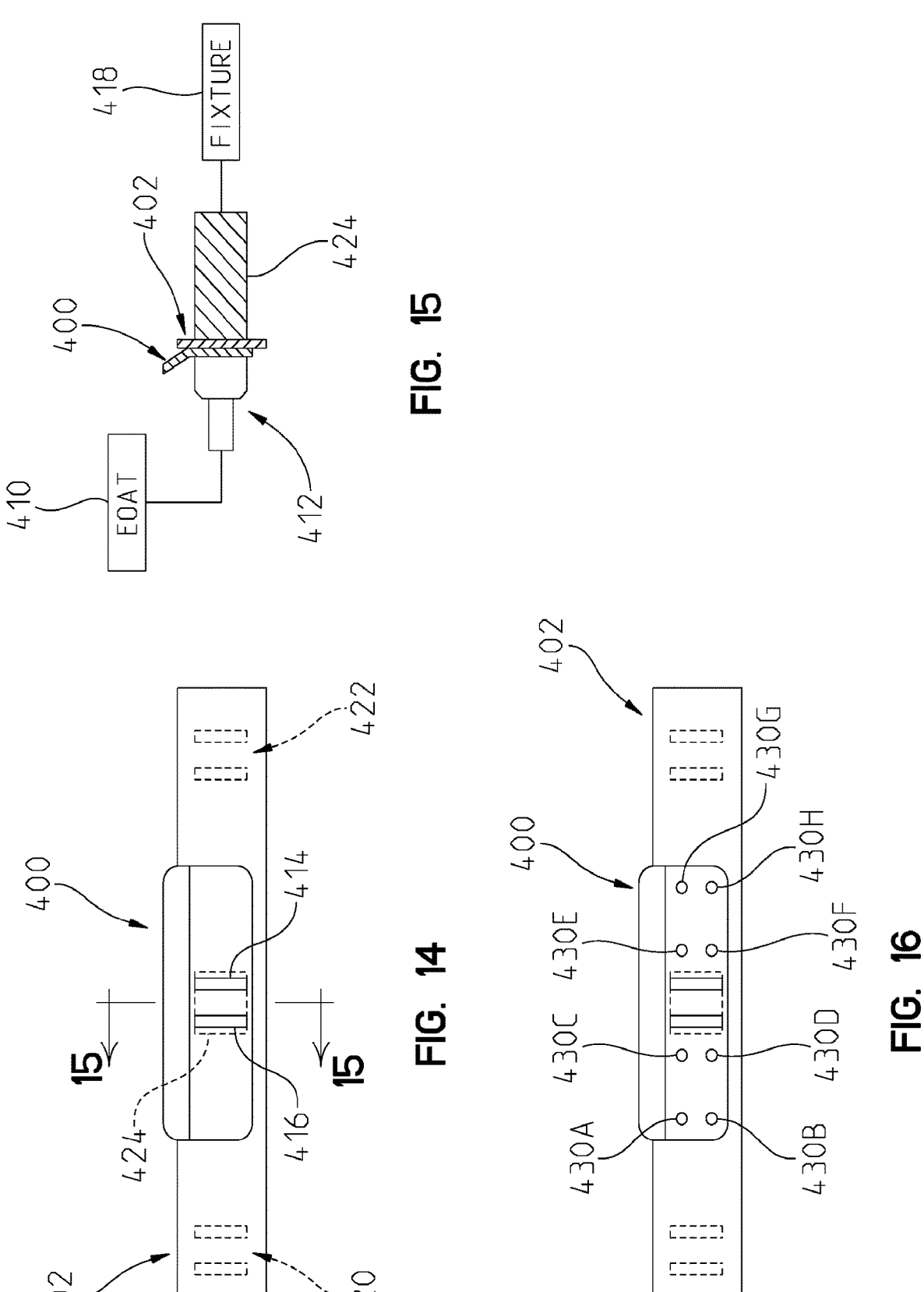
FIG. 15 illustrates a sectional view of the plurality of representative parts along lines 15-15 in FIG. 14 while the exemplary EOAT is uncoupled from the exemplary fixture.
FIG. 16 illustrates a top view of the plurality of representative parts of FIG. 14 and indicated weld points to secure the first part to the second part.

Referring to FIGS. 14 and 15, EOAT 410 has been coupled to fixture 418 resulting in first part 400 being married to second part 402. As shown in FIG. 14 pole shoes 416 and fixture 418 overlap support 424 and clamp first part 400 and second part 402 together. All of magnetic gripper 412, magnetic gripper 420, magnetic gripper 422, and support 424 are within the ultimate outer perimeters of first part 400 and 402.

Figures 18, 19:
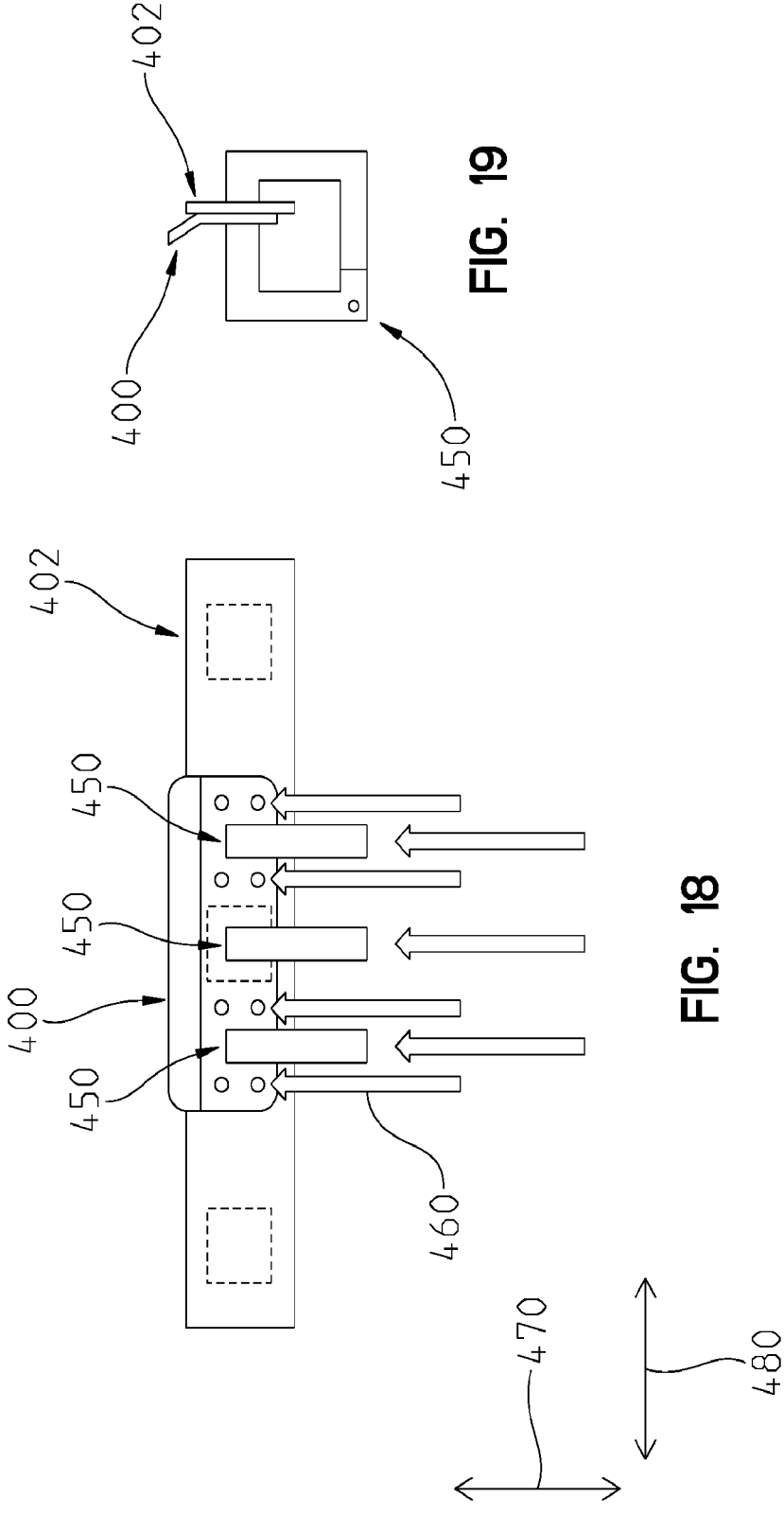
FIG. 18 illustrates a top view of a portion of the exemplary positions of a welder of a weld robot relative to pneumatic clamping members to complete the welds at the indicated weld points of FIG. 16.
FIG. 19 illustrates a side view of an exemplary pneumatic clamp of FIG. 18.

Now a manufacturing operation may be performed on the parts 400, 402. Referring to FIG. 16, in one embodiment it is desired to place eight welds to couple first part 400 to second part 402, the welds are to be at locations 430A-H. As shown in FIG. 19, a traditional clamp 450 is shown to hold first part 400 to second part 402. Clamp 450 contacts both sides of the combination of first part 400 and second part 402 and extends beyond the ultimate outer perimeter of the combination of first part 400 and second part 402 (see FIG. 18 which shows three instances of clamp 450). The arrows in FIG. 18 represent the positions of a welder 460 (one marked) of a welder robot. As shown, welder 460 moves in directions 470 to make various welds, but then must move outside the ultimate outer perimeter of first part 400 and second part 402 to maneuver around the various clamps 450. By comparison, referring to FIG. 17 welder 460 may remain within the ultimate outer perimeter of first part 400 and second part 402 due to each of magnetic gripper 412, magnetic gripper 420, magnetic gripper 422, and support 424 also being within the ultimate outer perimeter of first part 400 and second part 402. Thus, the path length and hence the time to complete welds at each of locations 430A-H is longer resulting in less throughput for the system.

Figure 20:
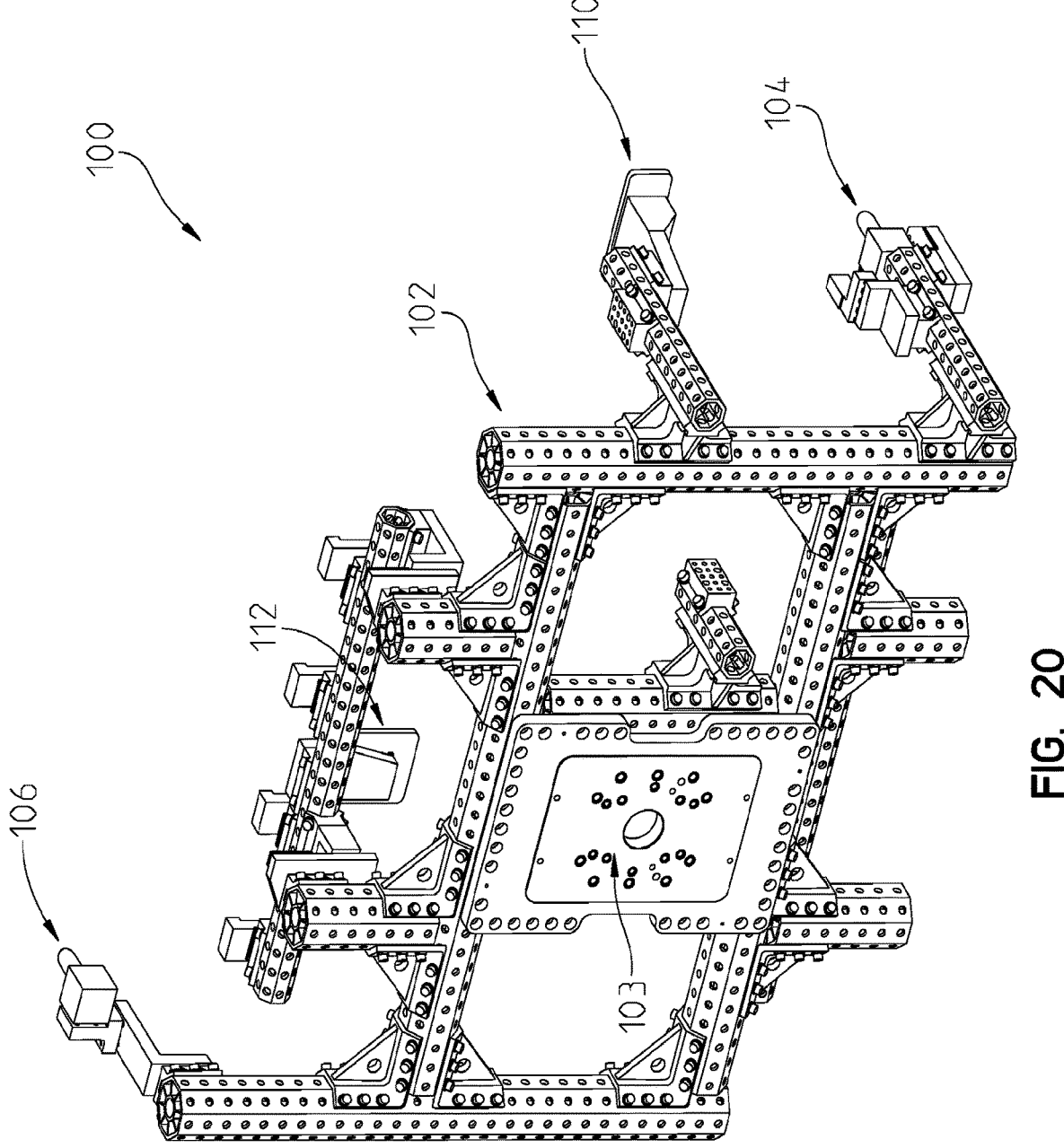
FIG. 20 illustrates a top perspective view of an exemplary EOAT.
Figure 21:
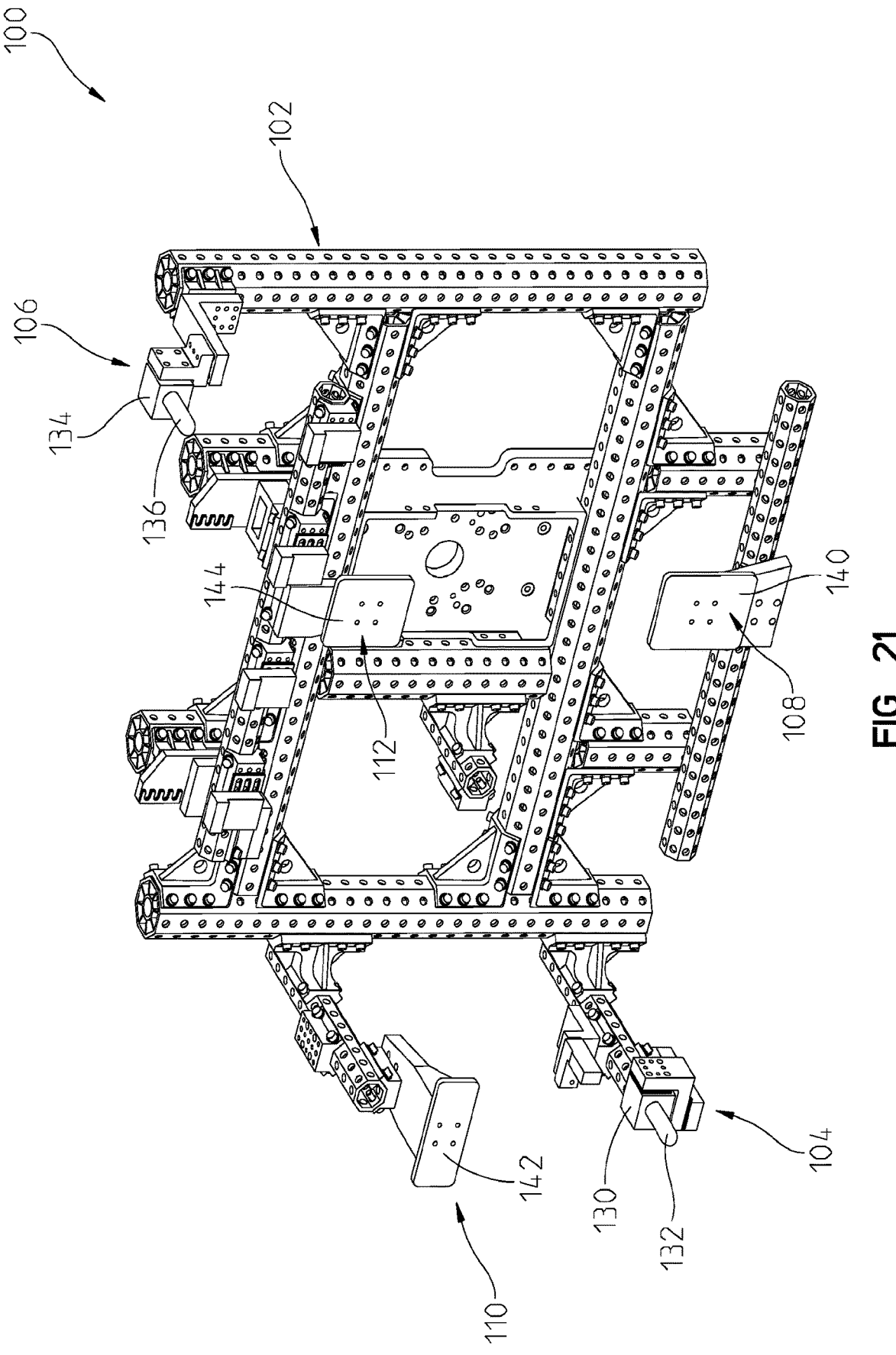
FIG. 21 illustrates a bottom perspective view of the exemplary EOAT of FIG. 20 including a plurality of interfacing features.

Referring to FIGS. 20 and 21, an exemplary EOAT 100 is illustrated. EOAT 100 comprises a frame 102 which supports a first plurality of interfacing features and a first plurality of grippers and an interface 103 to which robot 90 may be attached. EOAT 100 may be coupled to an end of robot 90 through one or more couplers. As an example, EOAT 100 may be removably coupled to the robot via interface 103, for example using magnetism. Further, the robot 90 may provide power to EOAT 100. In embodiments, robot 90 carries one or more magnetic grippers and interface 103 is made of a ferromagnetic material such that robot 90 may couple to EOAT 100 through the magnetic grippers. Further, robot 90 may carry interfacing features such that a position and orientation of EOAT 100 relative to robot 90 may be set.

Exemplary interfacing features 104, 106, 108, 110, and 112 of EOAT 100 interact with interfacing features of a fixture 300 (see FIG. 23) to couple EOAT 100 to fixture 300. In embodiments, the respective interfacing feature of EOAT 100 directly contacts the respective interfacing feature of fixture 300 to couple EOAT 100 to fixture 300. In embodiments, the respective interfacing feature of EOAT 100 is coupled to fixture 300 through one or more parts being held by EOAT 100 and fixture 300.

Figure 22:
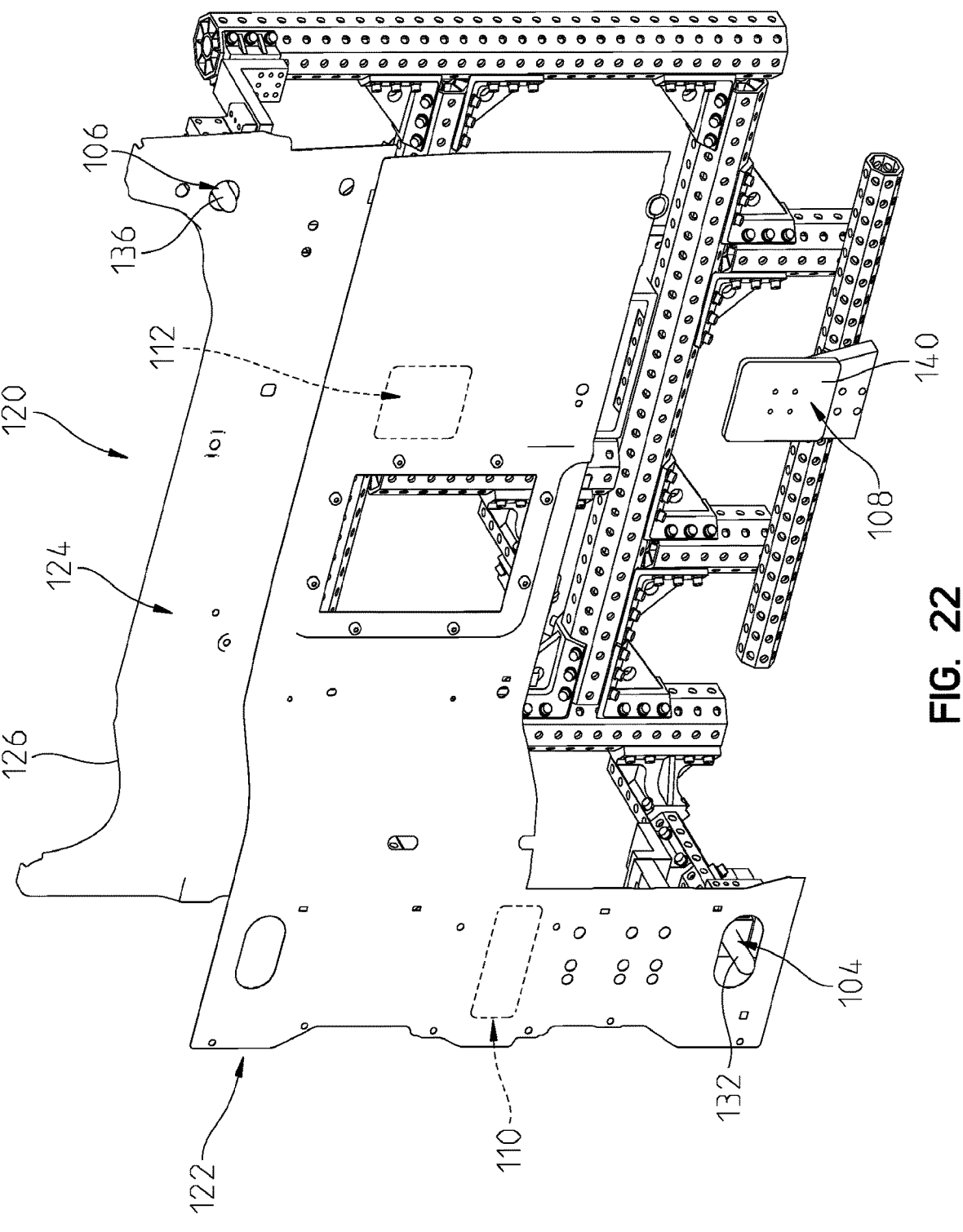
FIG. 22 illustrates the view of FIG. 20 with a part assembly of a plurality of parts positioned relative to the plurality of interfacing features.

Referring to FIG. 22, a part assembly 120 including a first part 122 and a second part 124 is shown. Part assembly 120 has an outer perimeter 126. As shown in FIG. 22, interfacing feature 108 is positioned outside of outer perimeter 126 of part assembly 120 and will interact with the respective interfacing feature of fixture 300 directly. Interfacing feature 104 and interfacing feature 106 extend through holes in part assembly 120 and within outer perimeter 126 and interact with respective directly interfacing features of fixture 300 directly. Interfacing feature 110 and interfacing feature 112 of EOAT 100 are both within outer perimeter 126 of part assembly 120 and not aligned with openings in part assembly 120. Thus, interfacing feature 110 and interfacing feature 112 of EOAT 100 both interact with respective interfacing features of fixture 300 through part assembly 120. One or both of interfacing feature 110 and interfacing feature 112 of EOAT 100 may be within outer perimeter 126 of part assembly 120 and aligned with one or more openings in part assembly 120 and thus, directly interact with corresponding interfacing features 310 and 312 of fixture 300. In embodiments, an interfacing feature of EOAT 100 may both interact directly with an interfacing feature of fixture 300 and interact with the interfacing feature of fixture 300 through part assembly 120. An example interfacing feature, is interfacing feature 286 of EOAT 100 and interfacing feature 284 of fixture 300 shown in FIG. 42.

EOAT 100 is illustrated as retaining objects referred to herein as first part 122 and second part 124 of part assembly 120. Objects 122 and 124 are retained by EOAT 100 in a specific configuration, such that, as illustrated, they are adjacent to one another. As explained herein each of objects 122 and 124 are retained to EOAT 100 by grippers.

While the instant figures illustrate EOAT 100 as handling two objects 122 and 124, it will be appreciated that any number of objects may be manipulated by EOAT 100 and retained within a fixture according to aspects of the present disclosure. For example, similar aspects may be applied to instances where a single object is used.

Figure 23:
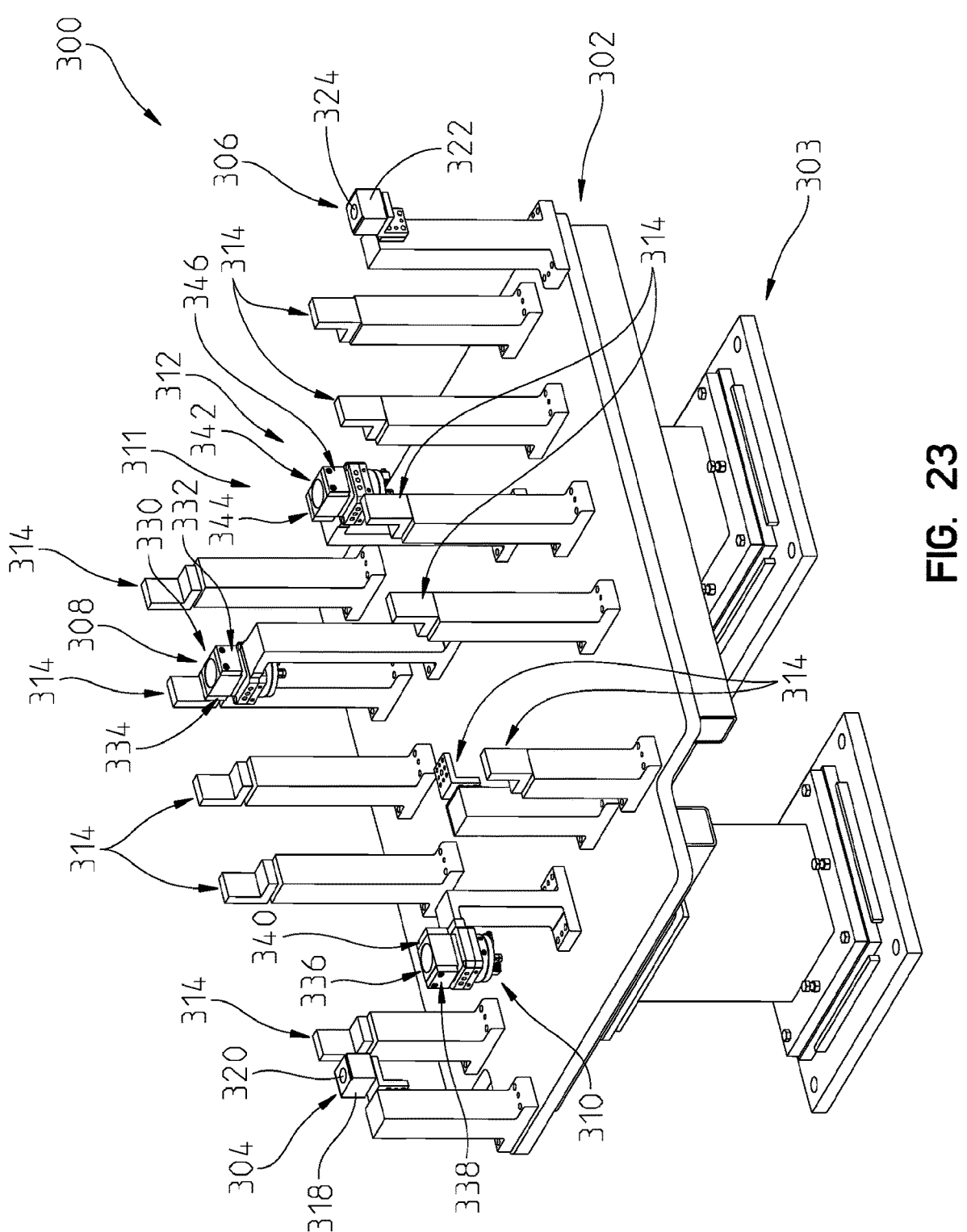
FIG. 23 illustrates a top perspective view of an exemplary fixture for use with the exemplary EOAT of FIG. 20 including a plurality of interfacing features.

Referring to FIG. 23, an exemplary fixture 300 is shown. Fixture 300 includes a frame 302 having a base 303 to couple fixture 300 to the floor or other support. Although fixture 300 is shown as a stationary object to which robot 90 would bring EOAT 100 to for coupling, in embodiments fixture 300 is supported on a moveable support and is brought to robot 90 for coupling with EOAT 100.

Further, in embodiments, fixture 300 is another EOAT 100 which is carried by another robot 90. In this example, the assembly of parts are passed from one EOAT 100 of a first robot to an EOAT 100 of a second robot with the first EOAT 100 including interfacing features to interact with interfacing features of the second EOAT 100 to couple the first EOAT 100 to the second EOAT 100.

As shown in FIG. 23, fixture 300 includes a plurality of supports 310 which position interfacing features 304, 306, 308, 310, and 312 and part supports 314 which support part assembly 120. One or more of interfacing feature 304, interfacing feature 306, interfacing feature 308, supports 311, and interfacing feature 312 may also support part assembly 120. Interfacing feature 304 interacts with interfacing feature 104 of EOAT 100.

In the illustrated embodiment, interfacing feature 304 is a locator formed of a support 318 having a recess 320 and interfacing feature 104 is a locator formed of a support 130 and a pin 132 extending therefrom (see FIG. 21). EOAT 100 is positioned relative to fixture 300 in the vertical direction 200 (see FIG. 26) when support 130 of EOAT 100 contacts support 318 of fixture 300 or other stop surfaces (such as the tip of pin 132 and the bottom of recess 320) are in contact. Further when pin 132 of EOAT 100 is received in recess 320 of fixture 300, EOAT 100 is located relative to fixture 300 in direction 202 and direction 204, but the angular orientation of EOAT 100 relative to fixture 300 is not set.

Figure 28:
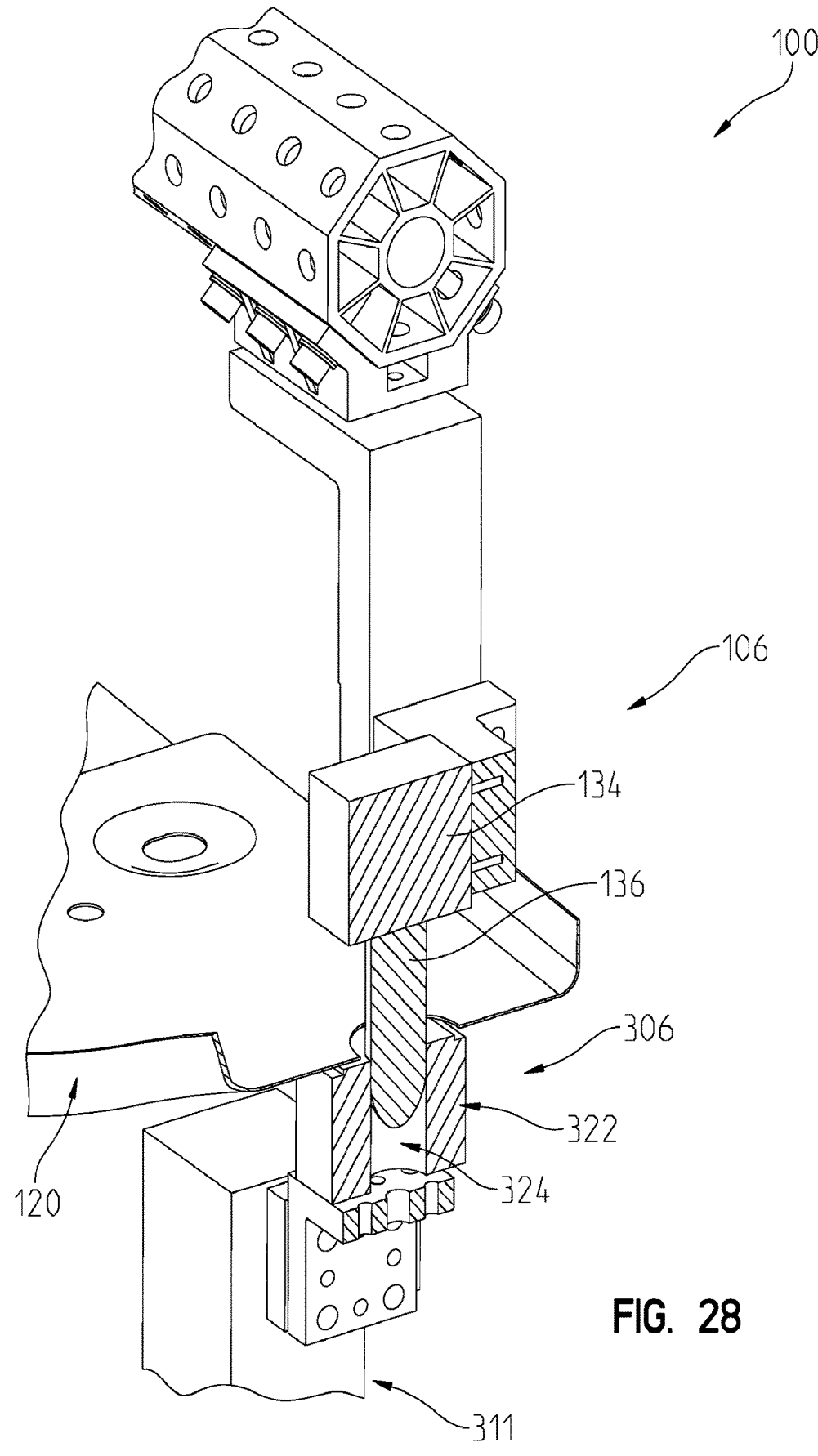
FIG. 28 illustrates a partial sectional view of a first interfacing feature of the EOAT coupled to a first interfacing feature of the fixture taken along lines 28-28 in FIG. 27.

In the illustrated embodiment, interfacing feature 306 is a locator formed of a support 322 having a recess 324 and interfacing feature 104 is a locator formed of a support 134 and a pin 136 extending therefrom (see FIG. 28). EOAT 100 is positioned relative to fixture 300 in the vertical direction 200 (see FIG. 26) when support 134 of EOAT 100 contacts support 322 of fixture 300 or other stop surfaces are in contact. Further when pin 136 of EOAT 100 is received in recess 324 of fixture 300, EOAT 100 is located relative to fixture 300 in direction 202 and direction 204, but the angular orientation of EOAT 100 relative to fixture 300 is not set. By having both pin 132 and pin 136 received in the respective recess 320 and recess 324, the angular orientation of EOAT 100 relative to fixture 300 is set. In embodiments, one or more of interfacing feature 304 and interfacing feature 306 includes pins and the corresponding ones of interfacing feature 104 and interfacing feature 106 include recesses to receive the pins of fixture 300. Other exemplary interfacing features may be used in place of interfacing feature 104, interfacing feature 304 or interfacing feature 106, interfacing feature 306.

In the illustrated embodiment, interfacing feature 308 is a magnetic gripper 330 having pole shoes 332 and 334 and interfacing feature 108 is a ferromagnetic component, illustratively a plate 140 which contacts pole shoes 332 and 334 of magnetic gripper 330. In embodiments, magnetic gripper 330 includes a switchable magnetic flux source, as described herein, which is switchable between on OFF state wherein a magnetic circuit is not formed between magnetic gripper 330 and plate 140 and EOAT 100 is able to be moved in vertical direction 200 relative to fixture 300 and an ON state wherein a magnetic circuit is formed between magnetic gripper 330 and plate 140 resulting in plate 140 being held in contact with pole shoes 332 and 334 of magnetic gripper 330 and EOAT 100 being retained relative to fixture 300 in vertical direction 200. Further, part assembly 120 is retained by EOAT 100 and fixture 300 to hold the various components of part assembly 120 in place relative to each other so a manufacturing operation may be performed on part assembly 120.

In the illustrated embodiment, interfacing feature 310 is a magnetic gripper 336 having pole shoes 338 and 340 and interfacing feature 110 is a ferromagnetic component, illustratively a plate 142 which remains spaced apart from pole shoes 338 and 340 of magnetic gripper 336 due to part assembly 120 being positioned between plate 142 and pole shoes 338 and 340 of magnetic gripper 336. In embodiments, magnetic gripper 336 includes a switchable magnetic flux source, as described herein, which is switchable between on OFF state wherein a magnetic circuit is not formed between magnetic gripper 336 and plate 142 through part assembly 120 and EOAT 100 is able to be moved in vertical direction 200 relative to fixture 300 and an ON state wherein a magnetic circuit is formed between magnetic gripper 336 and plate 142 through part assembly 120 resulting in plate 142 being held relative to magnetic gripper 336 and EOAT 100 being retained relative to fixture 300 in vertical direction 200. Further, part assembly 120 is retained by EOAT 100 and fixture 300 to hold the various components of part assembly 120 in place relative to each other so a manufacturing operation may be performed on part assembly 120.

In the illustrated embodiment, interfacing feature 312 is a magnetic gripper 342 having pole shoes 344 and 346 and interfacing feature 112 is a ferromagnetic component, illustratively a plate 144 which remains spaced apart from pole shoes 344 and 346 of magnetic gripper 342 due to part assembly 120 being positioned between plate 144 and pole shoes 344 and 346 of magnetic gripper 342. In embodiments, magnetic gripper 342 includes a switchable magnetic flux source, as described herein, which is switchable between on OFF state wherein a magnetic circuit is not formed between magnetic gripper 342 and plate 144 through part assembly 120 and EOAT 100 is able to be moved in vertical direction 200 relative to fixture 300 and an ON state wherein a magnetic circuit is formed between magnetic gripper 342 and plate 144 through part assembly 120 resulting in plate 144 being held relative to magnetic gripper 342 and EOAT 100 being retained relative to fixture 300 in vertical direction 200. Further, part assembly 120 is retained by EOAT 100 and fixture 300 to hold the various components of part assembly 120 in place relative to each other so a manufacturing operation may be performed on part assembly 120.

Figure 24:
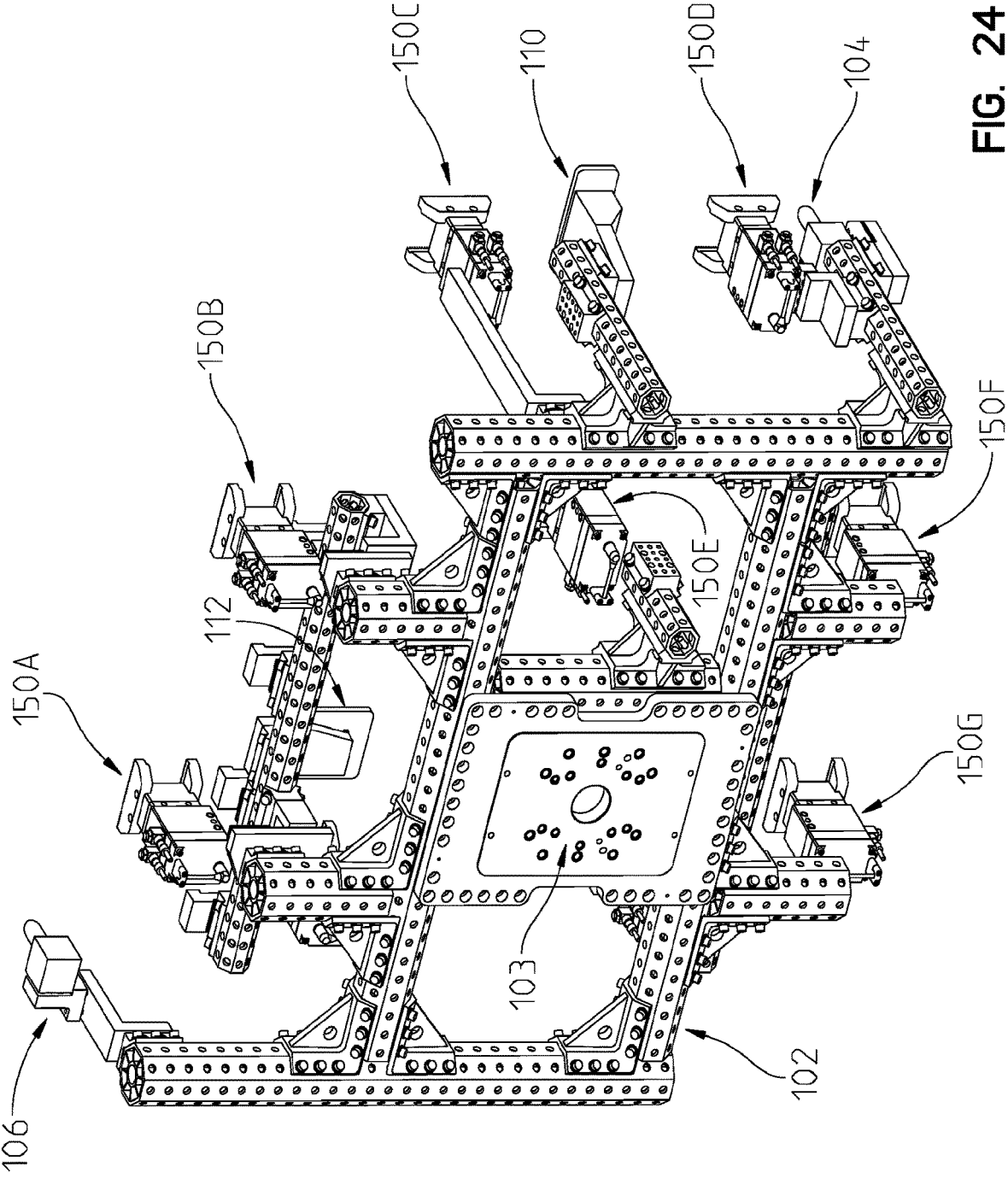
FIG. 24 illustrates a top perspective view of the exemplary EOAT of FIG. 20 including a plurality of interfacing features and a plurality of grippers to hold the part assembly of the plurality of parts of FIG. 22.
Figure 25:
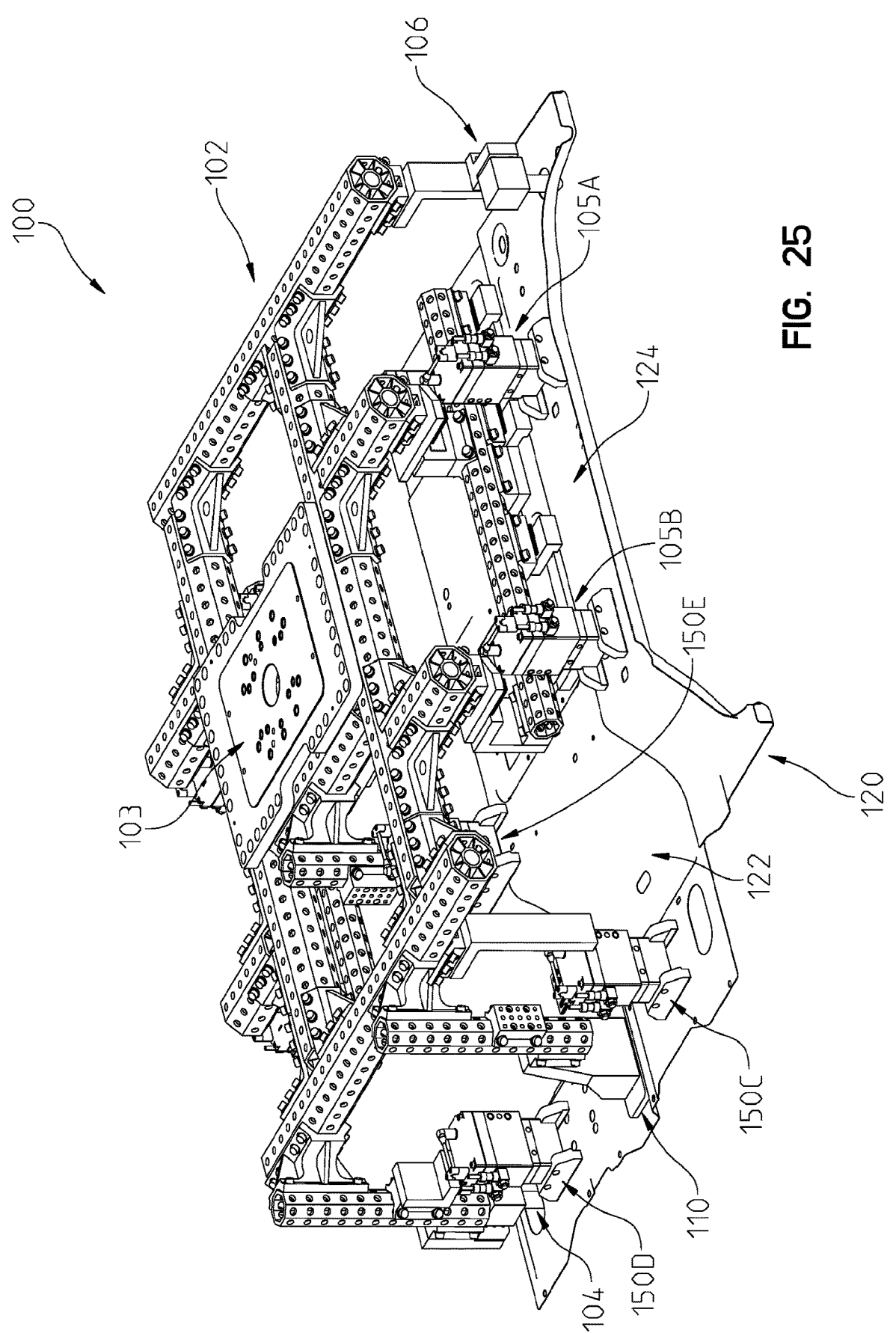
FIG. 25 illustrates a side perspective view of the exemplary EOAT of FIG. 20 including the plurality of interfacing features and the plurality of grippers of FIG. 24 coupled to the part assembly of the plurality of parts of FIG. 22.
Figure 26:
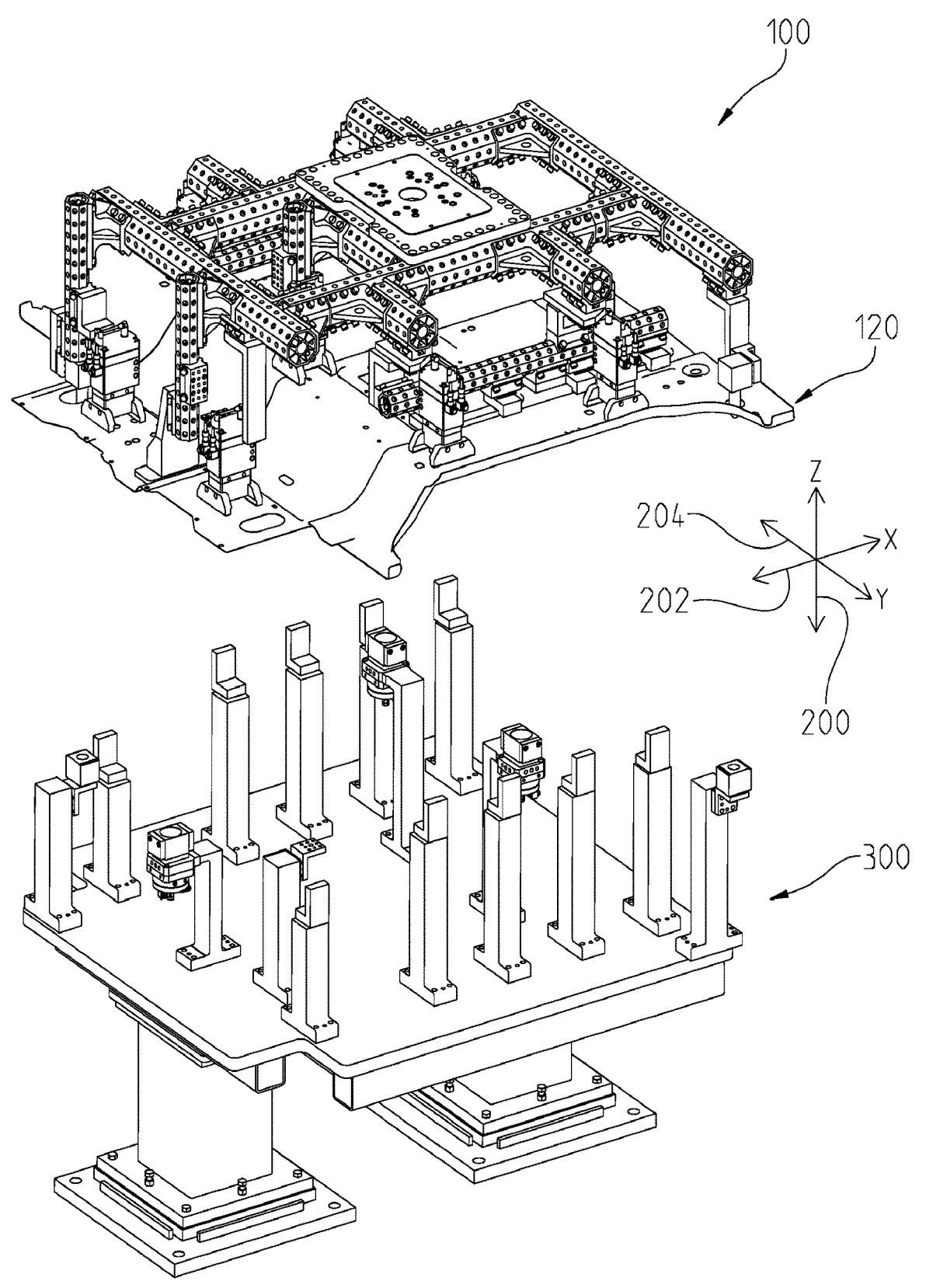
FIG. 26 illustrates the arrangement of FIG. 25 approaching the exemplary fixture of FIG. 23.
Figure 27:
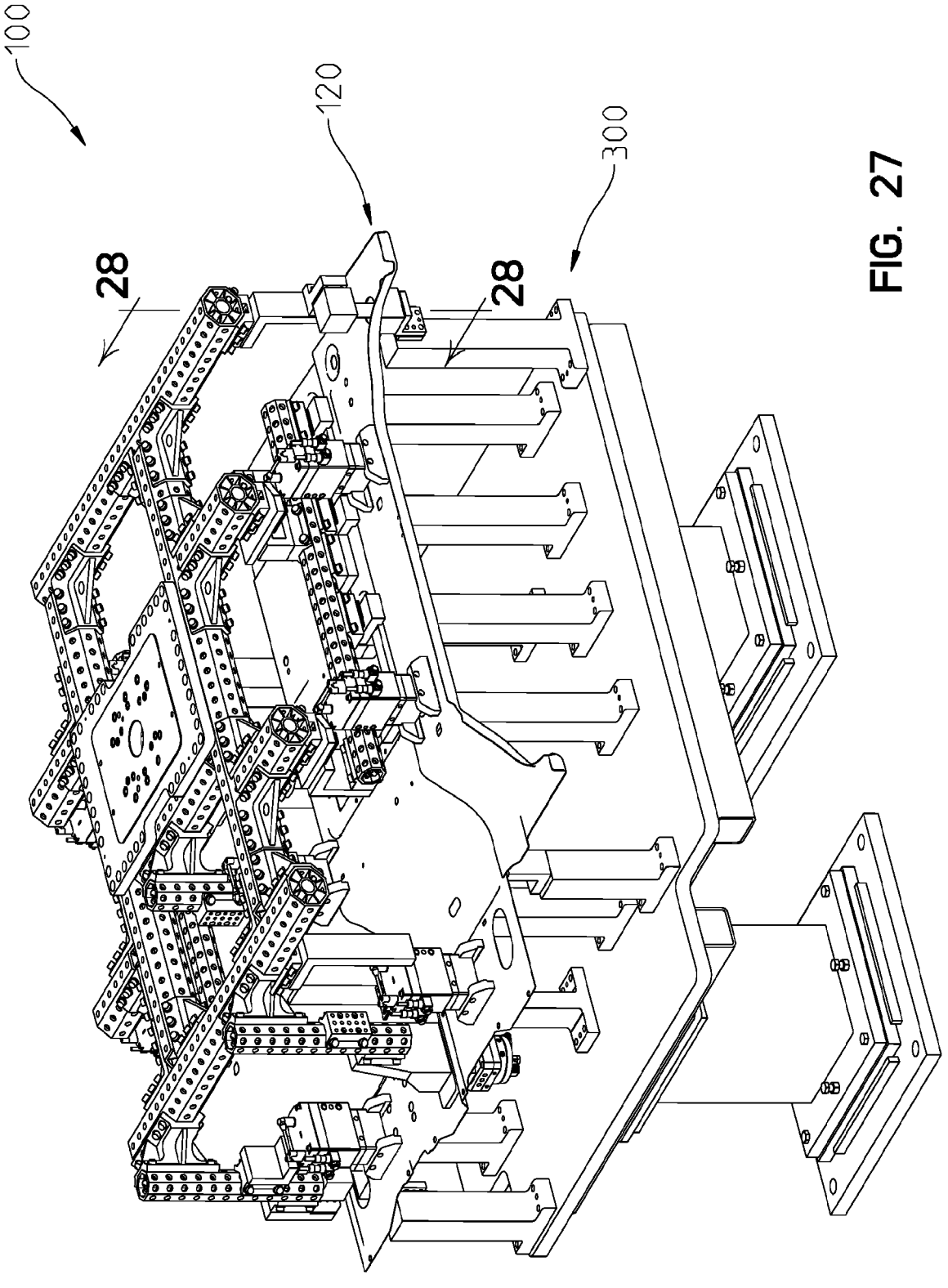
FIG. 27 illustrates the arrangement of FIG. 25 coupled to the fixture of FIG. 23 through the plurality of interfacing features of the EOAT and the plurality of interfacing features of the fixture.

Referring to FIGS. 24 and 25, EOAT 100 also includes grippers 150A-G. Not all connections of grippers 150A-G to frame 102 are shown to increase readability of the drawings, but all of grippers 150A-G are coupled to frame 102. In an example, grippers 150A-G may be magnetic grippers as illustrated in FIGS. 24 and 25. Other exemplary grippers such as suction grippers may be used. Grippers 150A-E hold first part 122 and second part 124 onto EOAT 100 as shown FIG. 25. EOAT 100 may pick first part 122 and second part 124 together or in separate steps. As illustrated in FIGS. 26 and 27, EOAT 100 lowers part assembly 120 to fixture 300, at which point fixture 300 may be termed to be loaded with part assembly 120. Through the use of grippers 150A-F, the objects may be loaded into fixture 150 in substantially the same arrangement as they were retained by EOAT 100. Supports 314 of fixture 300 support part assembly 120 on fixture 300. Once EOAT 100 is positioned and oriented on fixture 300, magnetic gripper 330, magnetic gripper 336, and magnetic gripper 342 may be activated to the ON state to hold EOAT 100 relative to fixture 300 and hence part assembly 120 relative to EOAT 100 and fixture 300. Further, each of grippers 150A-E may be deactivated to the OFF state, but grippers 150A-E may continue hold part assembly 120 due to the respective grippers 150A-E and supports 314 both pressing on part assembly 120 because EOAT 100 is held relative to fixture 300. In this manner, grippers 150A-E hold part assembly 120 through a first interaction (magnetic) when EOAT 100 is spaced apart from fixture 300 and through a second interaction (pinching or clamping with a supports 314 of fixture 300) when EOAT 100 is coupled to fixture 300 with the respective interfacing features.

In this way EOAT 100 may replace the clamps of traditional fixtures which are used to retain objects relative to fixture 300. Clamps interface with objects at opposing sides and are positioned outside of outer perimeter 126 of part assembly 120. Such aspects may introduce additional mechanical complexity, as clamps may have an open configuration in which EOAT 100 may place objects, such as part assembly 120, on a clamping fixture, at which point clamps may be actuated so as to retain the objects without use of EOAT 100. Rather, EOAT 100 is removed. This clamping results in larger clearances needed around fixture 300 to accommodate open clamps, additional components, and longer times to secure and perform manufacturing operations on part assembly 120.

By contrast, fixture 300 is used in conjunction with EOAT 100 in FIG. 27 to retain part assembly 120. This may reduce the amount of time spent loading the objects into fixture 300. For example, in instances where a clamping fixture is used, EOAT 100 may release part assembly 120, and may move away from the clamping fixture. As another example, EOAT 100 may be designed with the operation of clamps in mind, making the design and manufacturing of the EOAT potentially more complex. Subsequently, the clamps may be actuated as described above.

By contrast, EOAT 100 need not move away from fixture 300 in FIG. 27 and may instead act to clamp or otherwise retain part assembly 120. In some instances, EOAT 100 may be decoupled from an associated robot 90. In such instances, fixture 300 may provide power to EOAT 100 (e.g., in place of power provided by the robot). For example, EOAT 100 may interface with fixture 300, fixture 300 may provide power to EOAT 100, and EOAT 100 may be decoupled from the robot 90 once power is provided to EOAT 100 by fixture 300. While examples herein are described with respect to provision of power by a fixture 300 (e.g., in place of power supplied by via robot 90) to magnetic gripper 330, magnetic gripper 336, and magnetic gripper 342, it will be appreciated that similar techniques may be used for any of a variety of other types of grippers, such as suction grippers.

While EOAT 100 and fixture 300 are each illustrated as comprising three sets of corresponding interfacing features, it will be appreciated that any number of such aspects may be used. Further, an interfacing feature of fixture 300 need not have a corresponding interfacing feature of EOAT 100.

For example, in instances where an object is ferromagnetic, a magnetic gripper may be used by a fixture to grip the object in the absence of a corresponding interfacing feature on an EOAT. As another example, an object may be configured to interface with a locator of the fixture, rather than a corresponding region of the EOAT 100. Further, exemplary interfacing features 304, 306, 308, 310, and 312 may each comprise both a locator and a magnetic gripper, such that the respective interfacing features of fixture 300, in conjunction with the respective interfacing features of EOAT 100, locate and retain EOAT 100 and objects, such as part assembly 120, in relation to fixture 300.

Figure 29:
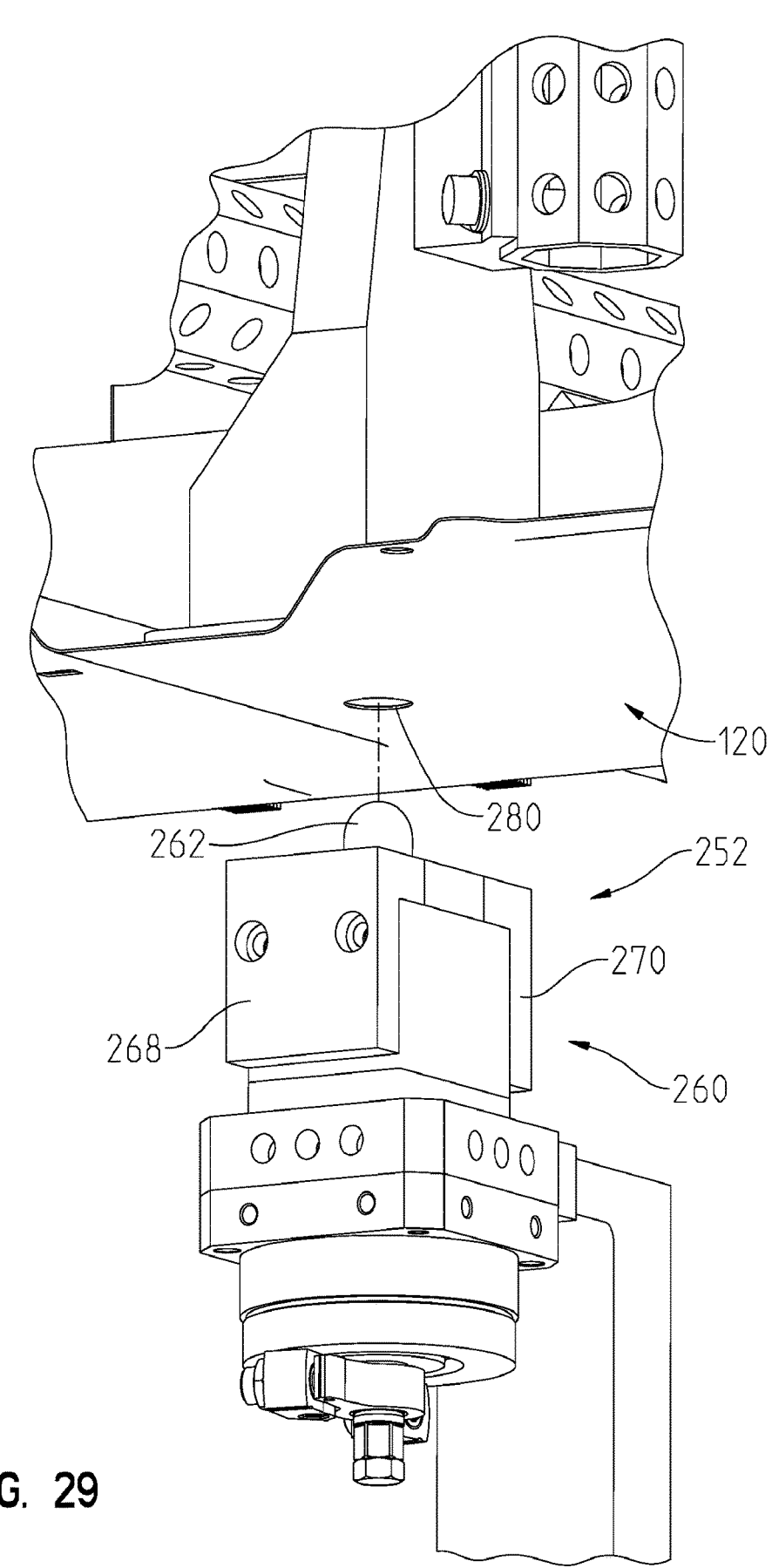
FIG. 29 illustrates a lower perspective view of a second interfacing feature of the EOAT spaced apart from a second interfacing feature of the fixture as the EOAT approaches the fixture.
Figure 30:
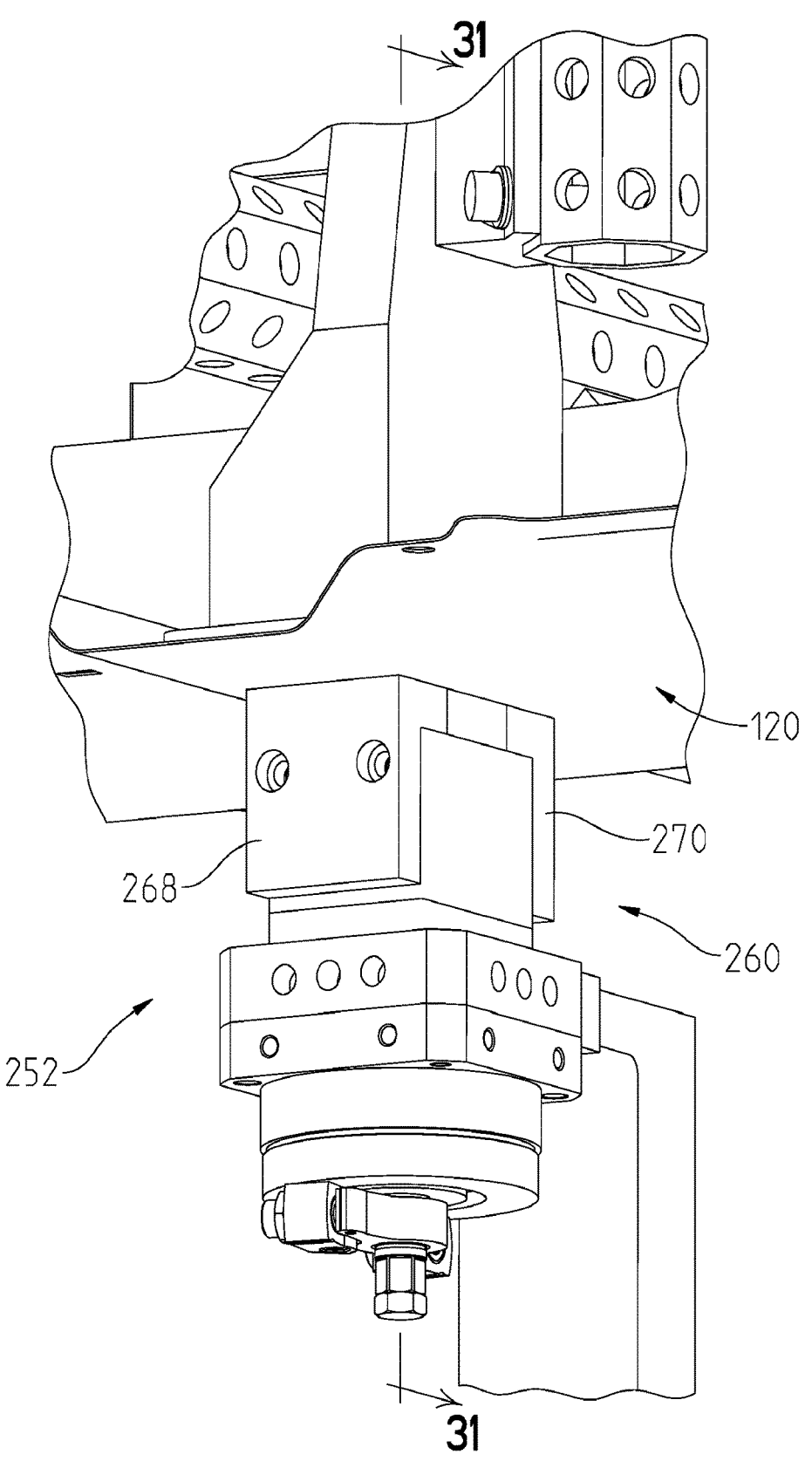
FIG. 30 illustrates the lower perspective view of FIG. 29 of the second interfacing feature of the EOAT coupled to the second interfacing feature of the fixture.
Figure 31:
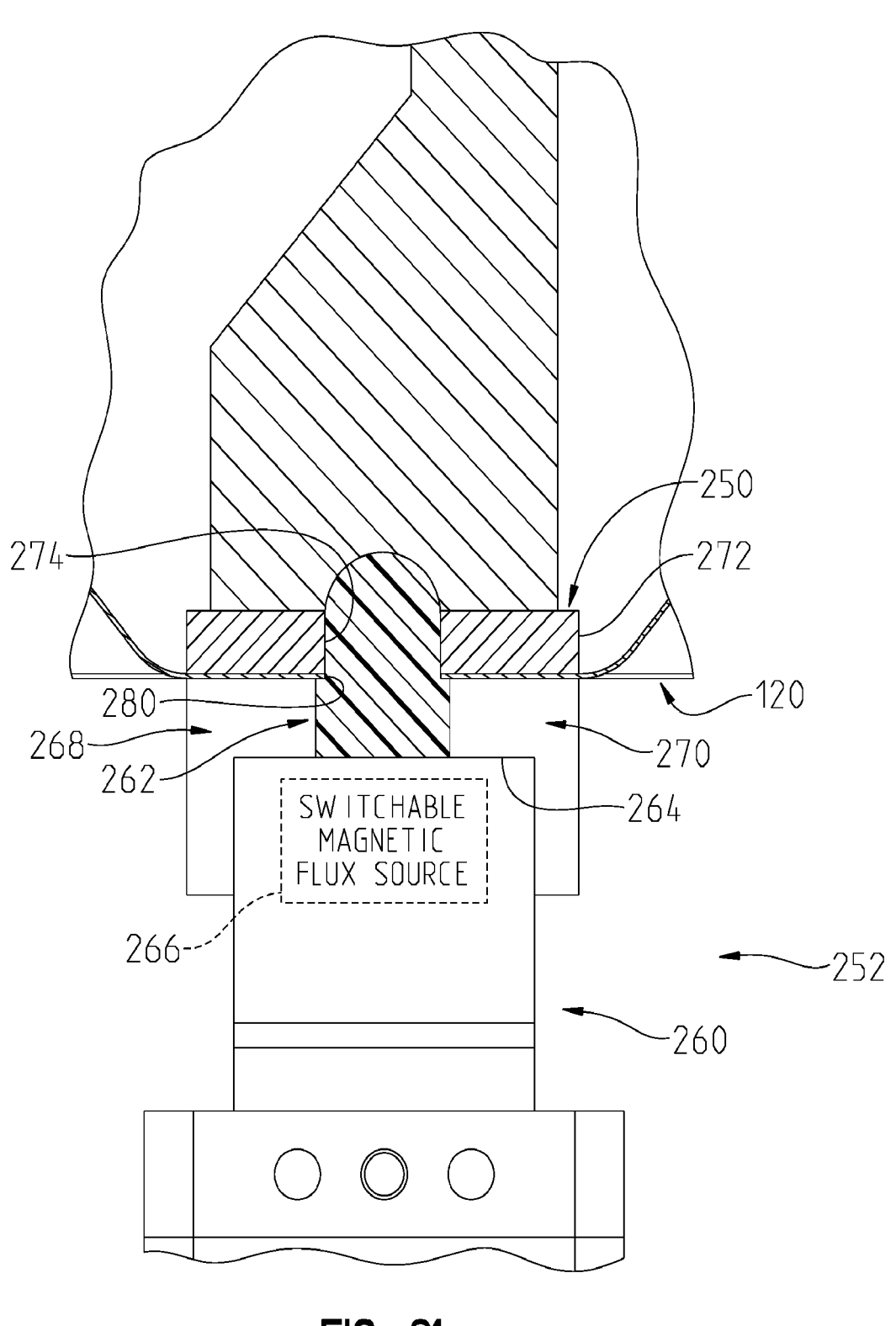
FIG. 31 illustrates a partial sectional view of the second interfacing feature of the EOAT coupled to the second interfacing feature of the fixture taken along lines 31-31 in FIG. 30.

Referring to FIGS. 29-31, an example of an interfacing feature 250 of EOAT 100 and an interfacing feature 252 of fixture 300 is shown wherein interfacing feature 252 includes both a locator and a magnetic gripper. Interfacing feature 250 of EOAT 100 and interfacing feature 252 of fixture 300 are shown as replacements for interfacing feature 110 of EOAT 100 and interfacing feature 310 of fixture 300. Referring to FIG. 31, interfacing feature 252 includes a magnetic gripper 260 which supports a locator pin 262 on an end 264 thereof. Magnetic gripper 260 includes a switchable magnetic flux source 266, a first pole shoe 268, and a second pole shoe 270. Interfacing feature 250 includes a ferromagnetic component, illustratively a plate 272 having an aperture 274 therein. Aperture 274 receives locator pin 262. In the illustrated example, part assembly 120 also includes an aperture 280 which receives locator pin 262. In other examples, part assembly 120 is not present between interfacing feature 250 and interfacing feature 252. When switchable magnetic flux source 266 is in an ON state, a magnetic circuit is formed by switchable magnetic flux source 266, first pole shoe 268, second pole shoe 270, plate 272, and part assembly 120. Pin 262 and the plate supporting the pin 262 are made of a non-ferromagnetic material to increase the magnetic flux flowing through plate 272. In embodiments, pin 262 may be part of first pole shoe 268 or second pole shoe 270 and made of a ferromagnetic material.

Figure 42:
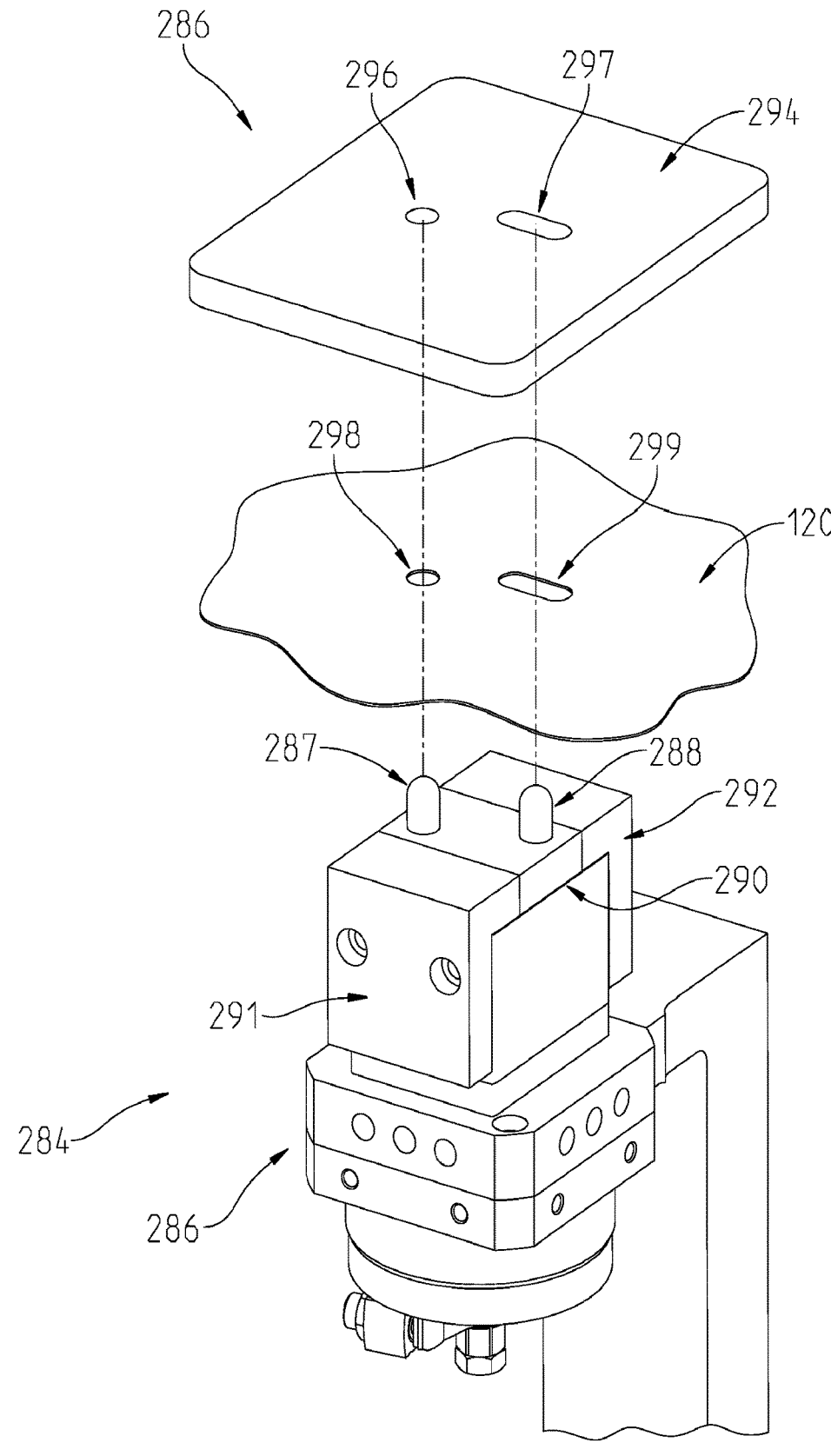
FIG. 42 illustrates an exemplary interfacing feature of an EOAT and an exemplary interfacing feature of a fixture, wherein each of the exemplary interfacing feature of an EOAT and the exemplary interfacing feature of a fixture include multiple locators to both position and orient the EOAT relative to the fixture.

Referring to FIG. 42, another exemplary interfacing feature 284 of fixture 300 and interfacing feature 286 of EOAT 100 are shown. Interfacing feature 286 of EOAT 100 and interfacing feature 284 of fixture 300 are shown as replacements for interfacing feature 110 of EOAT 100 and interfacing feature 310 of fixture 300. Interfacing feature 284 includes a magnetic gripper 286 which supports a first locator pin 287 and a second locator pin 288 on an end 290 thereof. Magnetic gripper 260 includes a switchable magnetic flux source (not shown), a first pole shoe 291, and a second pole shoe 292. Interfacing feature 286 includes a ferromagnetic component, illustratively a plate 294 having a first aperture 296 and a second aperture 297 therein. First aperture 296 receives first locator pin 287 and second aperture 297 receives second locator pin 288. In the illustrated example, part assembly 120 also includes a first aperture 298 which receives first locator pin 287 and a second aperture 299 which receives second locator pin 288. In other examples, part assembly 120 is not present between fpf 286 and interfacing feature 284. When the magnetic flux source of interfacing feature 286 is in an ON state, a magnetic circuit is formed by the magnetic flux source, first pole shoe 291, second pole shoe 292, plate 294, and part assembly 120. Pins 287 and 288 are made of a non-ferromagnetic material to increase the magnetic flux flowing through plate 294. Further by having both first locator pin 287 and second locator pin 288 interfacing feature 284 is able to both position and orient EOAT 100 relative to fixture 300 and interfacing feature 286 holds EOAT 100 and part assembly 120 relative to fixture 300.

It will be appreciated that the number of regions with which a fixture interfaces with an EOAT may vary, both in number and location. For example, in instances where a single object is used or smaller objects are used, a reduced number of regions and associated interfacing features may be used. As another example, if a greater number of objects are retained by an EOAT, a greater number of regions and associated interfacing features may similarly be used to retain the objects by the EOAT and the fixture.

While example interfacing features are described herein with respect to EOAT 100 and fixture 300, it will be appreciated that any of a variety of such features may be used. Further, feature types need not be mutually exclusive to EOAT 100 or fixture 300. For example, a fixture may comprise a locator interfacing feature and a magnetic gripper interfacing feature. In such an example, a corresponding EOAT may comprise an interfacing feature configured to receive the locator, as well as a locator interfacing feature that interfaces with the magnetic gripper interfacing feature of the fixture.

In exemplary embodiments, one or both of the EOAT and the fixture are reconfigurable to accommodate different arrangements of at least one part. Exemplary EOAT and fixtures that may be reconfigured are disclosed in PCT Application No. PCT/US22/33154, titled ADJUSTABLE END-OF-ARM TOOL OR FIXTURE, filed Jun. 11, 2022, the entire disclosure of which is expressly incorporated herein by reference. In embodiments, the exemplary EOAT and fixtures disclosed in PCT Application No. PCT/US22/33154 include both adjustable assemblies for interfacing features and adjustable assemblies for grippers.

Exemplary magnetic coupling devices which may be implemented as interfacing features of EOAT and/or fixture and/or as grippers for holding parts of EOAT and/or fixture are disclosed in FIGS. 32-41.

Figures 32, 33:
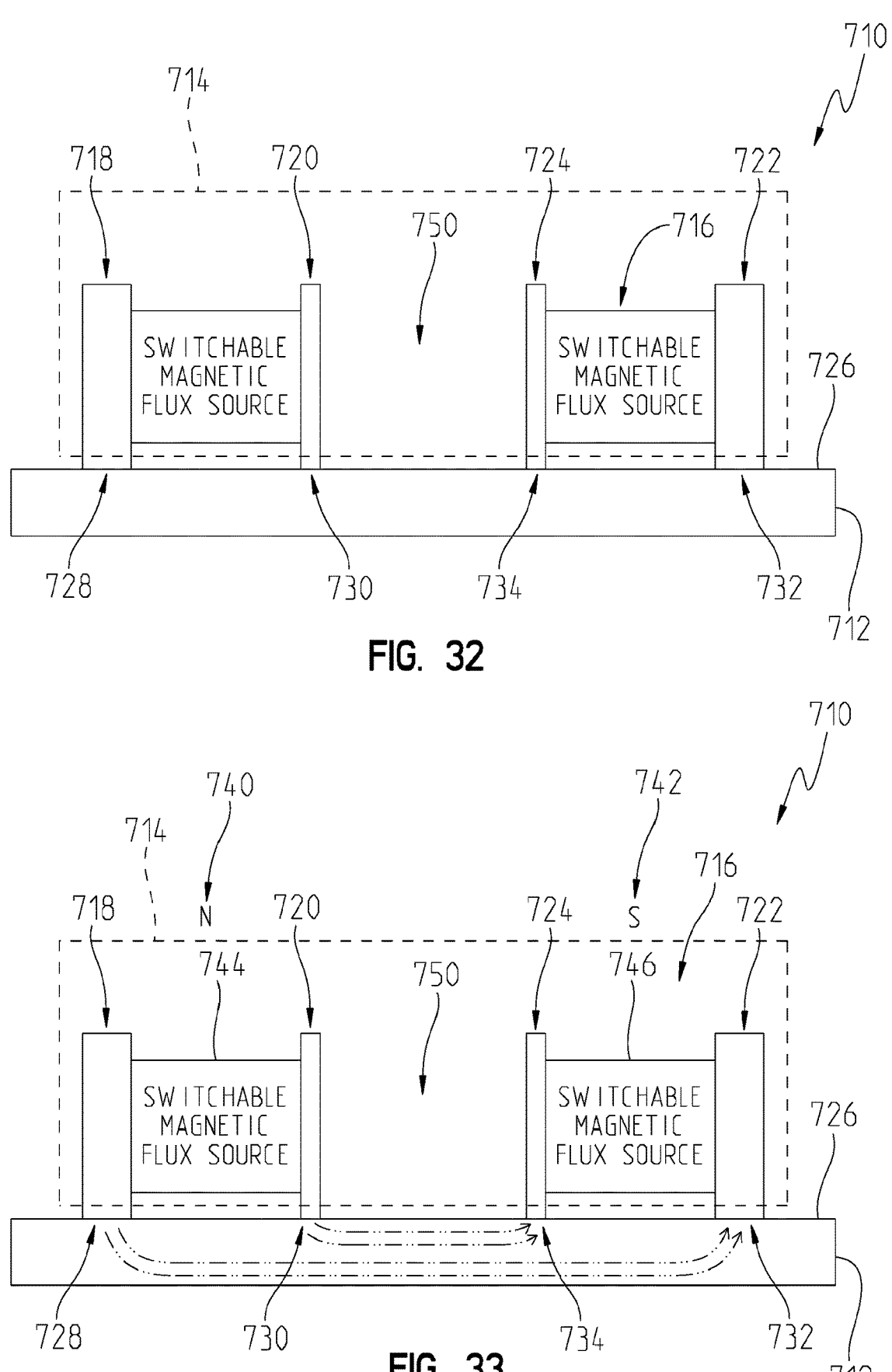
FIG. 32 illustrates a representative view of an exemplary magnetic coupling device having multiple workpiece contact interfaces for each pole of the magnetic coupling device and the magnetic coupling device in an OFF state.
FIG. 33 illustrates the magnetic coupling device of FIG. 32 with the magnetic coupling device in an ON state.

Referring to FIG. 32, an exemplary magnetic coupling device 710 is shown. Magnetic coupling device 710 is configured to magnetically couple a ferromagnetic workpiece 712. Magnetic coupling device 710 includes a housing 714, a switchable magnetic flux source 716, a first north pole portion 718, a second north pole portion 720, a first south pole portion 722, and a second south pole portion 724. First north pole portion 718 includes a workpiece interface 728, second north pole portion 720 includes a workpiece interface 730, first south pole portion 722 includes a workpiece interface 732, and second south pole portion 724 includes a workpiece interface 734, each of which contacts a respective part of ferromagnetic workpiece 712, illustratively a surface 726 of ferromagnetic workpiece 712. Each of workpiece interface 728, workpiece interface 730, workpiece interface 732, and workpiece interface 734 include at least one workpiece engagement surface. Workpiece interface 728, workpiece interface 730, workpiece interface 732, and workpiece interface 734 may each be planar, curved, contoured, have a plurality of spaced apart projections, or any other suitable shape for contacting ferromagnetic workpiece 712. Each of first north pole portion 718, second north pole portion 720, first south pole portion 722, and second south pole portion 724 are made of a ferromagnetic material and may be a part of housing 714 or separate components coupled to housing 714.

Switchable magnetic flux source 716 of magnetic coupling device 710 is switchable between an OFF state wherein a magnetic circuit is formed within housing 714 and an ON state wherein a magnetic circuit is formed from switchable magnetic flux source 716 through workpiece interface 728 and workpiece interface 730 of magnetic coupling device 710, through ferromagnetic workpiece 712, through workpiece interface 732 and workpiece interface 734 of magnetic coupling device 710, and back to switchable magnetic flux source 716 (as represented by the arrows shown in FIG. 33). In embodiments, switchable magnetic flux source 716 may be placed in at least one partial ON state wherein the strength of the magnetic circuit formed through ferromagnetic workpiece 712 is more than the OFF state and less than the ON state.

Switchable magnetic flux source 716 may include multiple permanent magnets and is configurable to have an overall north pole portion 744 and an overall south pole portion 746. As shown in FIG. 33, overall north pole portion 744 of switchable magnetic flux source 716 is positioned between first north pole portion 718 and second north pole portion 720 and overall south pole portion 746 of switchable magnetic flux source 716 is positioned between first south pole portion 722 and second south pole portion 724. Overall north pole portion 744 of switchable magnetic flux source 716 is magnetically coupled with first north pole portion 718 and second north pole portion 720 resulting in workpiece interface 728 of first north pole portion 718 and workpiece interface 730 of second north pole portion 720 forming an overall north pole 740 of magnetic coupling device 710. Overall south pole portion 746 is magnetically coupled with first south pole portion 722 and second south pole portion 724 resulting in workpiece interface 732 of first south pole portion 722 and workpiece interface 734 of second south pole portion 724 forming an overall south pole 742 of magnetic coupling device 710.

Switchable magnetic flux source 716 may include one or more permanent magnets and is configurable to have an overall north pole portion 744 and an overall south pole portion 746. In embodiments, switchable magnetic flux source 716 includes at least one electro-permanent magnet which is switchable between an ON state (having a north pole and a south pole) and an OFF state (not magnetized relative to external objects). Further, the at least one electro-permanent magnet may be configured to have varying magnetic strengths which allow the device to be configured in a partial ON state having a magnetic strength at workpiece interfaces 728, 730, 732, and 734 less than the ON state and greater than an OFF state. In embodiments, switchable magnetic flux source 716 includes at least one rare earth permanent magnet and at least one electro-permanent magnet, the combination of which is switchable between an ON state having a magnetic strength at workpiece interfaces 728, 730, 732, and 734 and an OFF state wherein a magnetic circuit is formed internally to housing 714. Further, the combination may be configured to have varying magnetic strengths which allow the device to be configured in a partial ON state having a magnetic strength at workpiece interfaces 728, 730, 732, and 734 less than the ON state and greater than an OFF state. In embodiments, switchable magnetic flux source 716 includes a plurality of rare earth permanent magnets, the combination of which is switchable between an ON state having a magnetic strength at workpiece interfaces 728, 730, 732, and 734 and an OFF state wherein a magnetic circuit is formed internally to housing 714. Further, the combination may be configured to have varying magnetic strengths which allow the device to be configured in a partial ON state having a magnetic strength at workpiece interfaces 728, 730, 732, and 734 less than the ON state and greater than an OFF state. In embodiments, switchable magnetic flux source 716 includes at least one rare earth permanent magnet which is moveable relative to the housing 714 to thus be switchable between an ON state having a magnetic strength at workpiece interfaces 728, 730, 732, and 734 and an OFF state wherein a magnetic circuit is formed internally to housing 714.

As shown in FIGS. 32 and 33, a channel 750 is provided between pole portions 720 and 724. Channel 750, as discussed herein, may receive one or more sensors, stationary pins, retractable pins, probes, and/or additional tools.

Figure 34:
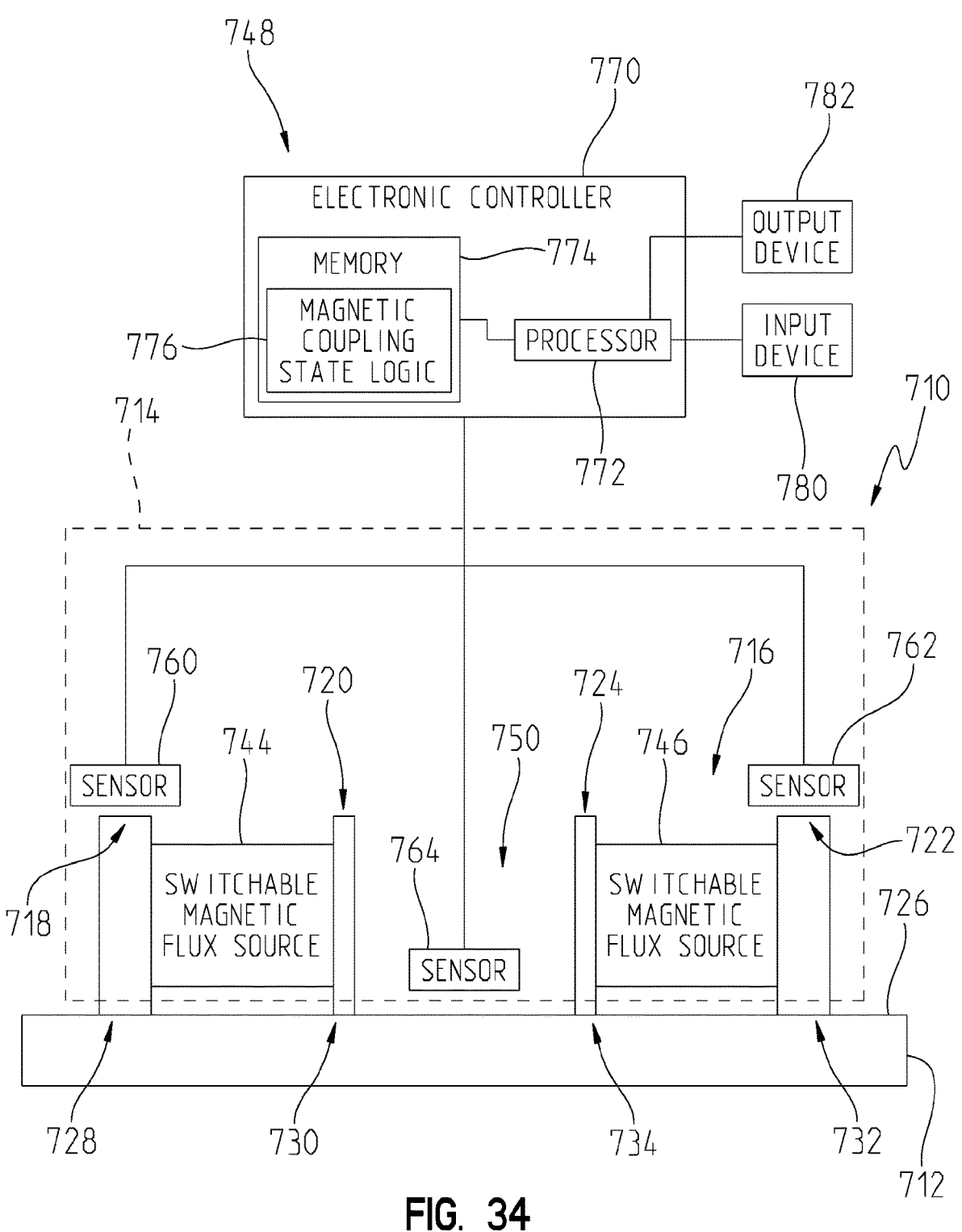
FIG. 34 illustrates the magnetic coupling device of FIG. 32 with a sensing system.

Referring to FIG. 34, in embodiments, magnetic coupling device 710 further includes a monitoring system 748 including one or more sensors which monitor a characteristic of magnetic coupling device 710 and/or a characteristic of a magnetic circuit formed between magnetic coupling device 710 and ferromagnetic workpiece 712. As shown in FIG. 34, a first sensor 760 may be positioned proximate first north pole portion 718, a second sensor 762 may be positioned proximate first south pole portion 722, and a third sensor 764 may be positioned proximate ferromagnetic workpiece 712 in a channel 750 provided between second north pole portion 720 and second south pole portion 724. Each of first sensor 760, second sensor 762, and third sensor 764 may be a magnetic flux sensor. Additional types of sensors include temperature sensors which are used to compensate for temperature dependent drift in the magnetic flux sensors. Additionally, the positions of sensors 760, 762, and 764 are exemplary and one or sensors may be positioned at different locations. In embodiments, sensor 764 may be a proximity sensor. Exemplary proximity sensors include inductive sensors, ultrasound sensors, photonic sensors, and other suitable sensors.

Each of sensors 760, 762, and 64 are operatively coupled to an electronic controller 770. Electronic controller 770 includes at least one processor 772 and associated memory 774. Memory 774 includes magnetic coupling state logic 776, logic control circuit, which monitors the output of sensors 760, 762, 764 to determine one or more characteristics of magnetic coupling device 710 and/or one or more characteristics of a magnetic circuit formed between magnetic coupling device 710 and ferromagnetic workpiece 712. The term "logic" as used herein includes software and/or firmware executing on one or more programmable processors, application-specific integrated circuits, field-programmable gate arrays, digital signal processors, hardwired logic, or combinations thereof. Therefore, in accordance with the embodiments, various logic may be implemented in any appropriate fashion and would remain in accordance with the embodiments herein disclosed. A non-transitory machine-readable medium comprising logic can additionally be considered to be embodied within any tangible form of a computer-readable carrier, such as solid-state memory, magnetic disk, and optical disk containing an appropriate set of computer instructions and data structures that would cause a processor to carry out the techniques described herein. This disclosure contemplates other embodiments in which electronic controller 770 is not microprocessor-based, but rather is configured to control operation of magnetic coupling device 800 based on one or more sets of hardwired instructions. Further, electronic controller 770 may be contained within a single device or be a plurality of devices networked together or otherwise electrically connected to provide the functionality described herein.

Electronic controller 770 may further receive input through one or more input devices 780. Exemplary input devices include buttons, switches, levers, dials, touch displays, soft keys, and a communication module. Electronic controller 770 may further provide output through one or more output devices 782. Exemplary output devices include visual indicators, audio indicators, and a communication module. Exemplary visual indicators include displays, lights, and other visual systems. Exemplary audio indicators include speakers and other suitable audio systems.

Figure 35:
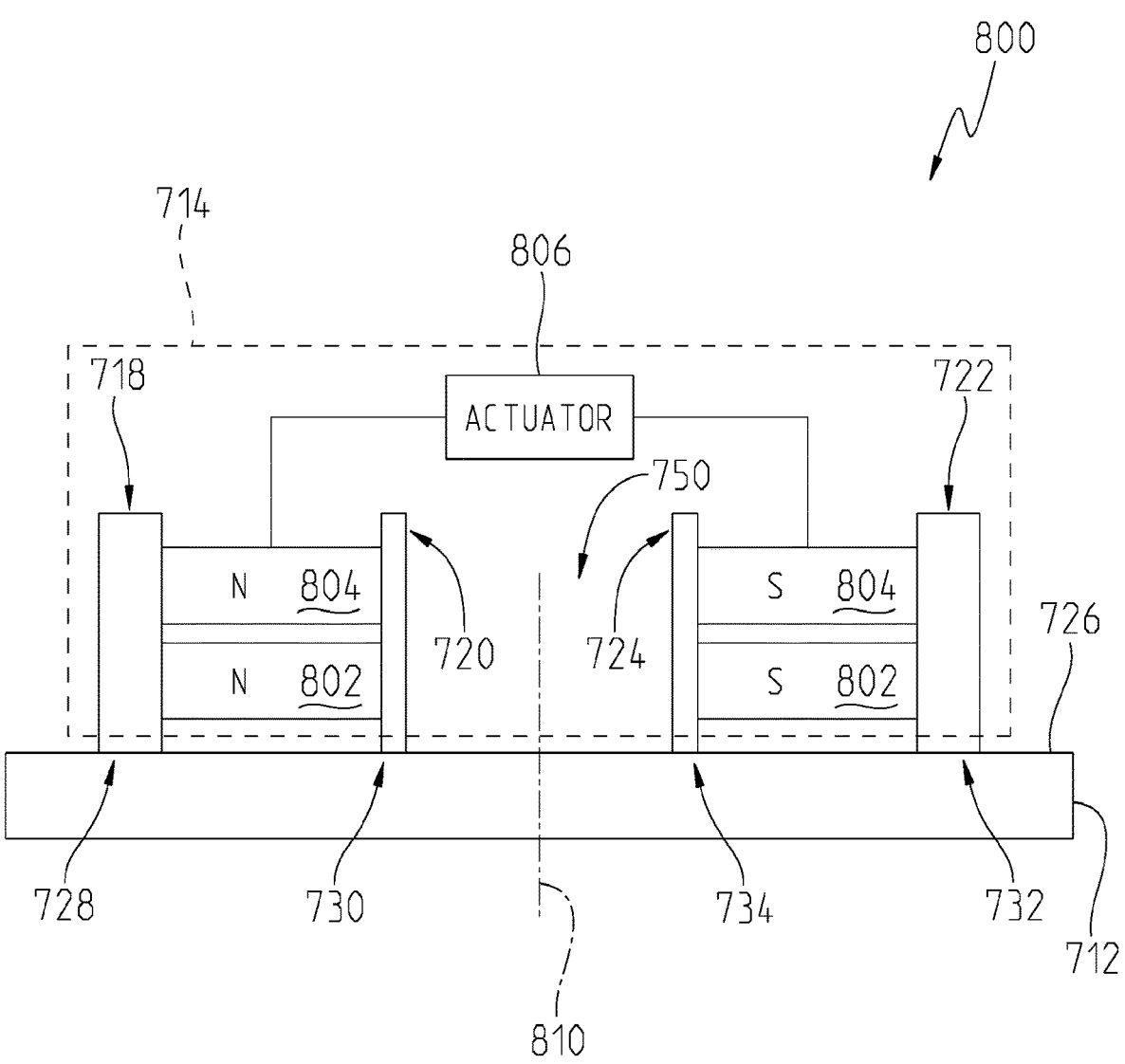
FIG. 35 illustrates a representative view of an exemplary magnetic coupling device having multiple workpiece contact interfaces for each pole of the magnetic coupling device, the magnetic coupling device including a stack of permanent magnets with a first permanent magnet moveable relative to a second permanent magnet with an actuator.

Referring to FIG. 35, each of workpiece interface 730 and workpiece interface 734 are closer to rotational axis 810 than either of first permanent magnet 802 and second permanent magnet 804. Between workpiece interface 730 and workpiece interface 734 is channel 750 which as mentioned herein may receive one or more sensors, stationary pins, retractable pins, retractable pin clamps, cameras, probes, and/or additional tools. Workpiece interface 730 of second north pole portion 720 and workpiece interface 734 of second south pole portion 724 provide an external north pole of magnetic coupling device 800 and an external south pole of magnetic coupling device 800, respectively, of a magnetic circuit formed with rare earth permanent magnets without any of the rare earth permanent magnets forming the magnetic circuit being positioned between second north pole portion 720 and second south pole portion 724. Further, in embodiments, each of first permanent magnet 802 and second permanent magnet 804 surround rotational axis 810 and each of first permanent magnet 802 and second permanent magnet 804 include a respective aperture to form part of channel 750.

Referring to FIG. 35, an exemplary embodiment of magnetic coupling device 710 is shown, illustratively magnetic coupling device 800. Magnetic coupling device 800 includes a switchable magnetic flux source 716 having a first permanent magnet 802 and a second permanent magnet 804. Second permanent magnet 804 is spaced apart from first permanent magnet 802. In embodiments, a spacer (not shown) is positioned between first permanent magnet 802 and second permanent magnet 804. In embodiments, each of first permanent magnet 802 and second permanent magnet 804 are rare earth permanent magnets.

Second permanent magnet 804 is moveable relative to first permanent magnet 802. magnetic coupling device 800 includes an actuator 806 which positions second permanent magnet 804 relative to first permanent magnet 802. Exemplary actuators 806 include manual actuators, hydraulic actuators, pneumatic actuators, mechanical actuators, electrically controlled actuators, and combinations thereof. Actuator 806 may be an electrically controlled actuator and includes a motor (not shown) which is controlled by electronic controller 770 to position second permanent magnet 804 relative to first permanent magnet 802. Exemplary actuators are disclosed in U.S. Pat. No. 10,903,030, the entire disclosure of which is expressly incorporated by reference herein.

In embodiments, actuator 806 rotates second permanent magnet 804 relative to first permanent magnet 802 about a rotational axis 810. First permanent magnet 802 is held fixed relative to housing 714. Workpiece interface 728 of first north pole portion 718, workpiece interface 730 of second north pole portion 720, workpiece interface 732 of first south pole portion 722, and workpiece interface 734 of second south pole portion 724 are magnetically coupled to first permanent magnet 802 and second permanent magnet 804. In embodiments, one or both of first permanent magnet 802 and second permanent magnet 804 are comprised of a single rare earth magnet. In embodiments, one or both of first permanent magnet 802 and second permanent magnet 804 are comprised of a multiple rare earth magnets that collectively form the respective first permanent magnet 802 or second permanent magnet 804.

In one position of second permanent magnet 804 relative to first permanent magnet 802, a north pole of second permanent magnet 804 is generally aligned with a north pole of first permanent magnet 802 and a south pole of second permanent magnet 804 is generally aligned with a south pole of first permanent magnet 802, as shown in FIG. 35. This configuration corresponds to magnetic coupling device 800 being in an ON state with workpiece interface 728 of first north pole portion 718 and workpiece interface 730 of second north pole portion 720 corresponding to an external north pole of magnetic coupling device 800 and workpiece interface 732 of first south pole portion 722 and workpiece interface 734 of second south pole portion 724 corresponding to an external south pole of magnetic coupling device 800. In the ON state, when magnetic coupling device 800 is in contact with ferromagnetic workpiece 712, a magnetic circuit is formed to magnetically couple ferromagnetic workpiece 712 to magnetic coupling device 800.

Figure 36:
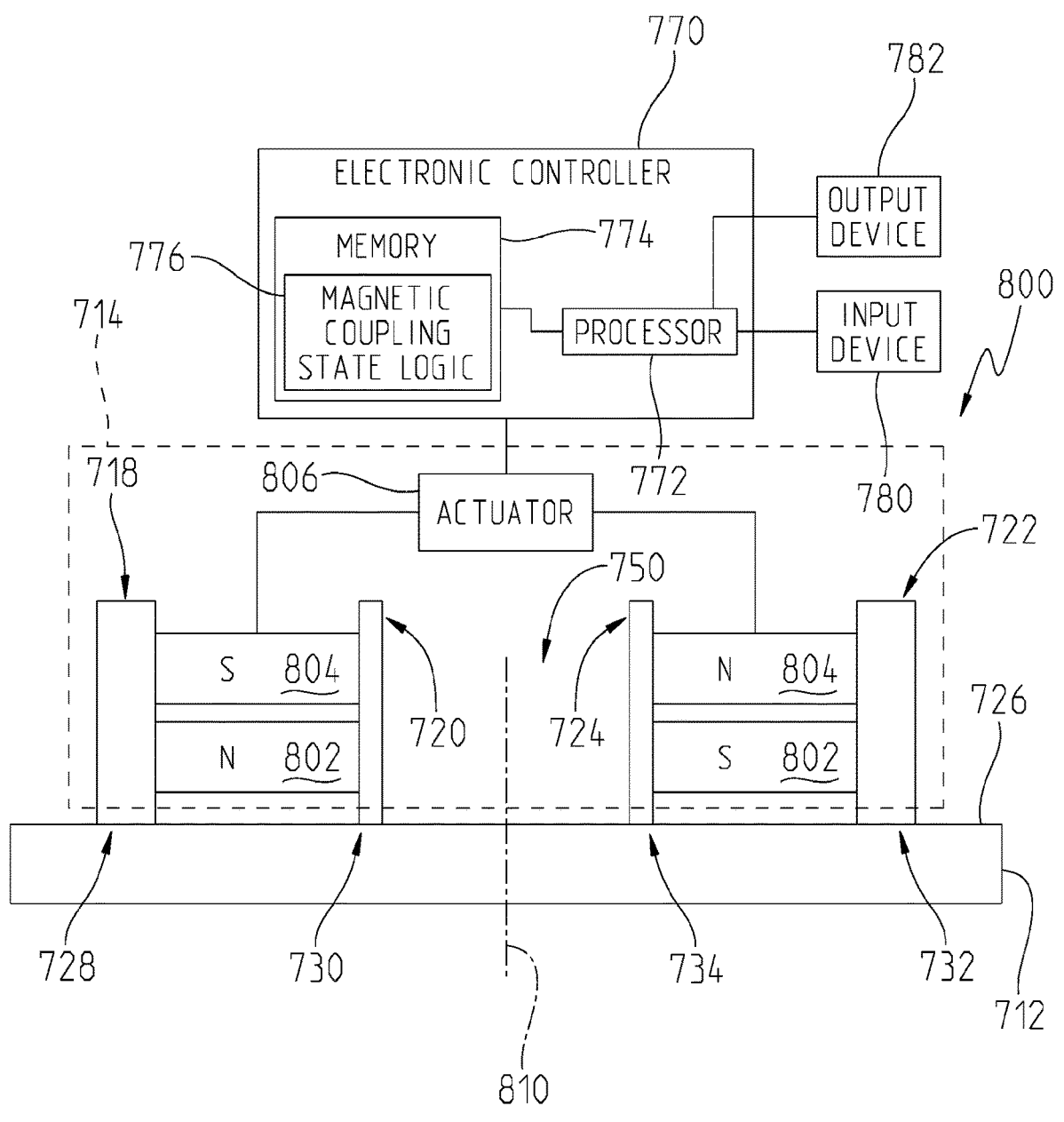
FIG. 36 illustrates the magnetic coupling device of FIG. 35 including an electronic controller operatively coupled to the actuator.

In another position of second permanent magnet 804 relative to first permanent magnet 802, a north pole of second permanent magnet 804 is generally aligned with a south pole of first permanent magnet 802 and a south pole of second permanent magnet 804 is generally aligned with a north pole of first permanent magnet 802, as shown in FIG. 36. This configuration corresponds to magnetic coupling device 800 being in an OFF state and a magnetic circuit is formed generally within housing 714; magnetic coupling device 800 lacks an external north pole at workpiece interface 728 of first north pole portion 718 and workpiece interface 730 of second north pole portion 720 and an external south pole at workpiece interface 732 of first south pole portion 722 and workpiece interface 734 of second south pole portion 724. In the OFF state, ferromagnetic workpiece 712 is not magnetically coupled to magnetic coupling device 800.

Actuator 806 rotates second permanent magnet 804 about rotational axis 810 to move second permanent magnet 804. In embodiments, actuator 806 is able to position second permanent magnet 804 at rotational positions between those shown in FIGS. 35 and 36. These intermediate rotational positions correspond to partial ON states of magnetic coupling device 800 with workpiece interface 728 of first north pole portion 718 and workpiece interface 730 of second north pole portion 720 corresponding to an external north pole of magnetic coupling device 800 and workpiece interface 732 of first south pole portion 722 and workpiece interface 734 of second south pole portion 724 corresponding to an external south pole of magnetic coupling device 800, but having a lower level of magnetic flux available at each of the external north pole and the external south pole. As such, magnetic coupling device 800 is able to be configured to provide a variable strength magnetic flux level to perform various operations, such as the operations disclosed in U.S. Pat. No. 10,903,030, the entire disclosure of which is expressly incorporated by reference herein.

Referring to FIG. 35, each of workpiece interface 730 and workpiece interface 734 are closer to rotational axis 810 than either of first permanent magnet 802 and second permanent magnet 804. Between workpiece interface 730 and workpiece interface 734 is channel 750 which as mentioned herein may receive one or more sensors and/or tools, such as probes. Workpiece interface 730 of second north pole portion 720 and workpiece interface 734 of second south pole portion 724 provide an external north pole of magnetic coupling device 800 and an external south pole of magnetic coupling device 800, respectively, of a magnetic circuit formed with rare earth permanent magnets without any of the rare earth permanent magnets forming the magnetic circuit being positioned between second north pole portion 720 and second south pole portion 724. Further, in embodiments, each of first permanent magnet 802 and second permanent magnet 804 surround rotational axis 810 and each of first permanent magnet 802 and second permanent magnet 804 include a respective aperture to form part of channel 750.

Figure 38:
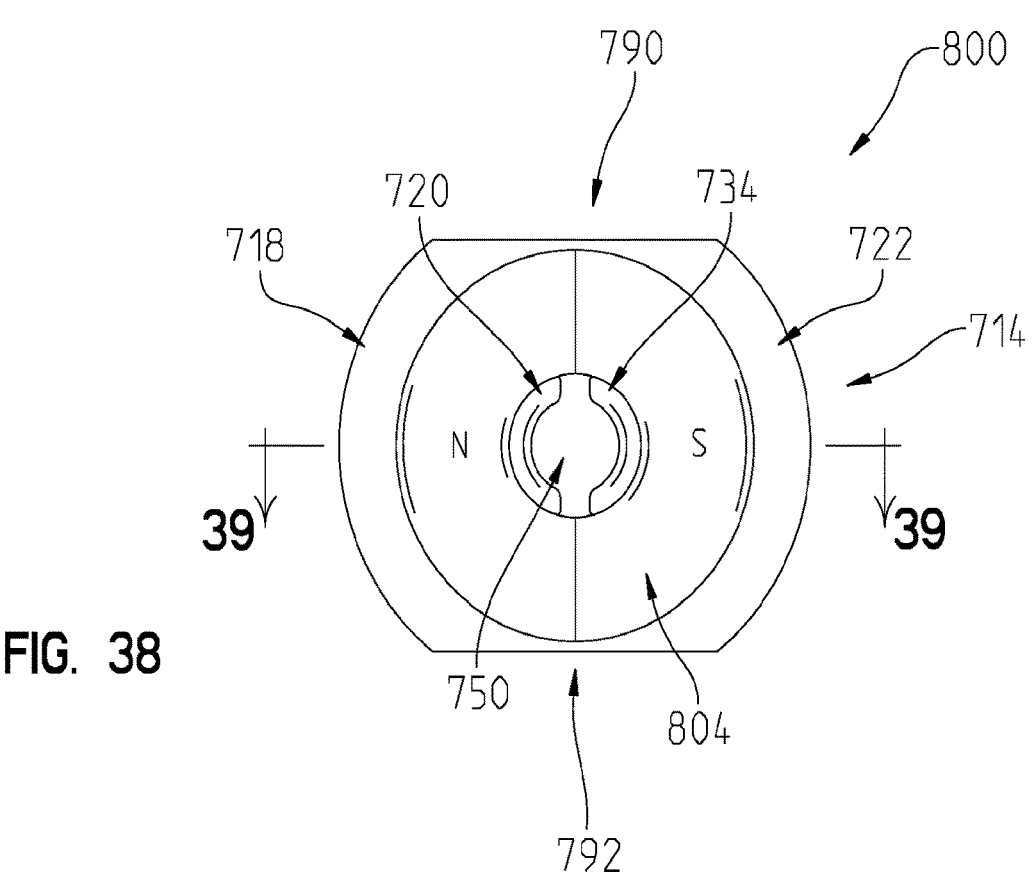
FIG. 38 illustrates a top view of an exemplary magnet and pole piece assembly of the magnetic coupling device of FIG. 35.
Figure 39:
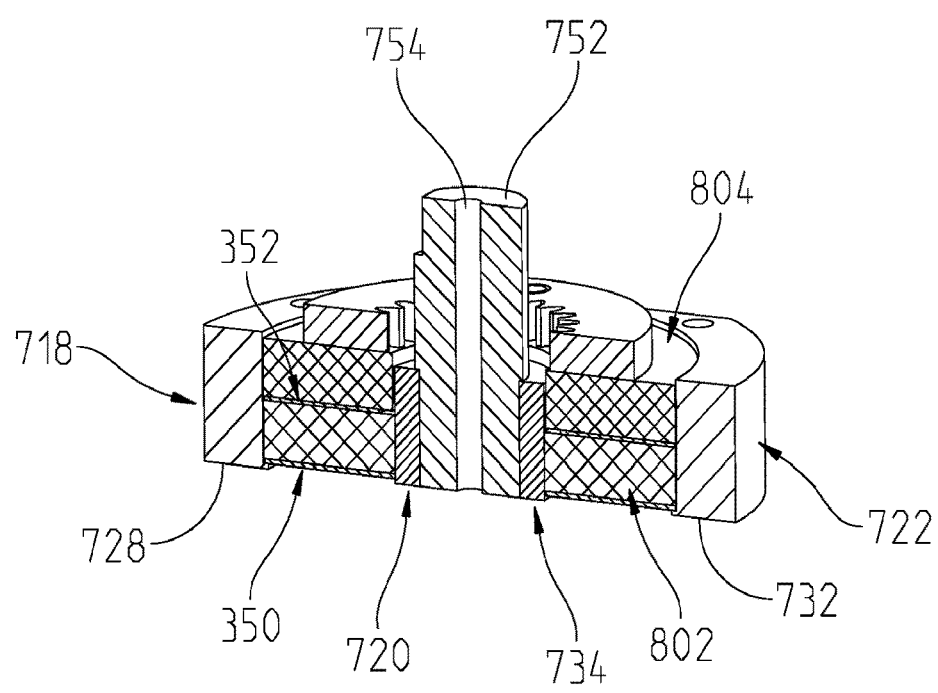
FIG. 39 illustrates a sectional view of another exemplary magnet and pole piece assembly of the magnetic coupling device of FIG. 35.

Referring to FIGS. 38 and 39, an exemplary arrangement for magnetic coupling device 800 is shown. Second north pole portion 720 and workpiece interface 734 are carried by a support 752 (see FIG. 39). Channel 750 is provided as a central opening 754 through support 752.

Referring to FIG. 38, housing 714 is made of a ferromagnetic material. An exemplary ferromagnetic material is steel. Housing 714 is dimensioned such that only thin wall webs 790 and 792 connect first north pole portion 718 and housing 714 which are both thick walled portions of housing 714. By having thin wall webs 790 and thin wall webs 792 being thinner than first north pole portion 718 and first south pole portion 722, the magnetic flux is directed through workpiece interface 728 of first north pole portion 718 and workpiece interface 732 of first south pole portion 722 into ferromagnetic workpiece 712 instead of passing between first north pole portion 718 and first south pole portion 722 through thin wall webs 790 and thin wall webs 792.

Figure 37:
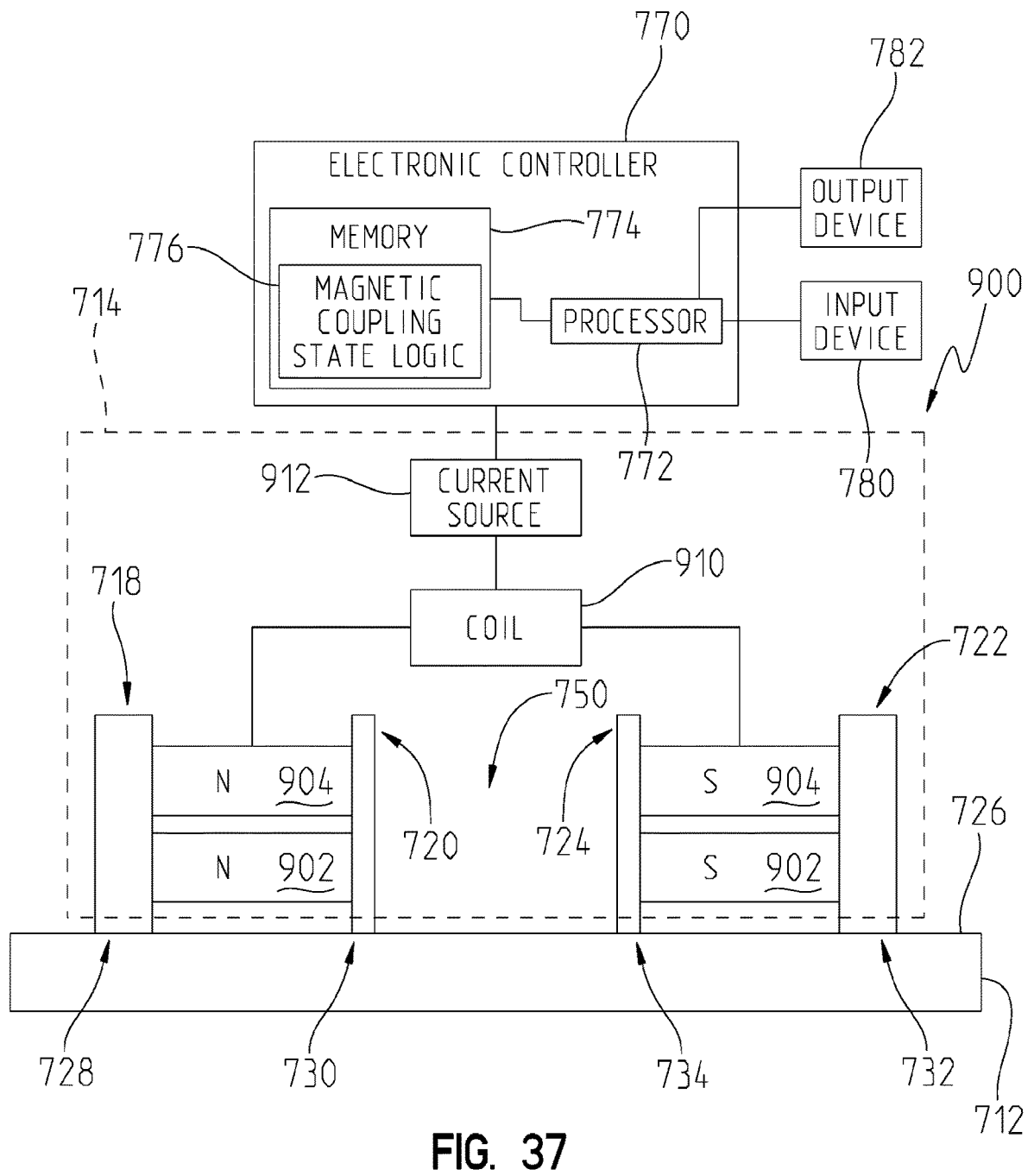
FIG. 37 illustrates a representative view of an exemplary magnetic coupling device having multiple workpiece contact interfaces for each pole of the magnetic coupling device, the magnetic coupling device including a stack of permanent magnets with a first electro-permanent magnet and a second permanent magnet.

Referring to FIG. 37, an exemplary embodiment of magnetic coupling device 710 is shown, illustratively magnetic coupling device 900. Magnetic coupling device 900 includes a switchable magnetic flux source 716 having a first permanent magnet 902 and a second permanent magnet 904. Second permanent magnet 904 is spaced apart from first permanent magnet 902. In embodiments, a spacer (not shown) is positioned between first permanent magnet 902 and second permanent magnet 904 or an air gap is maintained between first permanent magnet 902 and second permanent magnet 904. In embodiments, first permanent magnet 902 is a rare earth permanent magnet and second permanent magnet 904 is an electro-permanent magnet. First permanent magnet 902 and second permanent magnet 904 are held fixed relative to housing 714. Workpiece interface 728 of first north pole portion 718, workpiece interface 730 of second north pole portion 720, workpiece interface 732 of first south pole portion 722, and workpiece interface 734 of second south pole portion 724 are magnetically coupled to first permanent magnet 902 and second permanent magnet 904.

At least a portion of second permanent magnet 904 is surrounded by a coil 910 which is coupled to a current source 912. A direction and strength of a current provided through coil 910 is controlled by electronic controller 770. The current is used to alter the pole positions for second permanent magnet 904. In embodiments, the current may be used to position a north pole of second permanent magnet 904 in general alignment with a north pole of first permanent magnet 902 and a south pole of second permanent magnet 904 is general alignment with a south pole of first permanent magnet 902, as shown in FIG. 37. The current does not need to be persistent to maintain second permanent magnet 904 in this configuration. This configuration corresponds to magnetic coupling device 900 being in an ON state with workpiece interface 728 of first north pole portion 718 and workpiece interface 730 of second north pole portion 720 corresponding to an external north pole of magnetic coupling device 900 and workpiece interface 732 of first south pole portion 722 and workpiece interface 734 of second south pole portion 724 corresponding to an external south pole of magnetic coupling device 900. In the ON state, when magnetic coupling device 900 is in contact with ferromagnetic workpiece 712, a magnetic circuit is formed to magnetically couple ferromagnetic workpiece 712 to magnetic coupling device 900. In embodiments, the magnetic mass of first permanent magnet 902 and second permanent magnet 904 may be different or the same. In embodiments, one or both of first permanent magnet 902 and second permanent magnet 904 are comprised of a permanent magnet. In embodiments, one or both of first permanent magnet 802 and second permanent magnet 804 are comprised of multiple permanent magnets that collectively form the respective first permanent magnet 802 or second permanent magnet 804.

In embodiments, the current may be used to position a north pole of second permanent magnet 904 in general alignment with a south pole of first permanent magnet 902 and a south pole of second permanent magnet 904 in general alignment with a north pole of first permanent magnet 902.

This configuration corresponds to magnetic coupling device 900 being in an OFF state and a magnetic circuit is formed generally within housing 714; magnetic coupling device 900 lacks an external north pole at workpiece interface 728 of first north pole portion 718 and workpiece interface 730 of second north pole portion 720 and an external south pole at workpiece interface 732 of first south pole portion 722 and workpiece interface 734 of second south pole portion 724. In the OFF state, ferromagnetic workpiece 712 is not magnetically coupled to magnetic coupling device 800.

In embodiments, the electro permanent magnet of the second permanent magnet 904 may be charged to different levels to provide a variable magnetic strength at the workpiece interfaces 728, 730, 732, 734. Thus, at least one partial ON state may be configured having a magnetic strength at the workpiece interfaces 728, 730, 732, 734 being less than the ON state and greater than the OFF state. Exemplary electro-permanent magnets include AlNiCo electro-permanent magnets.

Referring to FIG. 37, between workpiece interface 730 and workpiece interface 734 is channel 750 which as mentioned herein may receive one or more sensors and/or tools, such as probes. In embodiments, each of first permanent magnet 802 and second permanent magnet 804 surround rotational axis 810 and each of first permanent magnet 802 and second permanent magnet 804 include a respective aperture to form part of channel 750.

Figure 17:
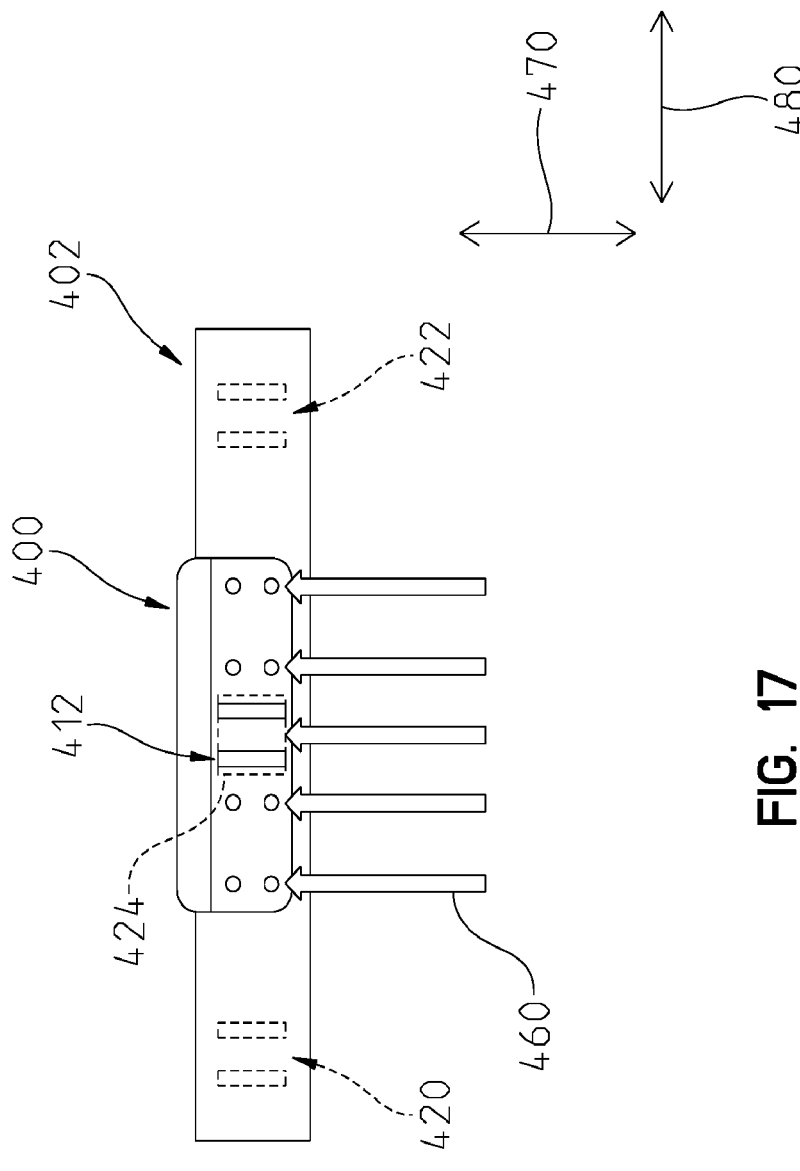
FIG. 17 illustrates a top view of a portion of the exemplary positions of a welder of a weld robot relative to the EOAT and fixture and associated holding members to complete the welds at the indicated weld points of FIG. 16.
Figure 40:
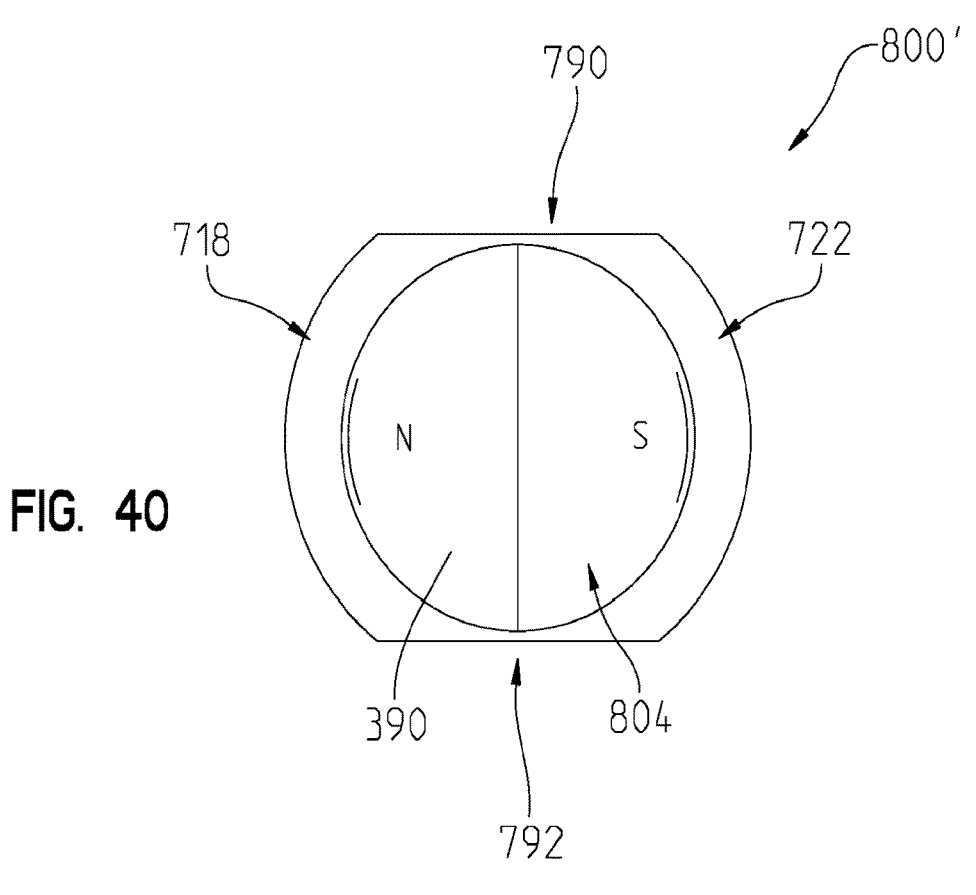
FIG. 40 illustrates a top view of an exemplary magnet and pole piece assembly of the magnetic coupling device of FIG. 35 without the central channel.

Referring to FIG. 40, in embodiments, magnetic coupling device 800' does not include channel 750. Rather, each of first permanent magnet 802 and second permanent magnet 804 are solid circular permanent magnets. In embodiments, a plurality of magnets may collectively form one or both of first permanent magnet 802 and second permanent magnet 804. Further, each of first permanent magnet 802 and second permanent magnet 804 may have various shapes. An exemplary arrangement is shown in FIGS. 2, 4, and 7 of U.S. Pat. No. 10,903,030, issued Jan. 26, 2021, titled VARIABLE FIELD MAGNETIC COUPLERS AND METHODS FOR ENGAGING A FERROMAGNETIC WORKPIECE, the entire disclosure of which are expressly incorporated by reference herein. Another exemplary arrangement is shown in U.S. Pat. No. 7,012,495, titled SWITCHABLE PERMANENT MAGNETIC DEVICE, the entire disclosure of which are expressly incorporated by reference herein. Further, each of first permanent magnet 802 and second permanent magnet 804 may be a platter containing multiple magnets. An exemplary arrangement is shown in FIGS. 17-19 of U.S. Pat. No. 10,903,030, issued Jan. 26, 2021, titled VARIABLE FIELD MAGNETIC COUPLERS AND METHODS FOR ENGAGING A FERROMAGNETIC WORKPIECE, the entire disclosure of which are expressly incorporated by reference herein.

Figure 41:
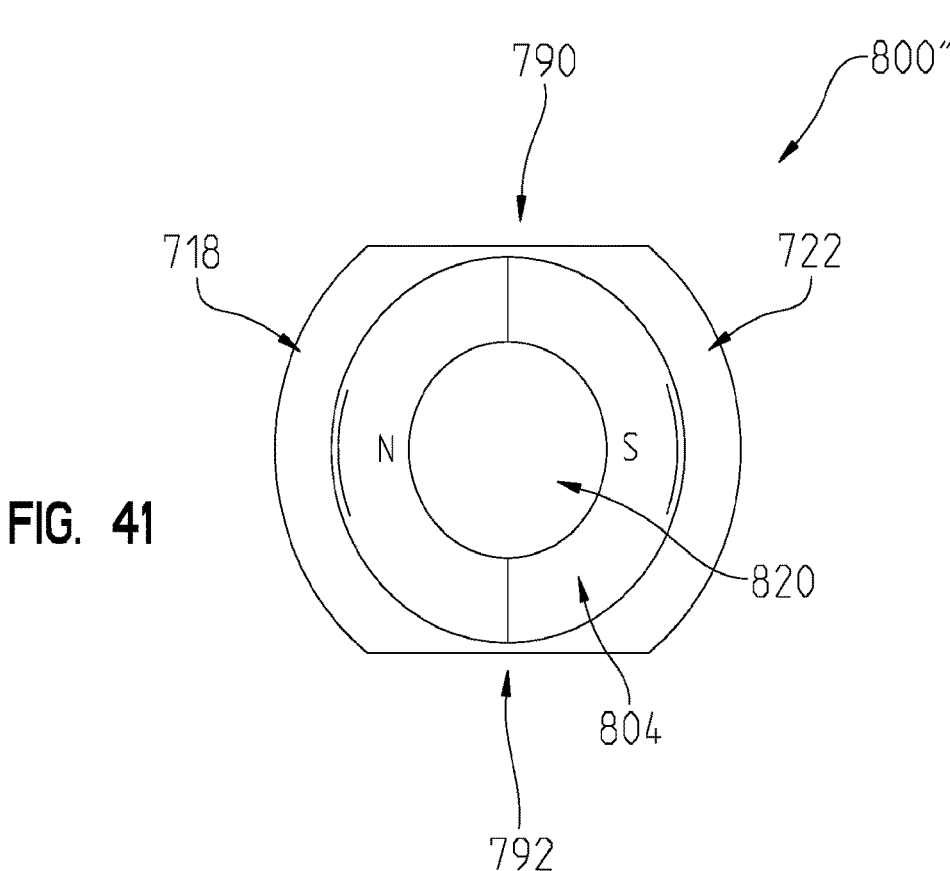
FIG. 41 illustrates a top view of an exemplary magnet and pole piece assembly of the magnetic coupling device of FIG. 35 without the central channel and including a ferromagnetic cores.

Referring to FIG. 41, in embodiments, magnetic coupling device 800" does not include channel 750, but each of first permanent magnet 802 and second permanent magnet 804 includes a ferromagnetic core (ferromagnetic core 820 for second permanent magnet 804 shown in FIG. 17). An exemplary arrangement is shown in U.S. Provisional Patent Application No. 63/351,349, filed Jun. 11, 2022, titled MAGNETIC COUPLING DEVICE, the entire disclosure of which are expressly incorporated by reference herein.

An advantage, among others, of at least some of the systems disclosed herein is the ability to couple parts and perform manufacturing operations thereon with single sided tools. Another advantage, among others, of at least some of the systems disclosed herein is the ability to handle the parts individually or in a married position into a fixture and out of the the fixture. A further advantage, among others, of at least some of the systems disclosed herein is the ability handle parts for manufacturing operations without the use of power clamps or direct cylinder clamps. A still further advantage, among others, of at least some of the systems disclosed herein is the ability to have easy access with weld guns due to fixturing within the parts perimeter. Yet still another advantage, among others, of at least some of the systems disclosed herein is the ability to not need compressed air on EOAT or fixture. Still a further advantage, among others, of at least some of the systems disclosed herein is the ability is the elimination of components and reduced processing time. A further still advantage, among others, of at least some of the systems disclosed herein is the ability easily clamp in the center of large parts.

EXAMPLES

Example 1. A system for holding at least one assembly of parts is provide. The system may comprise a fixture including a frame and a first interfacing feature; and an end-of-arm-tool (EOAT) including a frame and a second interfacing feature. The fixture and the EOAT may cooperate to hold the at least one assembly of parts by coupling the EOAT to the fixture through a magnetic interaction between the first interfacing feature of the fixture and the second interfacing feature of the EOAT.

Example 2. The system of Example 1, wherein the first interfacing feature of the fixture and the second interfacing feature of the EOAT may cooperate to both position and orient the EOAT relative to the fixture.

Example 3. The system of Example 1, wherein the first interfacing feature is one of a first plurality of interfacing features of the fixture and the second interfacing feature is one of a second plurality of interfacing features of the EOAT. The first plurality of interfacing features of the fixture and the second plurality of may cooperate to both position and orient the EOAT relative to the fixture.

Example 4. The system of Example 1, wherein the magnetic interaction between the first interfacing feature of the fixture and the first interfacing feature of the EOAT may be established due to contact between the first interfacing feature of the fixture and the second interfacing feature of the EOAT independent of the at least one assembly of parts.

Example 5. The system of Example 4, wherein the at least one assembly of parts defines an ultimate outer perimeter and the first interfacing feature of the fixture and the second interfacing feature of the EOAT may both be positioned to be within the ultimate outer perimeter of the at least one assembly of parts.

Example 6. The system of Example 4, wherein the at least one assembly of parts defines an ultimate outer perimeter and the first interfacing feature of the fixture and the second interfacing feature of the EOAT may both be positioned to be outboard of the ultimate outer perimeter of the at least one assembly of parts.

Example 7. The system of Example 1, wherein the first interfacing feature of the fixture and the second interfacing feature of the EOAT are spaced apart and the magnetic interaction between the first interfacing feature of the fixture and the second interfacing feature of the EOAT may be established through the at least one assembly of parts.

Example 8. The system of any of the previous Examples wherein one of the first interfacing feature of the fixture and the second interfacing feature of the EOAT may include a locator pin and the other of the first interfacing feature of the fixture and the second interfacing feature of the EOAT may include a recess which receives the locator pin of the one of the first interfacing feature of the fixture and the second interfacing feature of the EOAT.

Example 9. The system of any of the previous Examples, wherein the fixture may include a third interfacing feature and the end-of-arm-tool (EOAT) may include a fourth interfacing feature. The fixture and the EOAT may cooperate to hold the at least one assembly of parts by a magnetic interaction between the third interfacing feature of the fixture and the fourth interfacing feature of the EOAT.

Example 10. The system of Example 9, wherein the fixture includes a fifth interfacing feature and the end-of-arm-tool (EOAT) includes a sixth interfacing feature. The fixture and the EOAT may cooperate to hold the at least one assembly of parts by a magnetic interaction between the fifth interfacing feature of the fixture and the sixth interfacing feature of the EOAT.

Example 11. The system any of the previous Examples, wherein the EOAT may include a plurality of grippers coupled to the frame and positioned hold at least a portion of the at least one assembly of parts to the EOAT when the EOAT is spaced apart from the fixture. A first gripper of the plurality of grippers may be adapted to hold the portion of the at least one assembly of parts to the EOAT through a first interaction with the at least one assembly of parts.

Example 12. The system of Example 11, wherein when the EOAT is coupled to the fixture through the magnetic interaction between the first interfacing feature of the fixture and the second interfacing feature of the EOAT, the first gripper of the plurality of grippers may be adapted to hold the portion of the at least one assembly of parts to the EOAT through a second interaction with the portion of the at least one assembly of parts.

Example 13. The system of any of Examples 11 and 12, wherein the first gripper is a magnetic gripper and the first interaction may be a magnetic interaction between the first gripper and the portion of the at least one assembly of parts and the second interaction maybe a clamping of the portion of the at least one assembly of parts between the first gripper and the fixture.

Example 14. The system of any of Examples 11-13, wherein each of the plurality of grippers may be single side grippers which are adapted to directly contact a single side of the portion of the at least one assembly of parts.

Example 15. The system of any of Examples 11-13, wherein at least one of the plurality of grippers may be a double side gripper which is adapted to directly contact both sides the portion of the at one assembly of parts.

Example 16. The system of any of Examples 11-13, wherein each of the plurality of grippers may be positioned to be within an ultimate outer envelope of the portion of the at one assembly of parts.

Example 17. The system of Example 1, wherein the fixture may be supported on a base.

Example 18 The system of Example 17, wherein the fixture may be stationary.

Example 19 The system of Example 1, wherein the fixture may be a second EOAT. The EOAT may be adapted to be coupled to a first robot for movement by the first robot and the fixture may be adapted to be coupled to a second robot for movement by the second robot.

Example 20. A system is provided. The system may comprise a fixture and an end-of-arm tool (EOAT). The fixture may comprise a first interfacing feature and a second interfacing feature. The end-of-arm tool (EOAT) may comprise a third interfacing feature corresponding to the first interfacing feature of the fixture and a fourth interfacing feature corresponding to the second interfacing feature of the fixture.

Example 21. The system of Example 20, wherein the first interfacing feature may be a locator and the third interfacing feature may be a plate configured to receive the locator of the first interfacing feature.

Example 22. The system of Example 21, wherein the first interfacing feature may further comprise a magnetic gripper and the plate configured to receive the locator may be ferromagnetic.

Example 23. The system of Example 20, wherein the second interfacing feature may be a magnetic gripper and the fourth interfacing feature may be a ferromagnetic plate.

Example 24. The system of Example 20, wherein the first interfacing feature may be a first magnetic gripper and the third interfacing feature may be a second magnetic gripper.

Example 25. The system of Example 20, wherein the fixture and the EOAT may be configured to retain an object when the first interfacing feature of the fixture interfaces with the third interfacing feature of the EOAT; and the second interfacing feature of the fixture interfaces with the fourth interfacing feature of the EOAT.

Example 26. The system of Example 25, may further comprise a tool operable to interact with the object retained by the fixture and the EOAT.

Example 27. The system of Example 20, wherein the third interfacing feature and the fourth interfacing feature may be configured to receive power from a robot to which the EOAT is coupled.

Example 28. The system of Example 27, wherein the third interfacing feature and the fourth interfacing feature may be configured to receive power from the fixture when the EOAT is in a configuration to retain an object.

Example 29. A method of performing a manufacturing operation on at least one assembly of parts is provided. The method may comprise the steps of: coupling at least a portion of the at least one assembly of parts to an end-of-arm-tool (EOAT) of a robot with at least one gripper; transporting the portion of the at least one assembly of the parts to a fixture; coupling the EOAT to the fixture to hold the at least one assembly of parts with the fixture and the EOAT; and performing the manufacturing operation on the at least one assembly of parts while the at least one assembly of parts is being held by the fixture and the EOAT.

Example 30. The method of Example 29 wherein the at least one gripper may include a first magnetic gripper and the step of transporting the portion of the at least one assembly of the parts to the fixture may include the steps of: configuring the first gripper to have a first magnetic strength relative to the at least one assembly of parts while the portion of the at least one assembly of parts is a first distance from the fixture; and configuring the first gripper to have a second magnetic strength relative to the at least one assembly of parts while the portion of the at least one assembly of parts is a second distance from the fixture, the second magnetic strength being less than the first magnetic strength and the second distance being less than the first distance.

Example 31. The method of Example 30 wherein subsequent to the step of coupling the EOAT to the fixture to hold the at least one assembly of parts with the fixture and the EOAT, the method may further comprise the step of configuring the first gripper to have a third magnetic strength relative to the at least one assembly of parts, the third magnetic strength being less than the second magnetic strength.

Example 32. The method of any one of Examples 30 and 31 wherein subsequent to the step of performing the manufacturing operation on the at least one assembly of parts while the at least one assembly of parts is being held by the fixture and the EOAT, the method may further comprise the step of configuring the first gripper to have a fourth magnetic strength relative to the at least one assembly of parts, the fourth magnetic strength being at least equal to the second magnetic strength.

Example 33. The method of Example 32, wherein the fourth magnetic strength is greater than the second magnetic strength.

Example 34. The method of Example 29, wherein the portion of the at least one assembly of parts may be the whole of the at least one assembly of parts.

Example 35. The method of Example 29, wherein a second portion of the at least one assembly of parts may be positioned on the fixture prior to the step of coupling the EOAT to the fixture.

Example 36. The method of any one of Examples 29-35, may further comprise the step of: decoupling the robot from the EOAT prior to the step of performing the manufacturing operation.

Example 37. The method of any one of Examples 29-36, wherein the step of coupling at least the portion of the at least one assembly of parts to an end-of-arm-tool (EOAT) of a robot with the at least one gripper may include the steps of: contacting the portion of the at least one assembly of parts with the at least one gripper; providing power to the at least one gripper from the robot; generating at least one magnetic circuit between the at least one gripper and the portion of the at least one assembly of parts.

Example 38. The method of Example 37, wherein the power may be at least one of electric power, pneumatic power, and hydraulic power.

Example 39. The method of any one of Examples 29-36, wherein the step of coupling the EOAT to the fixture to hold the at least one assembly of parts with the fixture and the EOAT may include the steps of: providing at least one magnetic coupling device on the fixture; providing power to the at least one magnetic coupling device on the fixture independent of the EOAT; and generating at least one magnetic circuit between the at least one magnetic coupling device and the EOAT.

Example 40. The method of Example 39, wherein the power may be at least one of electric power, pneumatic power, and hydraulic power.

Example 41. The method of Example 39, wherein the at least one magnetic circuit between the at least one magnetic coupling device and the EOAT may pass through the at least one assembly of parts.

Example 42. The method of Example 39, wherein the at least one magnetic circuit between the at least one magnetic coupling device and the EOAT may be is independent of the at least one assembly of parts.

Example 43. A method of performing a manufacturing operation on at least one assembly of parts is provided. The method may comprise the steps of: coupling at least a portion of the at least one assembly of parts to an end-of-arm-tool (EOAT) of a robot with a plurality of grippers, a first gripper of the plurality of grippers holds the portion of the at least one assembly of parts to the EOAT through a first interaction with the portion of the at least one assembly of parts; transporting the portion of the at least one assembly of the parts to a fixture; coupling the EOAT to the fixture to hold the at least one assembly of parts with the fixture and the EOAT through the steps of: magnetically coupling a first interfacing feature of the fixture with a second interfacing feature of the EOAT; and holding the portion of the at least one assembly of the parts to the EOAT with a second interaction of the first gripper with the portion of the at least one assembly of parts. The method may further comprise performing the manufacturing operation on the at least one assembly of parts while the at least one assembly of parts is being held by the fixture and the EOAT.

Example 44. The method of Example 43, wherein the first gripper may be a magnetic gripper and the first interaction is a magnetic interaction between the first gripper and the portion of the at least one assembly of parts and the second interaction is a clamping of the portion of the at least one assembly of parts between the first gripper and the fixture.

Example 45. The method of any one of Examples 29-44, wherein the fixture may be supported on a base.

Example 46. The method of any one of Examples 29-44, wherein the fixture may be stationary.

Example 47. The method of any one of Examples 29-44, wherein the fixture may be a second EOAT. The EOAT may adapted to be coupled to a first robot for movement by the first robot and the fixture may be adapted to be coupled to a second robot for movement by the second robot.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The invention claimed is:

1. A system for holding at least one assembly of parts, comprising:
    a fixture including a frame and a first interfacing feature; and
    an end-of-arm-tool (EOAT) including a frame and a second interfacing feature, the fixture and the EOAT cooperating to hold the at least one assembly of parts by coupling the EOAT to the fixture through a magnetic interaction between the first interfacing feature of the fixture and the second interfacing feature of the EOAT, and
    wherein the EOAT includes a plurality of grippers coupled to the frame and positioned to hold at least a portion of the at least one assembly of parts to the EOAT when the EOAT is spaced apart from the fixture, a first gripper of the plurality of grippers is adapted to hold the portion of the at least one assembly of parts to the EOAT through a first interaction with the at least one assembly of parts.

2. The system of claim 1, wherein the first interfacing feature of the fixture and the second interfacing feature of the EOAT cooperate to both position and orient the EOAT relative to the fixture.

3. The system of claim 1, wherein the first interfacing feature is one of a first plurality of interfacing features of the fixture and the second interfacing feature is one of a second plurality of interfacing features of the EOAT and the first plurality of interfacing features of the fixture and the second plurality of interfacing features cooperate to both position and orient the EOAT relative to the fixture.

4. The system of claim 1, wherein the magnetic interaction between the first interfacing feature of the fixture and the first interfacing feature of the EOAT is established due to contact between the first interfacing feature of the fixture and the second interfacing feature of the EOAT independent of the at least one assembly of parts.

5. The system of claim 4, wherein the at least one assembly of parts defines an ultimate outer perimeter and the first interfacing feature of the fixture and the second interfacing feature of the EOAT are both positioned to be within the ultimate outer perimeter of the at least one assembly of parts.

6. The system of claim 4, wherein the at least one assembly of parts defines an ultimate outer perimeter and the first interfacing feature of the fixture and the second interfacing feature of the EOAT are both positioned to be outboard of the ultimate outer perimeter of the at least one assembly of parts.

7. The system of claim 1, wherein the first interfacing feature of the fixture and the second interfacing feature of the EOAT are spaced apart and the magnetic interaction between the first interfacing feature of the fixture and the second interfacing feature of the EOAT is established through the at least one assembly of parts.

8. The system of claim 1, wherein one of the first interfacing feature of the fixture and the second interfacing feature of the EOAT includes a locator pin and the other of the first interfacing feature of the fixture and the second interfacing feature of the EOAT includes a recess which receives the locator pin of the one of the first interfacing feature of the fixture and the second interfacing feature of the EOAT.

9. The system of claim 1, wherein the fixture includes a third interfacing feature and the end-of-arm-tool (EOAT) includes a fourth interfacing feature, the fixture and the EOAT cooperating to hold the at least one assembly of parts by a magnetic interaction between the third interfacing feature of the fixture and the fourth interfacing feature of the EOAT.

10. The system of claim 9, wherein the fixture includes a fifth interfacing feature and the end-of-arm-tool (EOAT) includes a sixth interfacing feature, the fixture and the EOAT cooperating to hold the at least one assembly of parts by a magnetic interaction between the fifth interfacing feature of the fixture and the sixth interfacing feature of the EOAT.

11. The system of claim 1, wherein when the EOAT is coupled to the fixture through the magnetic interaction between the first interfacing feature of the fixture and the second interfacing feature of the EOAT, the first gripper of the plurality of grippers is adapted to hold the portion of the at least one assembly of parts to the EOAT through a second interaction with the portion of the at least one assembly of parts.

12. The system of claim 1, wherein the first gripper is a magnetic gripper and the first interaction is a magnetic interaction between the first gripper and the portion of the at least one assembly of parts and the second interaction is a clamping of the portion of the at least one assembly of parts between the first gripper and the fixture.

13. The system of claim 1, wherein each of the plurality of grippers are single side grippers which are adapted to directly contact a single side of the portion of the at least one assembly of parts.

14. The system of claim 1, wherein at least one of the plurality of grippers is a double side gripper which is adapted to directly contact both sides the portion of the at one assembly of parts.

15. The system of claim 1, wherein each of the plurality of grippers are positioned to be within an ultimate outer envelope of the portion of the at one assembly of parts.

16. The system of claim 1, wherein the fixture is supported on a base.

17. The system of claim 16, wherein the fixture is stationary.

18. The system of claim 1, wherein the fixture is a second EOAT, the EOAT is adapted to be coupled to a first robot for movement by the first robot and the fixture is adapted to be coupled to a second robot for movement by the second robot.

\* \* \* \* \*